(12) United States Patent
Masuzawa et al.

(10) Patent No.: US 11,909,031 B2
(45) Date of Patent: Feb. 20, 2024

(54) FILM ELECTRODE, RESIN LAYER FORMING INK, INORGANIC LAYER FORMING INK, AND ELECTRODE PRINTING APPARATUS

(71) Applicants: Masahiro Masuzawa, Kanagawa (JP); Toru Ushirogochi, Kanagawa (JP); Hideo Yanagita, Tokyo (JP); Yuu Zama, Kanagawa (JP); Aya Yoshida, Tokyo (JP); Shigeo Takeuchi, Kanagawa (JP); Anna Hirowatari, Kanagawa (JP); Okitoshi Kimura, Kanagawa (JP); Kohji Matsuoka, Kanagawa (JP); Keigo Takauji, Kanagawa (JP); Miku Ohkimoto, Kanagawa (JP)

(72) Inventors: Masahiro Masuzawa, Kanagawa (JP); Toru Ushirogochi, Kanagawa (JP); Hideo Yanagita, Tokyo (JP); Yuu Zama, Kanagawa (JP); Aya Yoshida, Tokyo (JP); Shigeo Takeuchi, Kanagawa (JP); Anna Hirowatari, Kanagawa (JP); Okitoshi Kimura, Kanagawa (JP); Kohji Matsuoka, Kanagawa (JP); Keigo Takauji, Kanagawa (JP); Miku Ohkimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/060,045

(22) Filed: Nov. 30, 2022

(65) Prior Publication Data
US 2023/0091130 A1 Mar. 23, 2023

Related U.S. Application Data

(63) Continuation of application No. 16/490,323, filed as application No. PCT/JP2018/008411 on Mar. 5, 2018, now Pat. No. 11,588,147.

(30) Foreign Application Priority Data

Mar. 6, 2017 (JP) .................................. 2017-042121
Oct. 6, 2017 (JP) .................................. 2017-196274
Feb. 9, 2018 (JP) .................................. 2018-022573

(51) Int. Cl.
*H01M 4/139* (2010.01)
*H01M 4/04* (2006.01)
(Continued)

(52) U.S. Cl.
CPC ......... *H01M 4/139* (2013.01); *H01M 4/0404* (2013.01); *H01M 4/0419* (2013.01);
(Continued)

(58) Field of Classification Search
CPC ......... H01M 10/0525; H01M 10/0585; H01M 2200/00; H01M 4/0402; H01M 4/0404;
(Continued)

(56) References Cited

U.S. PATENT DOCUMENTS 6,336,720 B1  1/2002  Suzuki et al.
7,258,948 B2  8/2007  Miyamoto et al.
(Continued)

FOREIGN PATENT DOCUMENTS

JP  7-220759    8/1995
JP  H11176472   7/1999
(Continued)

OTHER PUBLICATIONS

Chinese Office Action dated Dec. 28, 2021, in Chinese Application No. 201880015618.1, 38 pages.
(Continued)

*Primary Examiner* — Lingwen R Zeng
(74) *Attorney, Agent, or Firm* — Grüneberg and Myers, PLLC

(57) ABSTRACT

A disclosed film electrode includes an electrode base, and an active material layer formed on the electrode base, and a
(Continued)

resin layer adhering to at least one of a peripheral portion of the active material layer and a surface of the active material layer in a direction extending along a plane of the electrode base.

20 Claims, 26 Drawing Sheets

(51) Int. Cl.
*H01M 4/36* (2006.01)
*H01M 4/62* (2006.01)
*H01M 10/0525* (2010.01)
*H01M 10/0585* (2010.01)

(52) U.S. Cl.
CPC .......... *H01M 4/366* (2013.01); *H01M 4/622* (2013.01); *H01M 10/0525* (2013.01); *H01M 4/0414* (2013.01); *H01M 4/621* (2013.01); *H01M 10/0585* (2013.01); *H01M 2200/00* (2013.01); *Y02E 60/10* (2013.01)

(58) Field of Classification Search
CPC .. H01M 4/0414; H01M 4/0419; H01M 4/139; H01M 4/366; H01M 4/62; H01M 4/621; H01M 4/622; Y02E 60/10
See application file for complete search history.

(56) References Cited

U.S. PATENT DOCUMENTS

| | | | |
|---|---|---|---|
| 10,135,050 B2 | 11/2018 | Uematsu et al. | |
| 2003/0143457 A1 | 7/2003 | Kashino et al. | |
| 2003/0224242 A1 | 12/2003 | Kaito et al. | |
| 2004/0038808 A1 | 2/2004 | Hampden-Smith et al. | |
| 2006/0269824 A1 | 11/2006 | Hampden-Smith et al. | |
| 2006/0292434 A1 | 12/2006 | Hampden-Smith et al. | |
| 2007/0072083 A1 | 3/2007 | Ikuta et al. | |
| 2007/0082261 A1 | 4/2007 | Lee | |
| 2007/0215039 A1 | 9/2007 | Edwards et al. | |
| 2008/0146777 A1 | 6/2008 | Sasa | |
| 2010/0092871 A1 | 4/2010 | Medlege et al. | |
| 2010/0099026 A1 | 4/2010 | Choi et al. | |
| 2012/0111409 A1 | 5/2012 | Kim et al. | |
| 2014/0255776 A1 | 9/2014 | Song et al. | |
| 2015/0030935 A1 | 1/2015 | Ukita | |
| 2015/0232746 A1 | 8/2015 | Sonoyama et al. | |
| 2016/0351885 A1 | 12/2016 | Umehara | |
| 2018/0090794 A1 | 3/2018 | Amasaki et al. | |
| 2019/0131603 A1* | 5/2019 | Park | H01M 50/489 |

FOREIGN PATENT DOCUMENTS

| | | |
|---|---|---|
| JP | 2000-044857 | 2/2000 |
| JP | 2001-235838 | 8/2001 |
| JP | 2006-179241 | 7/2006 |
| JP | 4177612 | 11/2008 |
| JP | 4201619 | 12/2008 |
| JP | 4262009 | 5/2009 |
| JP | 2010-518568 | 5/2010 |
| JP | 2011-060607 | 3/2011 |
| JP | 4730038 | 7/2011 |
| JP | 2012-38425 | 2/2012 |
| JP | 2012-109028 | 6/2012 |
| JP | 5005935 | 8/2012 |
| JP | 2012-243474 | 12/2012 |
| JP | 2015-72758 | 4/2015 |
| JP | 2015-153635 | 8/2015 |
| JP | 2015-187943 | 10/2015 |
| JP | 5801446 | 10/2015 |
| JP | 2016-58241 | 4/2016 |
| JP | 2016-225077 | 12/2016 |
| JP | 6052908 | 12/2016 |
| KR | 100686848 | 2/2007 |
| KR | 10-2010-0044087 | 4/2010 |
| KR | 10-2012-0048436 | 5/2012 |
| KR | 10-2014-0099710 | 8/2014 |
| KR | 10-2014-0115954 | 10/2014 |
| WO | 2006/064638 | 6/2006 |
| WO | 2013/047402 | 4/2013 |
| WO | 2013/145876 | 10/2013 |

OTHER PUBLICATIONS

Decision of Refusal of Amendment dated Oct. 25, 2021, in Korean Application No. 10-2019-7025897, 7 pages.
International Search Report and Written Opinion dated Jun. 27, 2018, in PCT/JP2018/008411 filed on Mar. 5, 2018.
Japanese Office Action dated Nov. 30, 2021, in Japanese Application No. 2018-022573, 16 pages.
Japanese Office Action dated May 24, 2022, in Japanese Application 2018-022573, 12 pages.
Japanese Publication Submission dated Jun. 14, 2022, in Japanese Application No. 2018-022573, 22 pages.
Korean Office Action dated Nov. 30, 2020, in, Korean Patent Application No. 10-2019-7025897, 24 pages.
Korean Office Action dated Feb. 28, 2022, in Korean Patent Application No. 10-2021-7042682, 30 pages.
Notice of Final Rejection dated Oct. 25, 2021, in Korean Application No. 10-2019-7025897, 10 pages.

* cited by examiner

[Fig. 1]
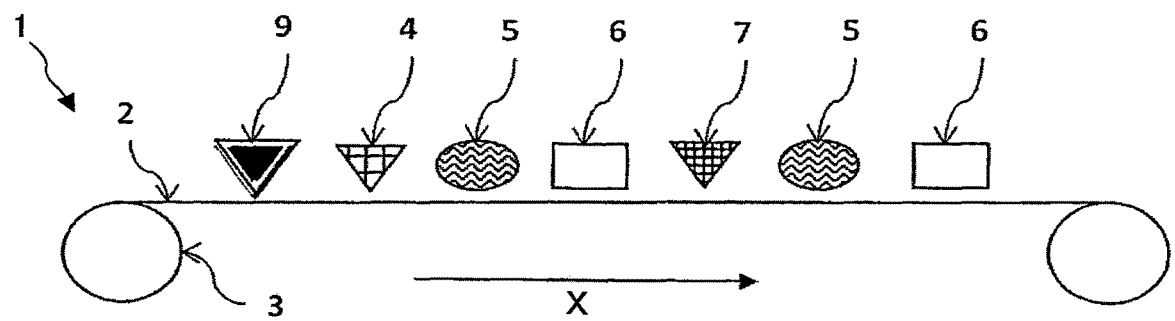
[Fig. 2A]
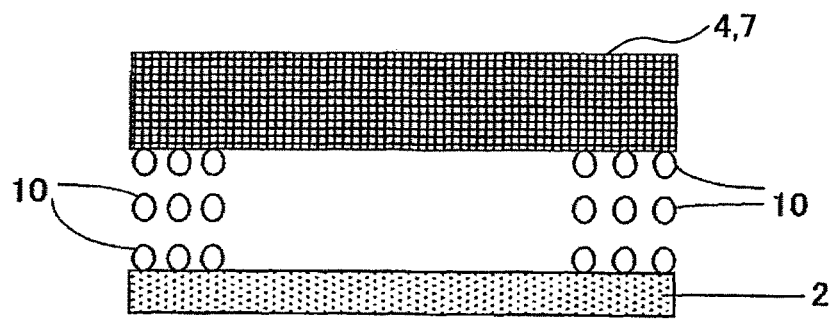
[Fig. 2B]
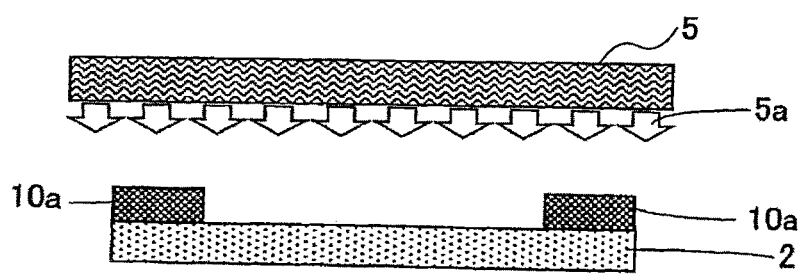

[Fig. 2C]
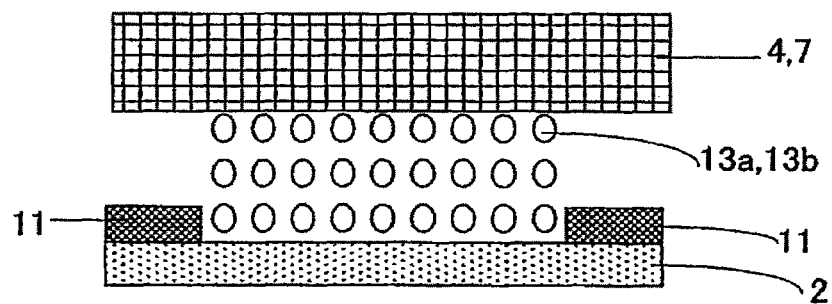
[Fig. 2D]
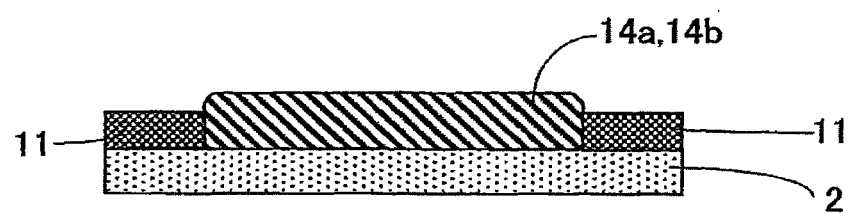
[Fig. 2E]
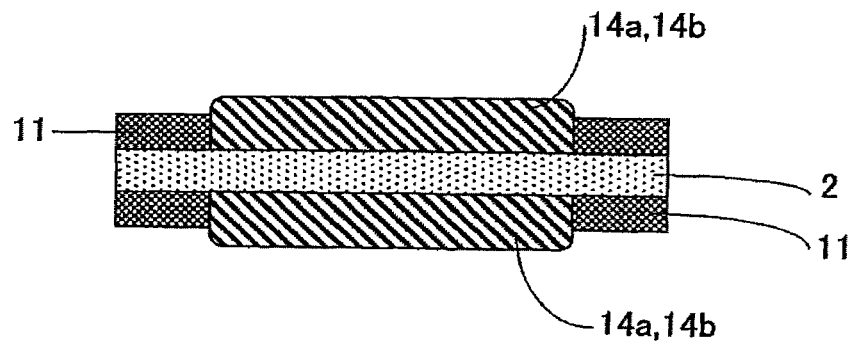

[Fig. 3A]
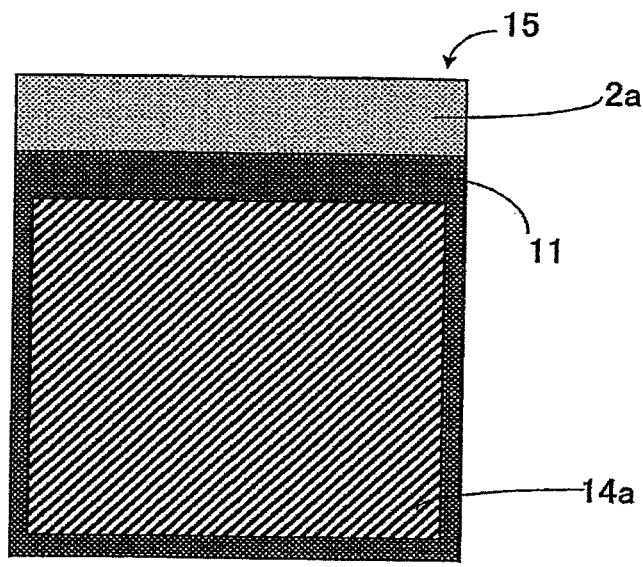
[Fig. 3B]
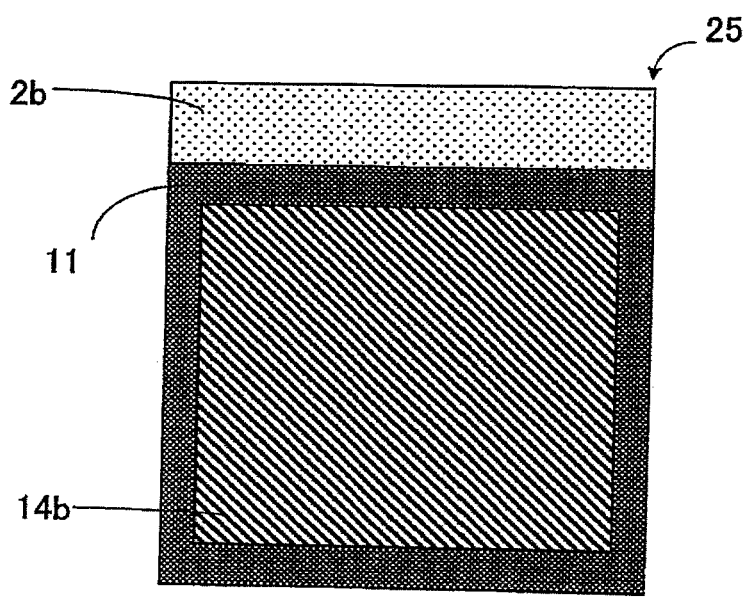

[Fig. 4A]
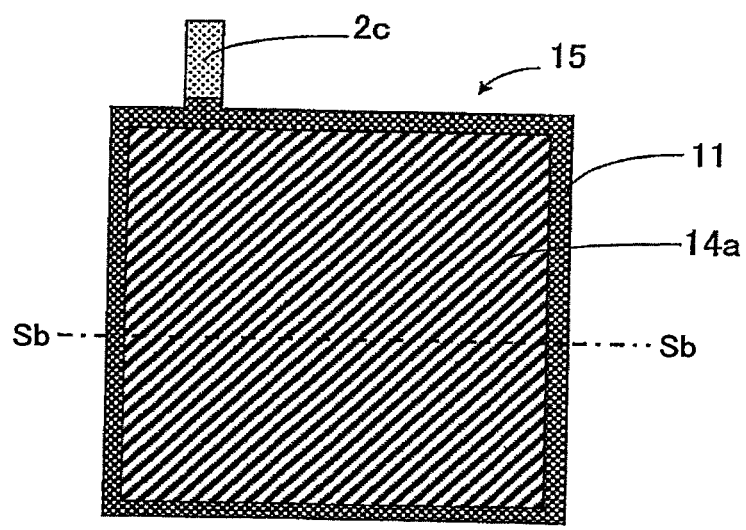
[Fig. 4B]
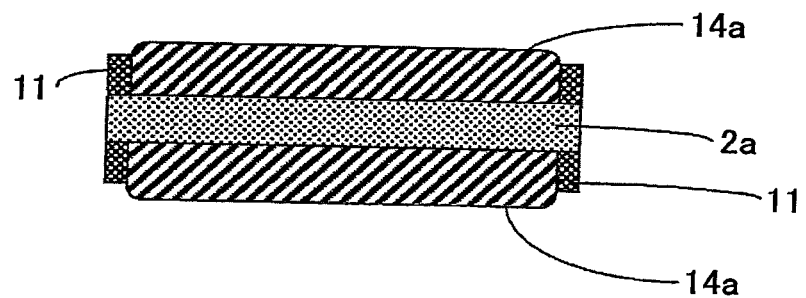

[Fig. 4C]
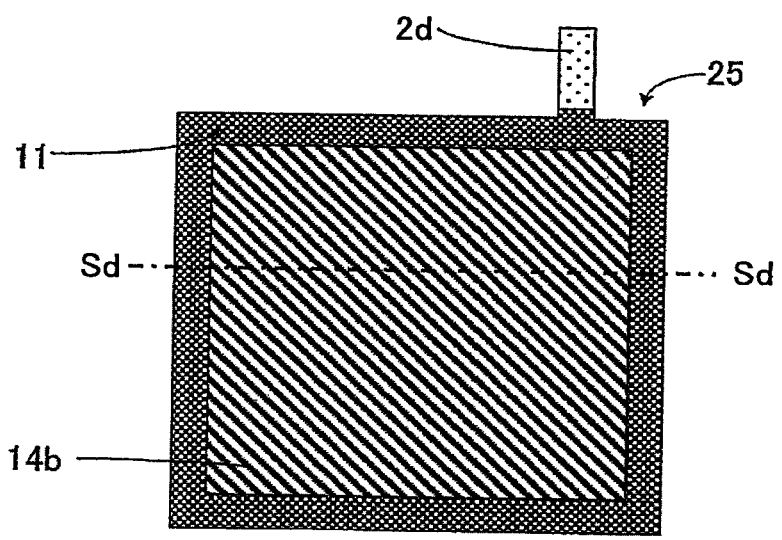
[Fig. 4D]
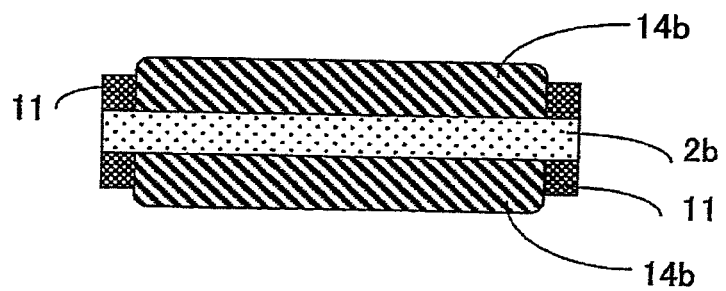

[Fig. 5A]
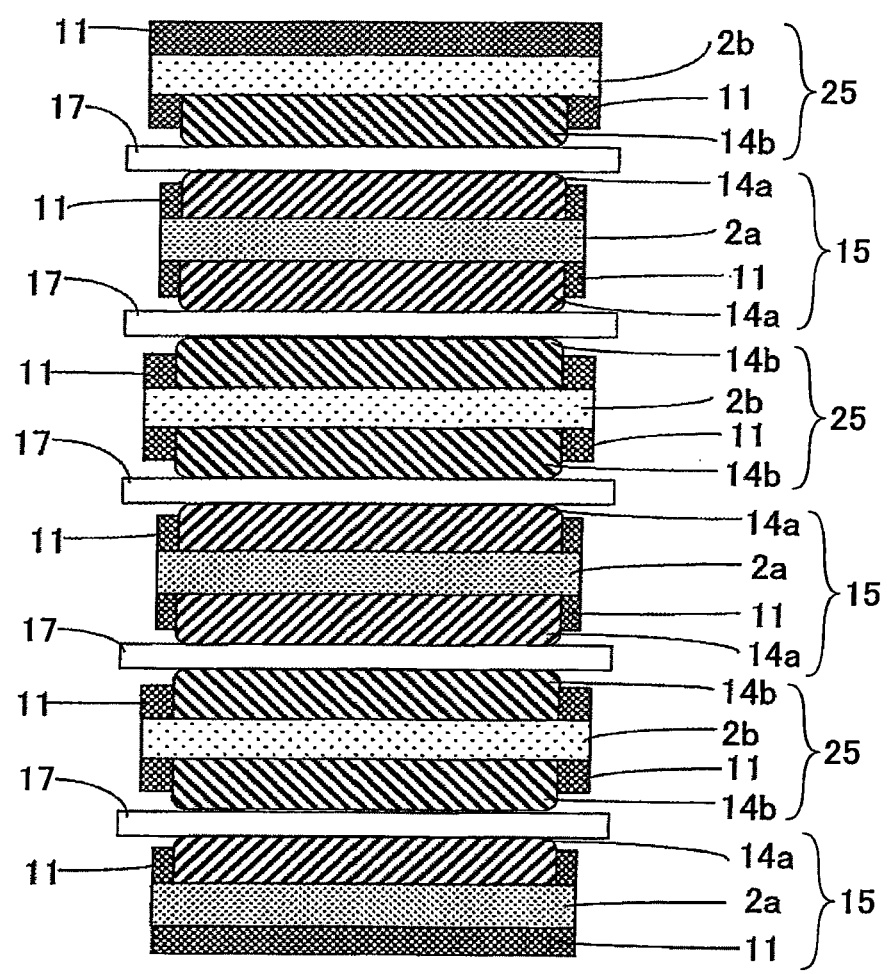

[Fig. 5B]
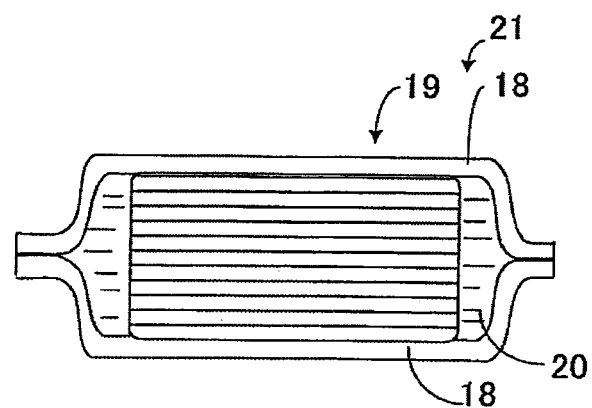
[Fig. 6]
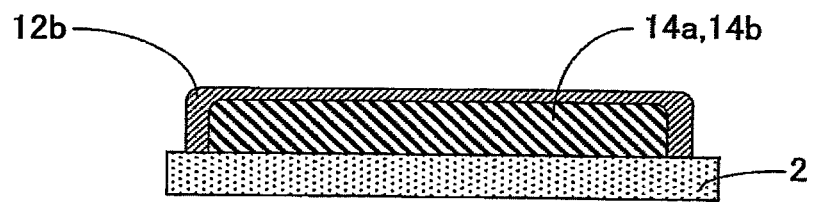
[Fig. 7]
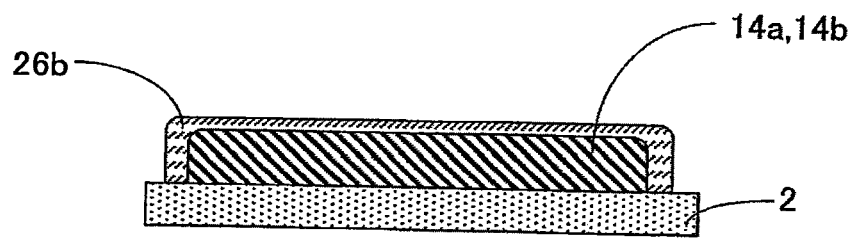

[Fig. 8]
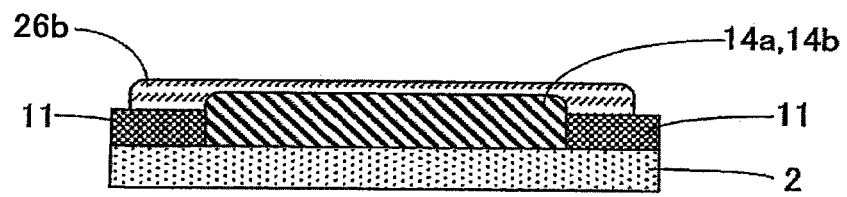
[Fig. 9A]
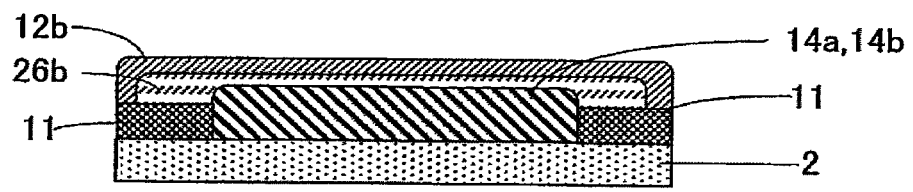
[Fig. 9B]
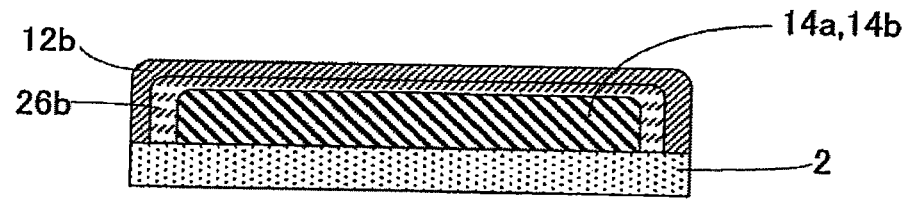

[Fig. 10A]
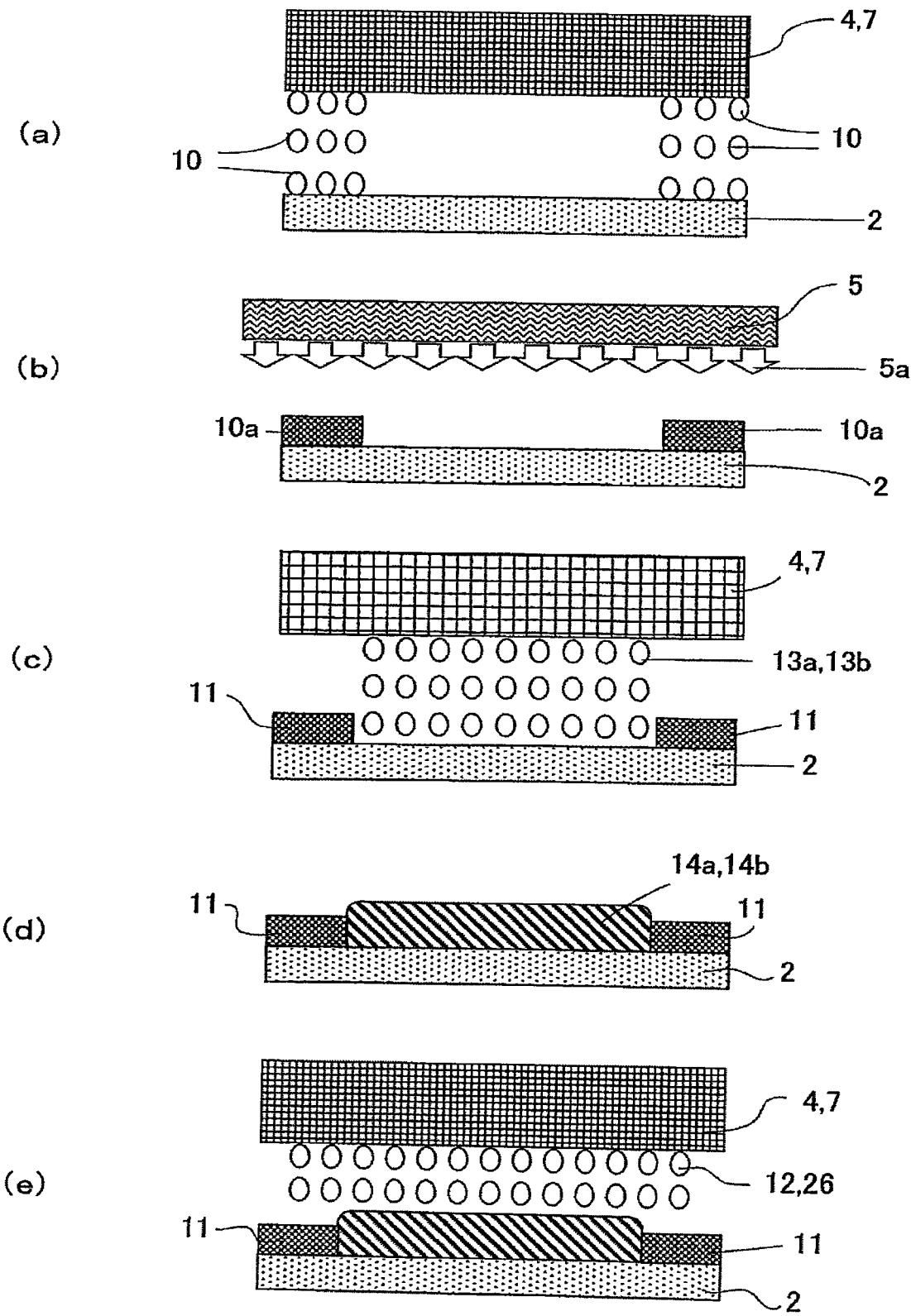

[Fig. 10B]
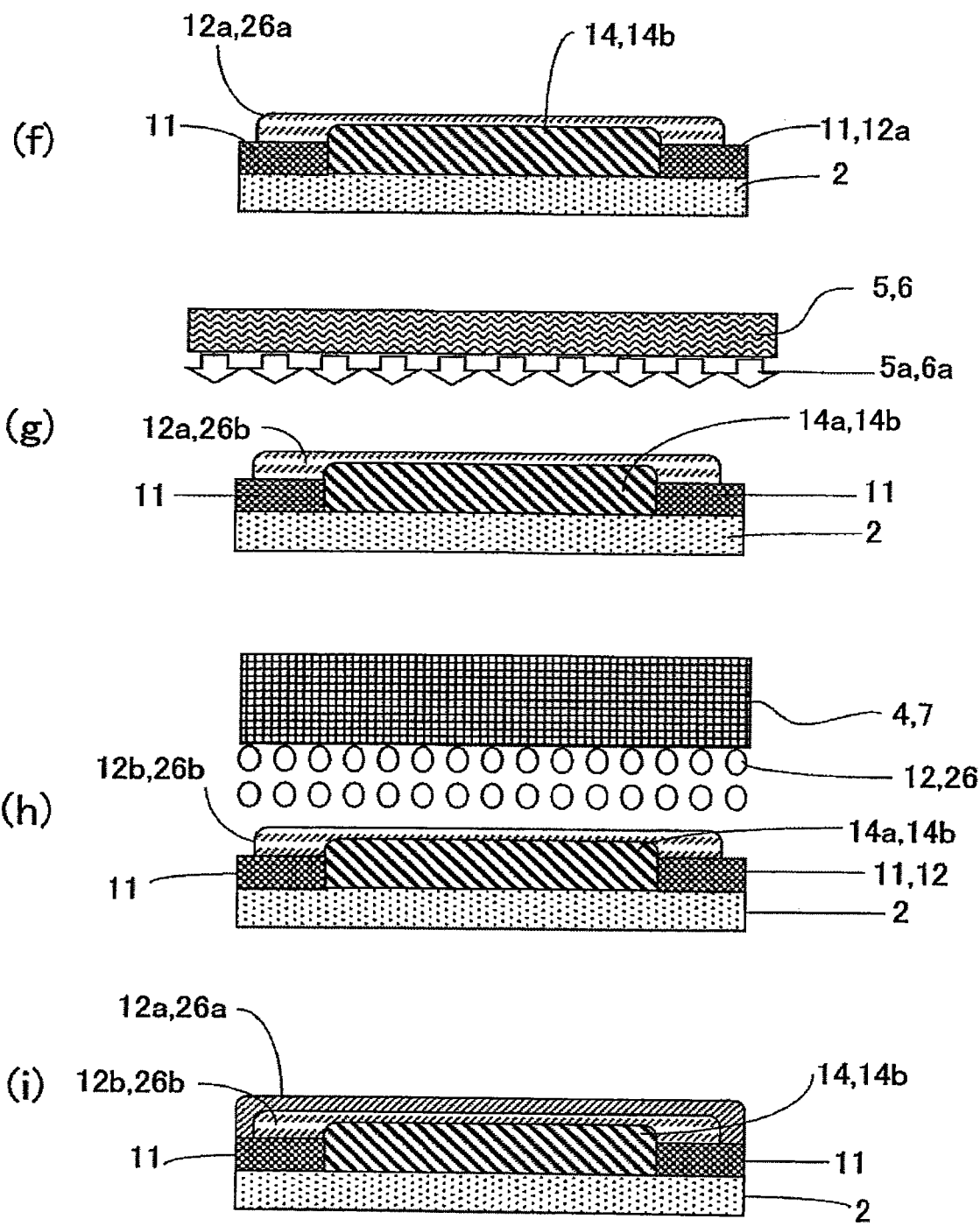

[Fig. 10C]
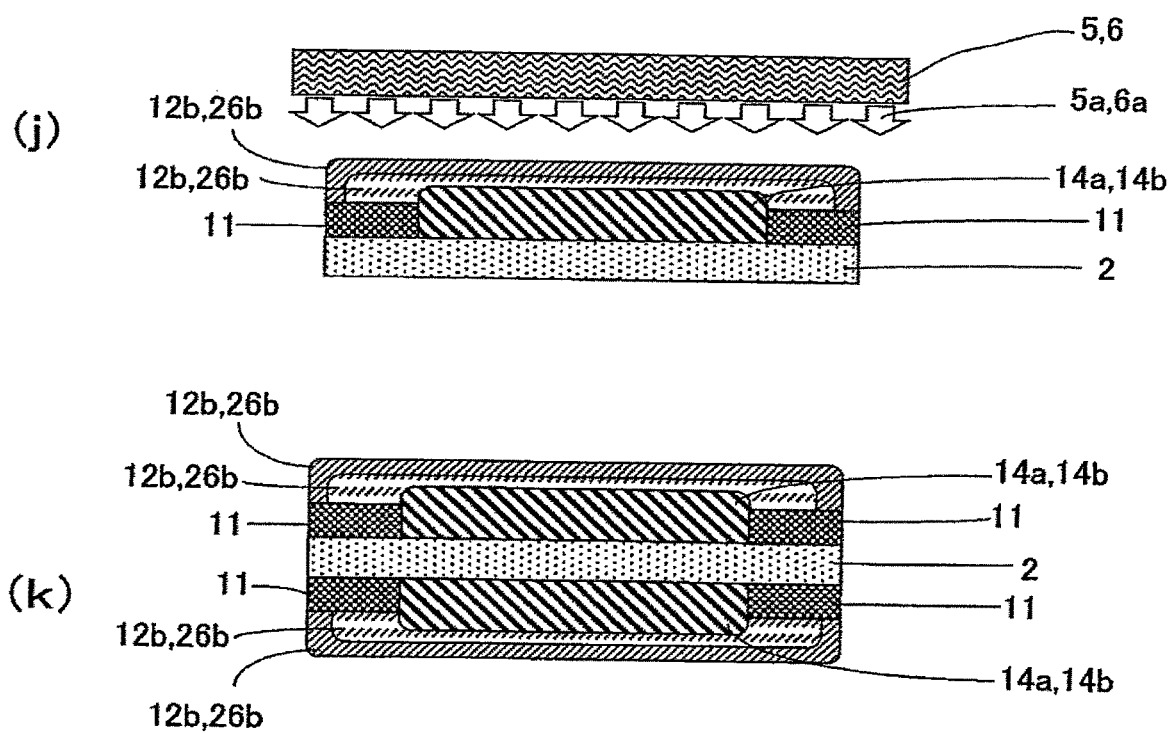

[Fig. 11A]
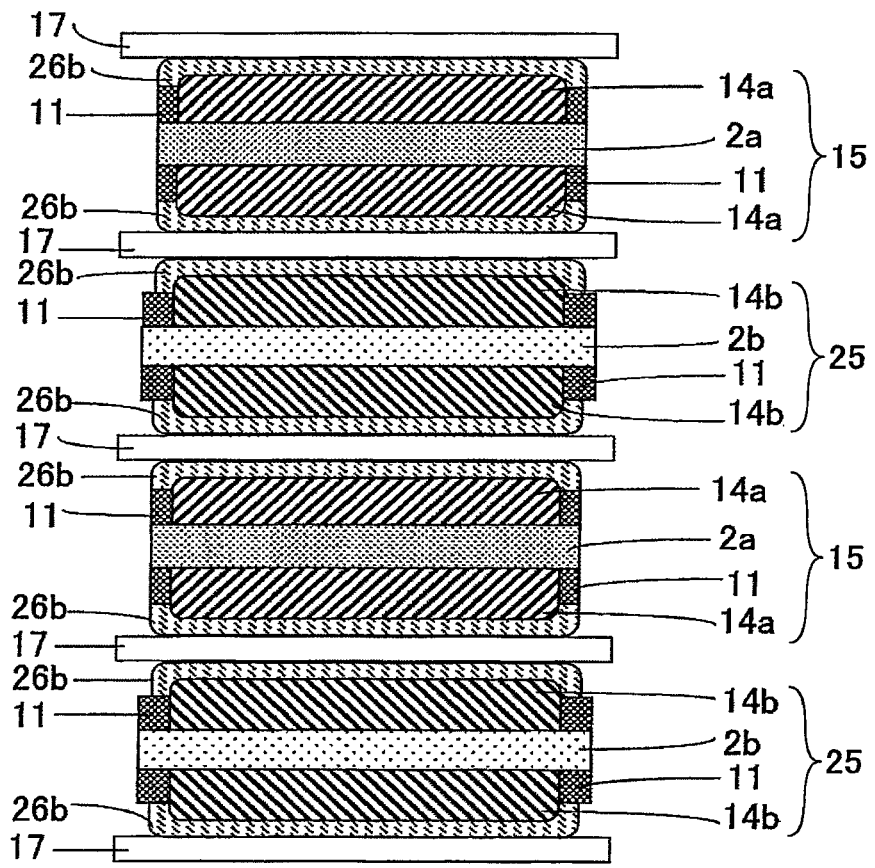
[Fig. 11B]
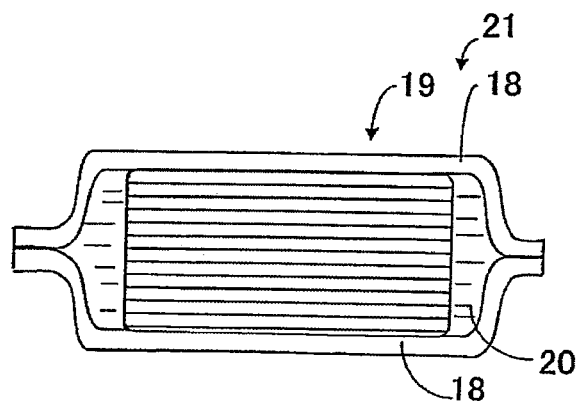

[Fig. 12A]
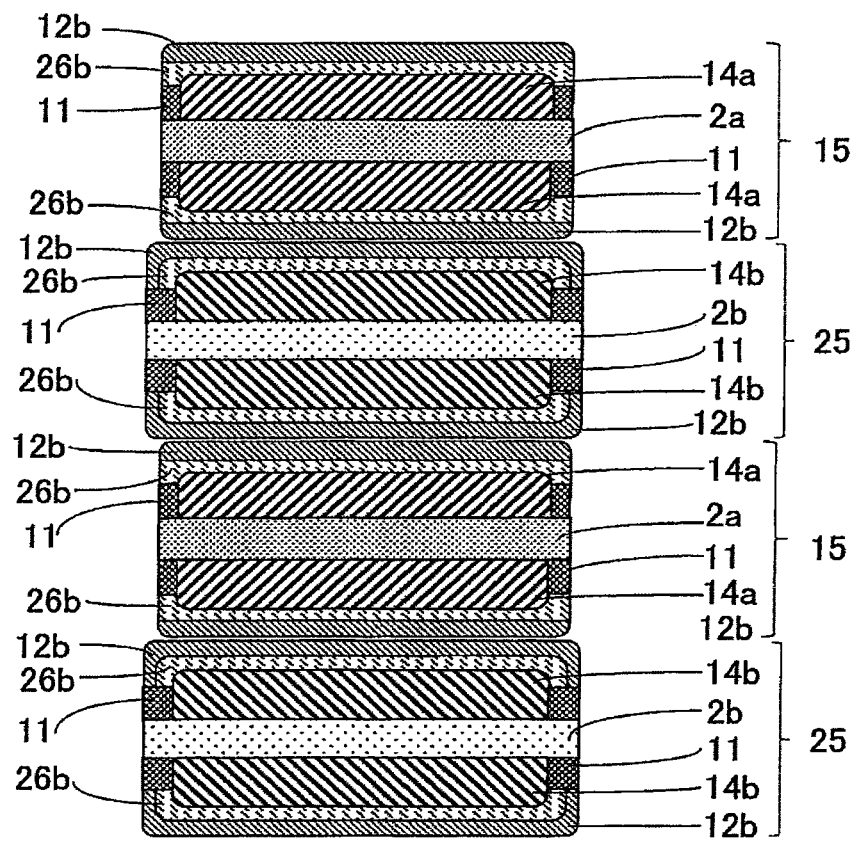
[Fig. 12B]
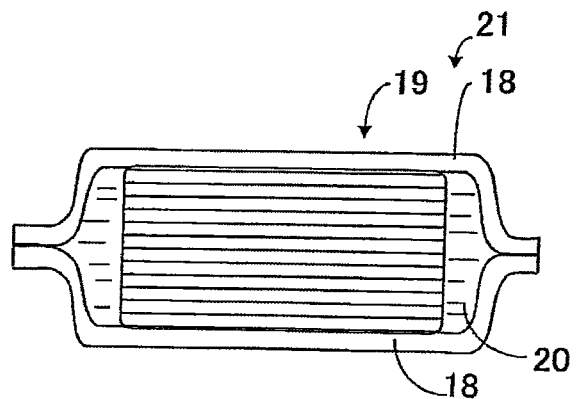

[Fig. 13]
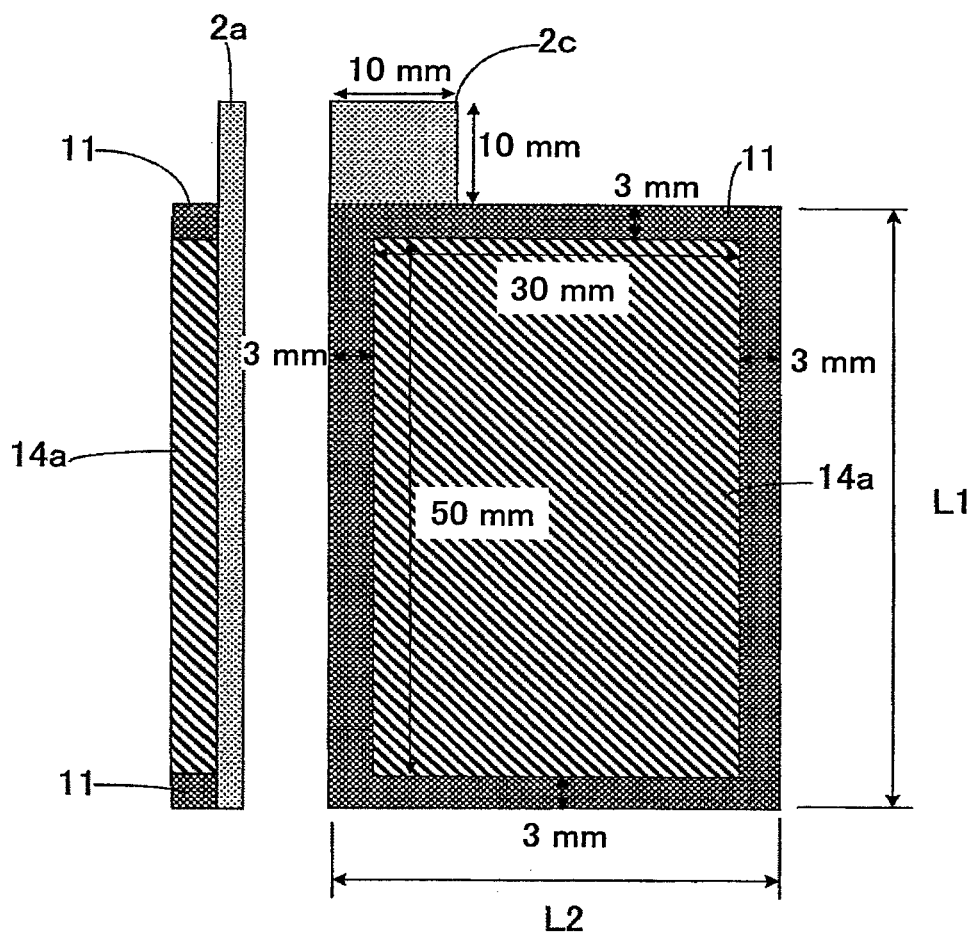

[Fig. 14]
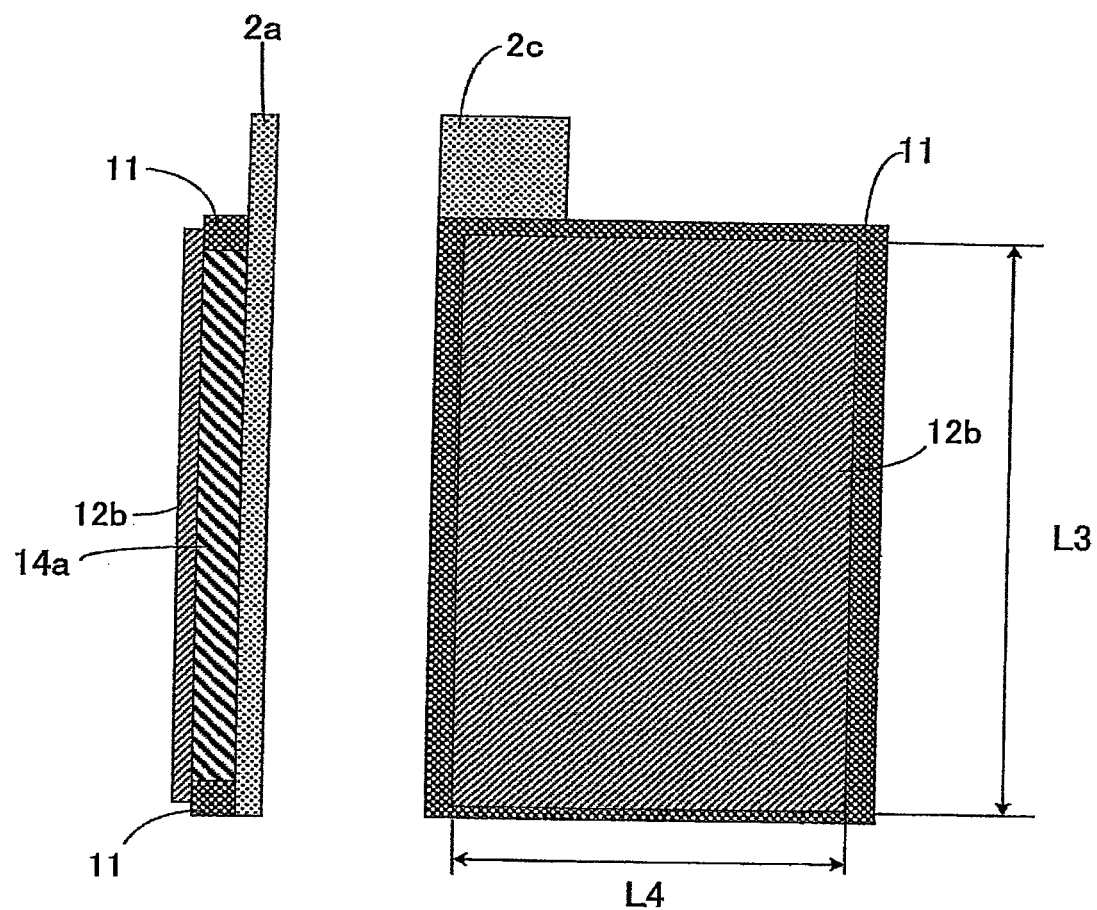

[Fig. 15]
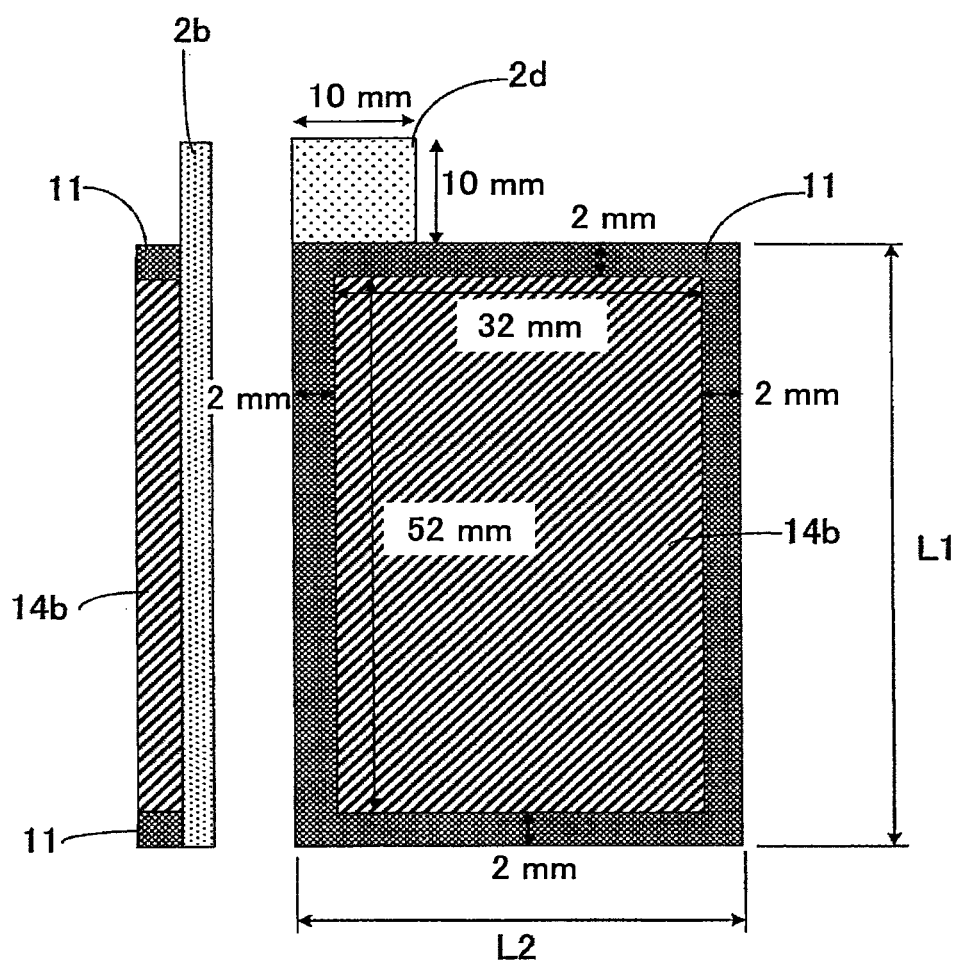

[Fig. 16]
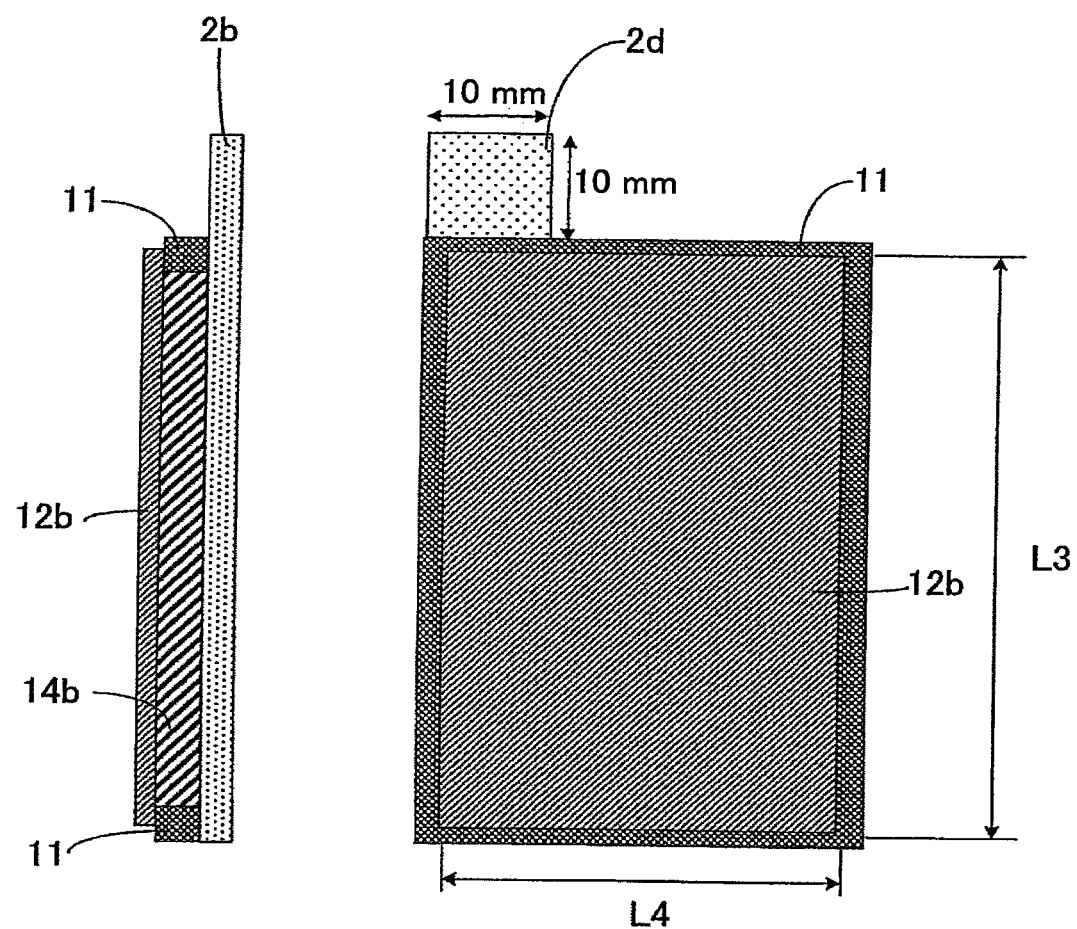

[Fig. 17]
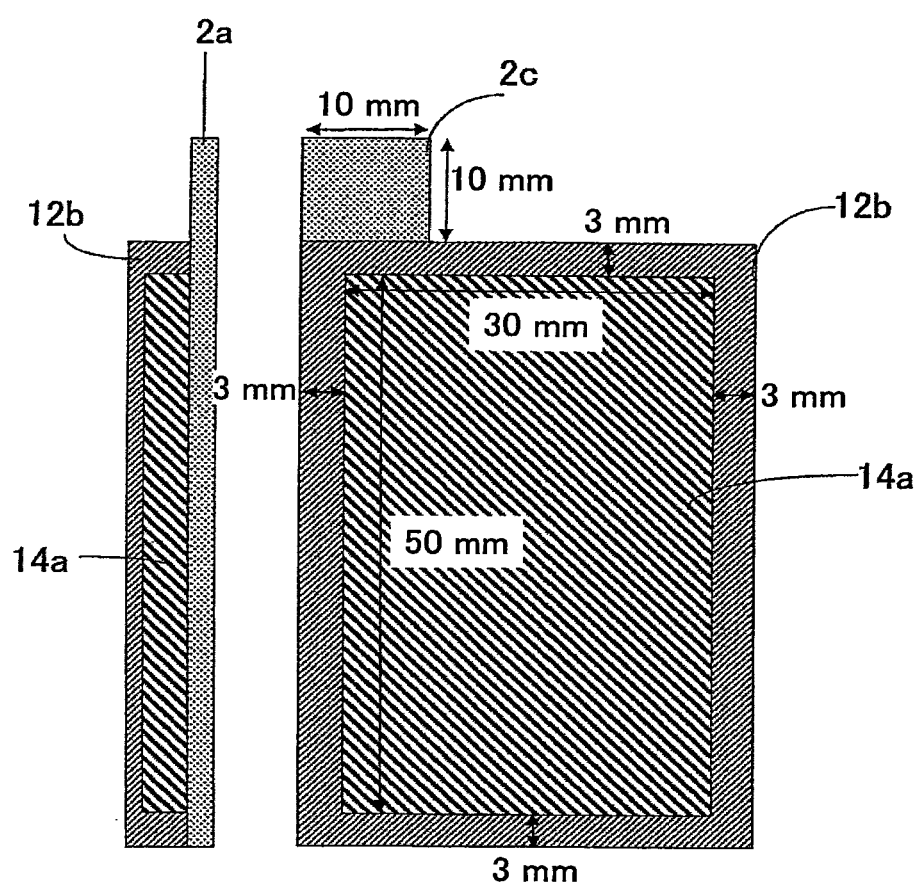

[Fig. 18]
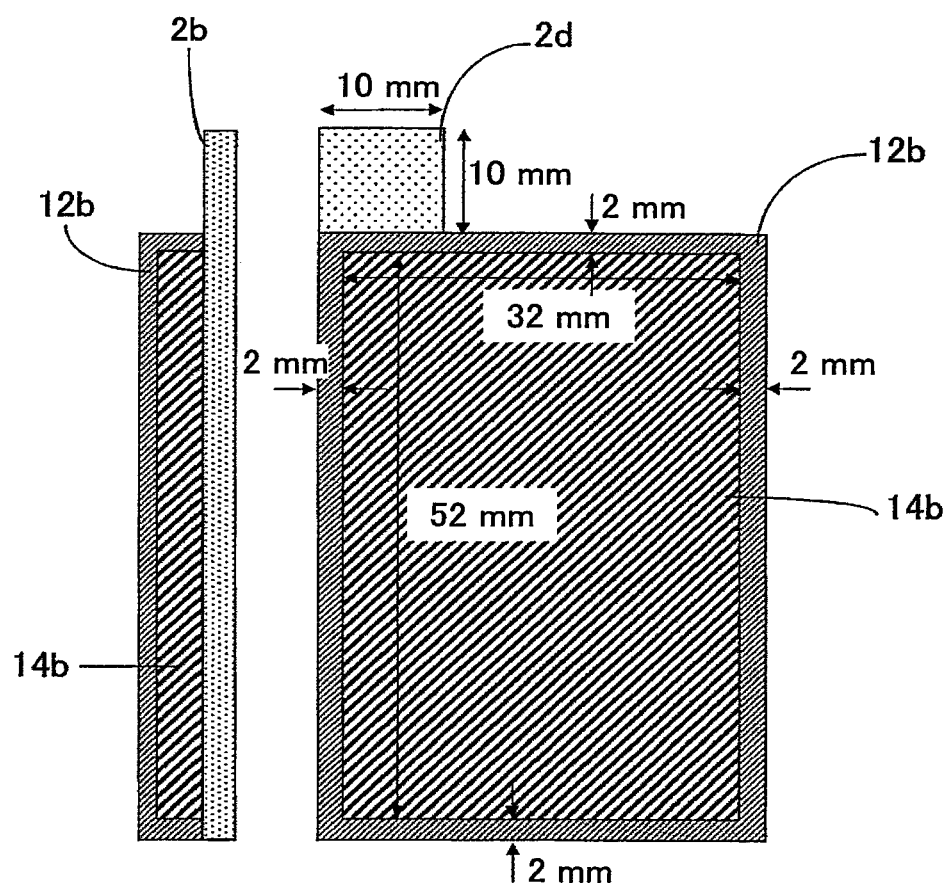

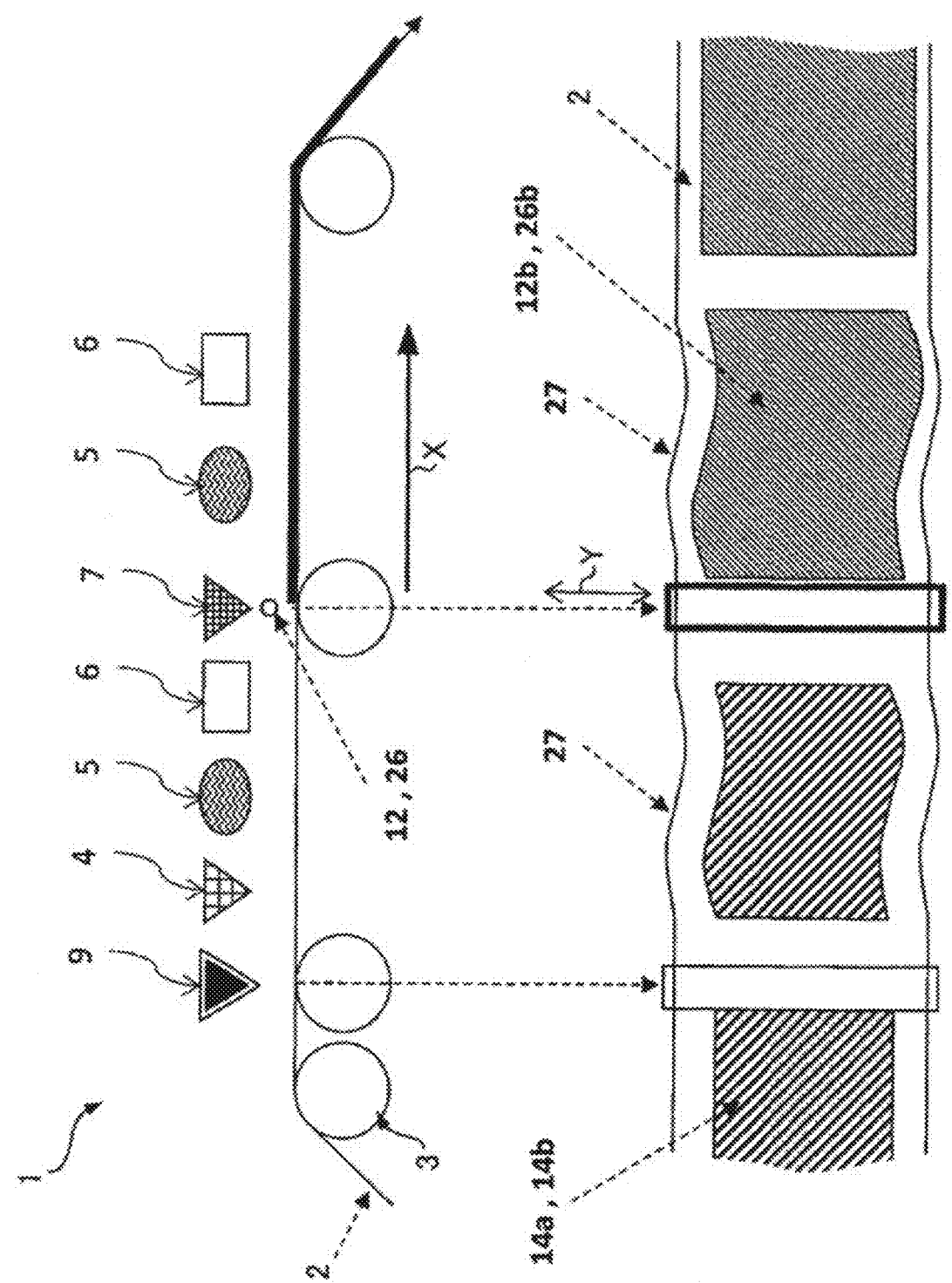
[Fig. 19]

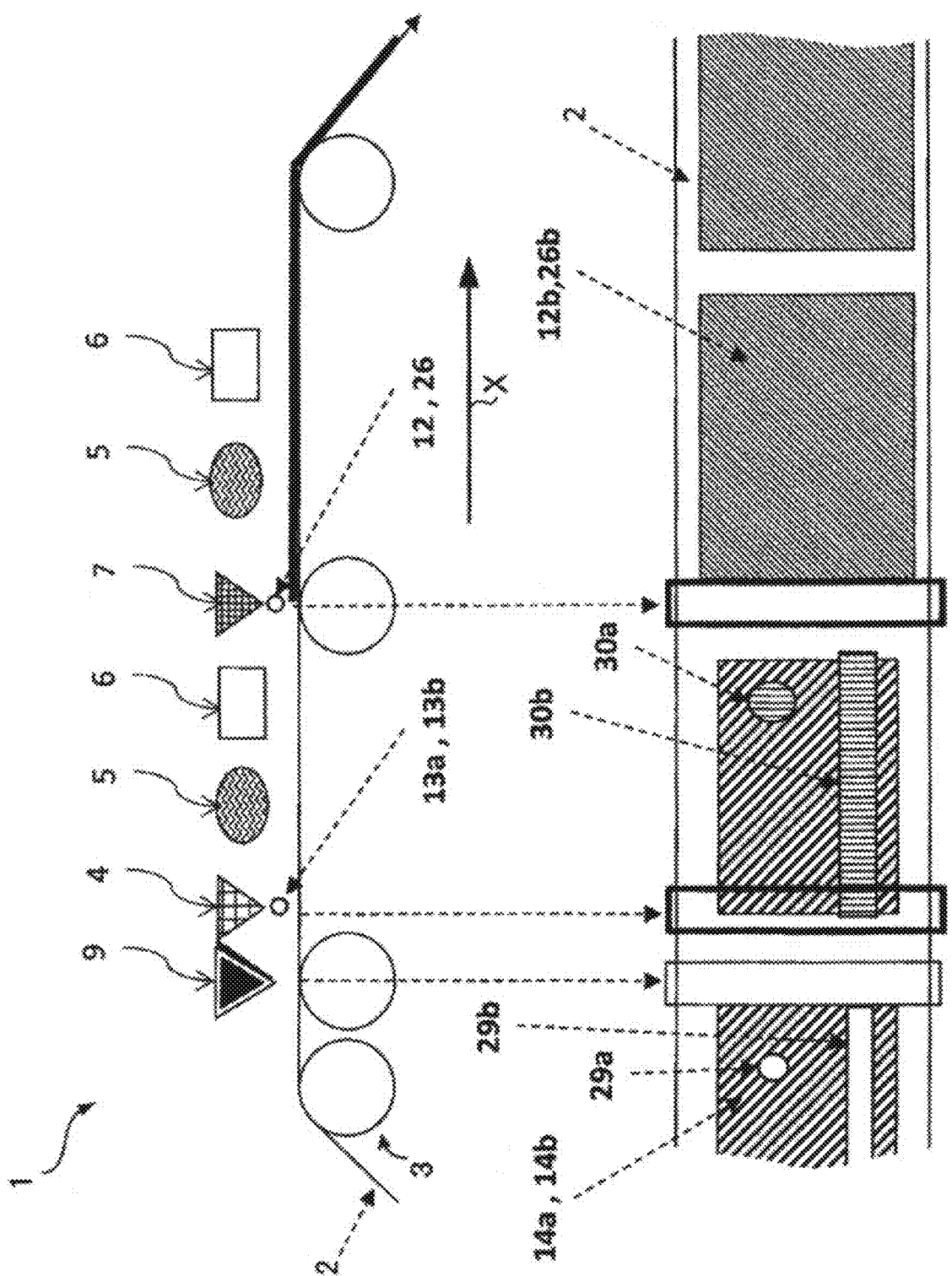
[Fig. 20]

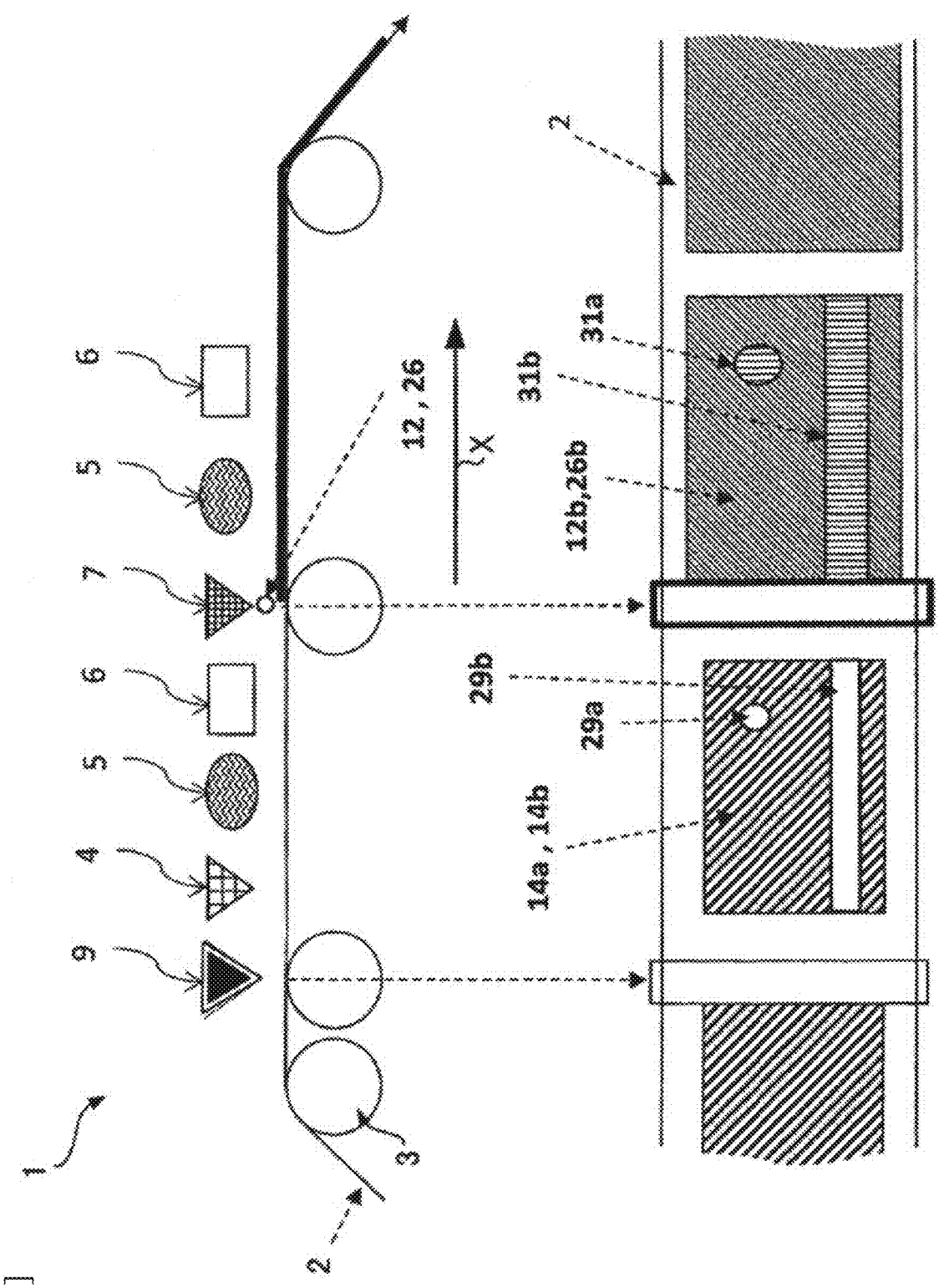
[Fig. 21]

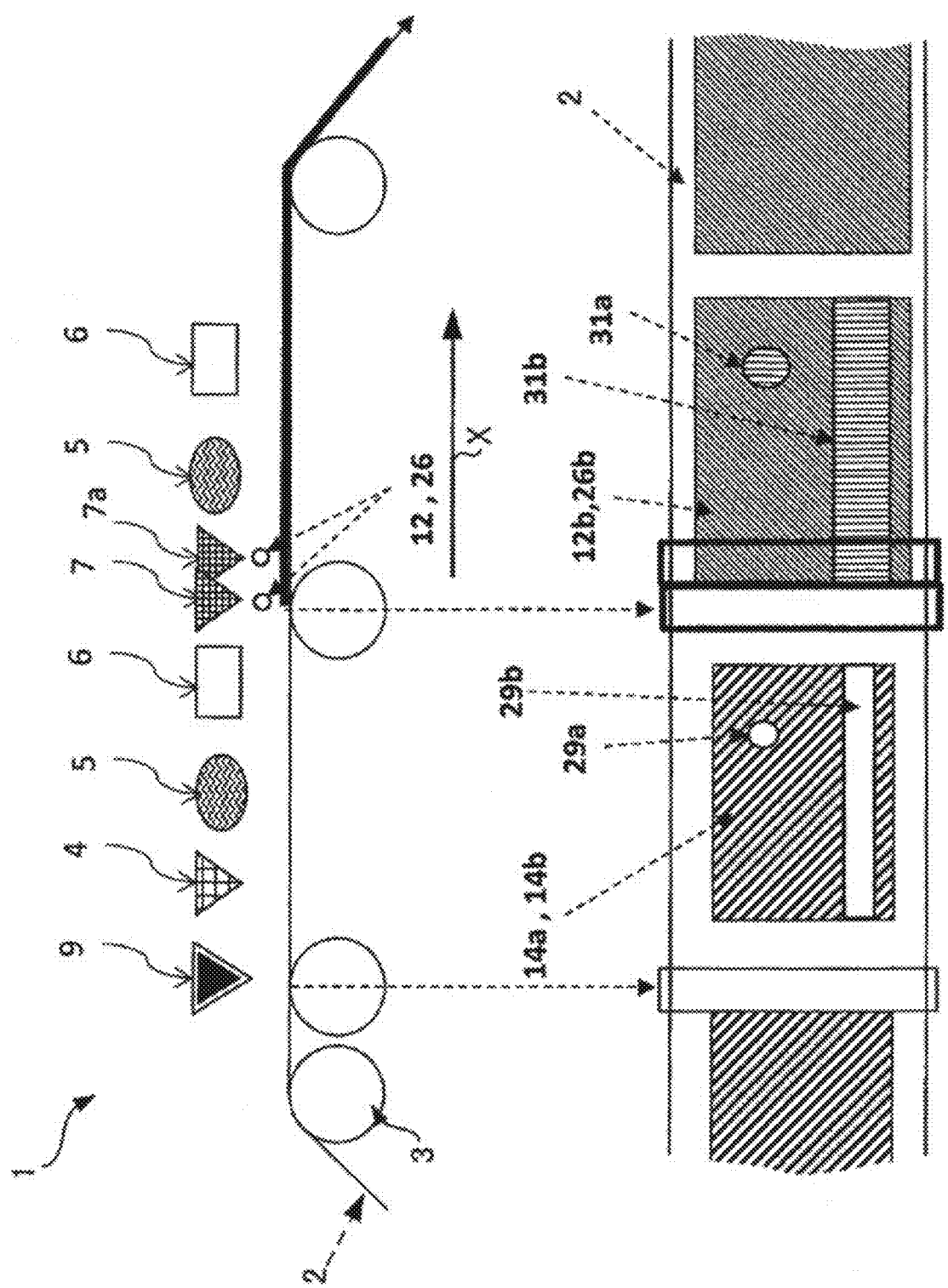
[Fig. 22]

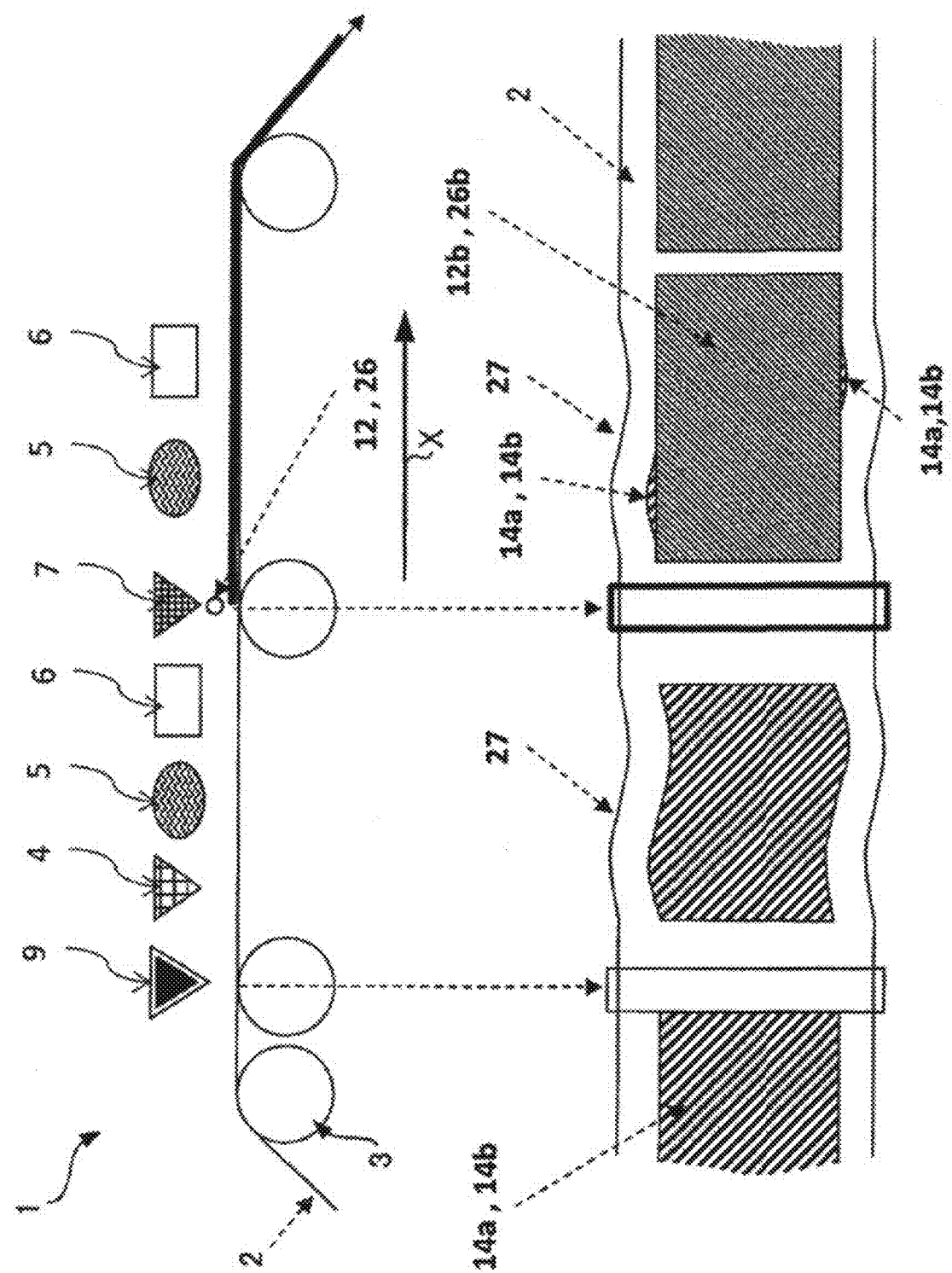
[Fig. 23]

[Fig. 24]
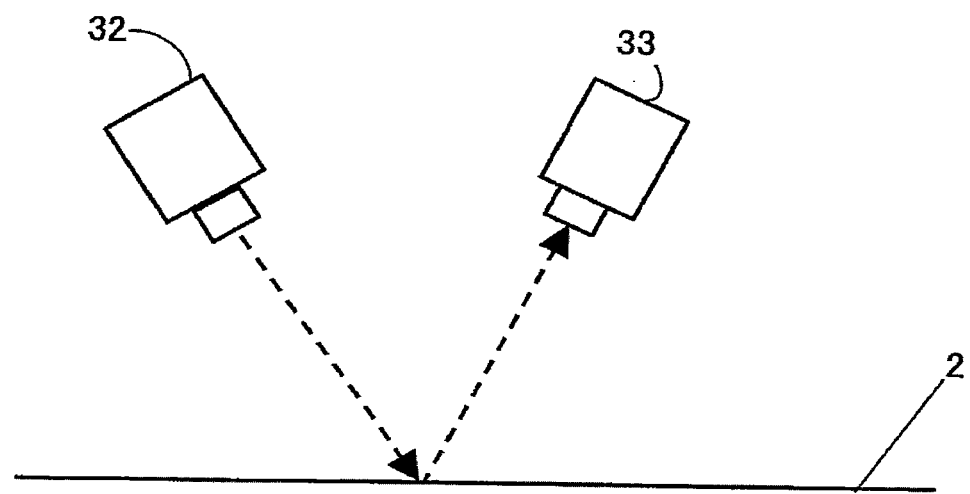
[Fig. 25]
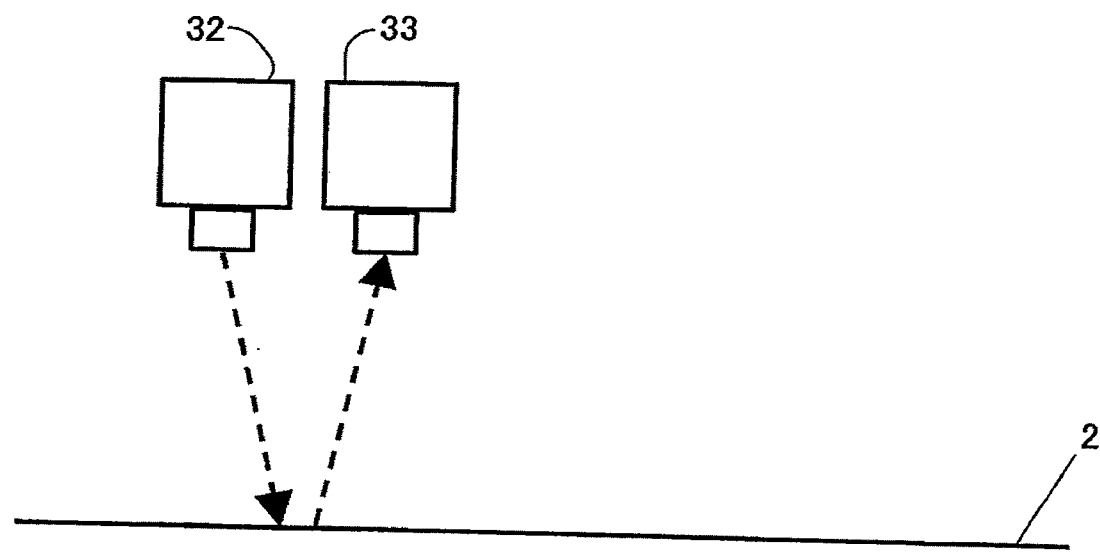

[Fig. 26]
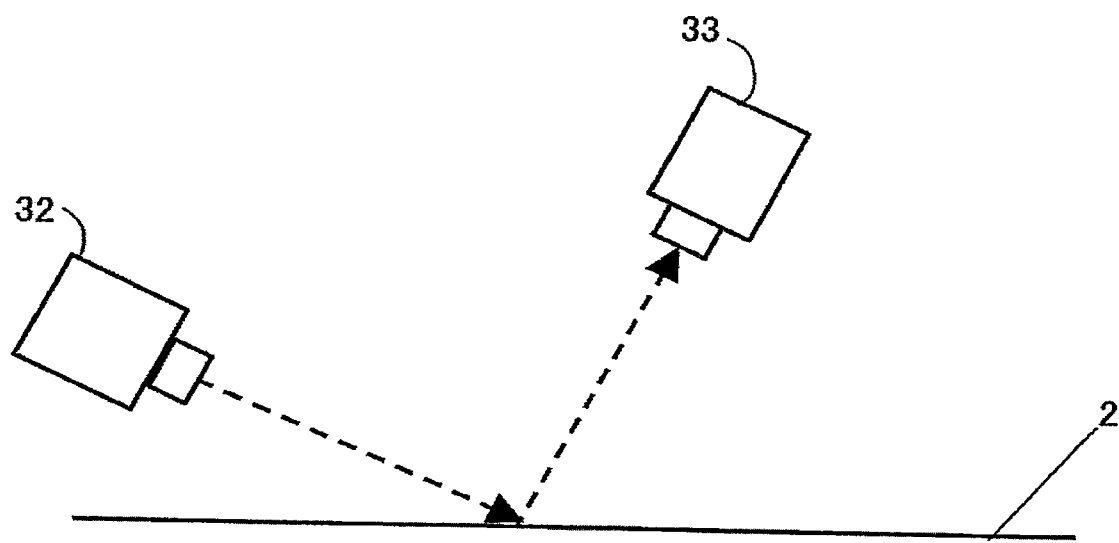
[Fig. 27]
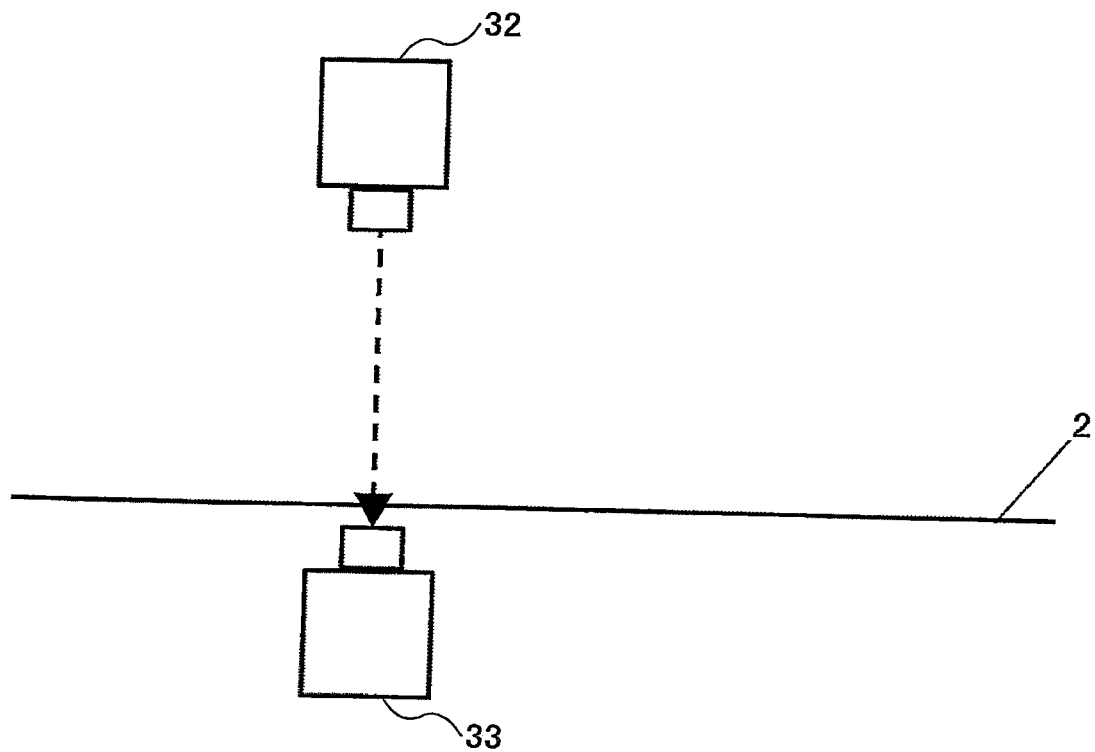

FILM ELECTRODE, RESIN LAYER FORMING INK, INORGANIC LAYER FORMING INK, AND ELECTRODE PRINTING APPARATUS

CROSS-REFERENCE TO RELATED APPLICATIONS

This application is a continuation of U.S. application Ser. No. 16/490,323, filed on Aug. 30, 2019, which was the National Stage entry under § 371 of International Application No. PCT/JP2018/008411, filed on Mar. 5, 2018, and which claims the benefit of priority to Japanese Application No, 2017-042121, filed on Mar. 6, 2017; priority to Japanese Application No, 2017-196274, filed on Oct. 6, 2017; and priority to Japanese Application No. 2018-022573, filed on Feb. 9, 2018. The content of each of these applications is hereby incorporated by reference in its entirety.

TECHNICAL FIELD

The disclosures discussed herein relate to a film electrode, a resin layer forming ink, an inorganic layer forming ink, and an electrode printing apparatus.

BACKGROUND ART

Related-art electrodes for use in electric storage devices such as batteries, power generation devices such as fuel cells, photovoltaic power generation devices, or the like are formed by dispersing a powdery active substance or a catalyst composition in a liquid, applying the resulting liquid to an electrode base, and stabilizing and drying the resulting liquid on the electrode base. To apply such a liquid to the electrode base, printing is generally performed by a spray, a dispenser, a die coater, a pull-up coating, and an ink jet head. With respect to an increase in the production speed along with the market expansion, these electrodes have a trade-off relationship in the positional accuracy of a coated end and defect density; this may have led to defects in the market or to lower yields and productivity caused by manufacturing devices for excluding these defects.

Meanwhile, as the demand for higher output, higher capacity, and longer life of these devices is increasing, various problems due to quality of such electrodes are occurring. For example, when devices having defects in the electrode surface, the electrode end face, or the electrode interface that are left unfixed are shipped out to the market, a specific substance may be deposited on the defect site, short circuit may occur due to mechanical contact to the electrode interface, leakage or the like may occur according to aging or vibration; this may cause undesired ignition in the devices and reduction in useful life.

In order to manage the undesired results, it is desirable to feed back the coating amount and the cutting position of the electrode while tracing the position information of the electrode end to improve the accuracy of the coating width, which is known to result in a decrease in a margin of overlapped misalignment of the electrode or improvement of the cutting accuracy of the electrode, and the like.

Despite such management, there still remain unresolved difficulties, examples of which include an increase in variability due to an increase in production speed and in high density of batteries, lowering of the margin of overlapping, roughness of the cut surface, cracking of the active material, exposure of the surface of the electrode conductor due to exfoliating of the active material.

As a technique for partially coating the electrode with the resin, a method of forming an insulating layer made of an insulating resin film is known in the art in order to develop corrosion resistance and adhesiveness around the electrode tab constituting the lithium ion battery (e.g., Patent Document 1).

Further, as a technique for reducing a short circuit of the exposed portion of the electrode, the following short circuit preventing techniques are known in the art. For example, the techniques may include: a technique of forming a resin layer such as polyvinylidene fluoride (hereinafter simply referred to as "PVDF") on the electrode end on a protruded exposed portion of the positive electrode current collector (reference example of Patent Document 2), a technique of bonding an electrically powered material such as alumina with a binder resin to form an insulating film (Patent Document 3), and a technique of coating a resin film using a heat-resistant resin as a base, which is an insulating resin film (a film having a two-layer structure) containing a thermoplastic resin (Patent Document 4).

Further, a technique of covering the whole electrode surface with a layer made of organic fiber that functions to prevent defects on electrode end faces and electrode surfaces may be proposed in Patent Document 5, and the like.

The technique described in Patent Document 1 is a technique for forming an insulating layer at a specific portion around an electrode tab of a lithium ion battery, which is fundamentally different from the configuration of a film electrode according to the present invention. That is, the deposition of a specific substance on defects at electrode surfaces, electrode end faces or electrode interfaces caused by electrodes, and short-circuits, leaks, etc. due to mechanical contact of the interface may remain as fundamental problems.

In the technique described in Patent Document 2, it is difficult to control the film thickness in the coating only at the end of the electrode, and the resin is liable to peel off in the subsequent processes.

In the technique described in Patent Document 3, although the peeling resistance is improved, the powder is brittle due to its hardness and may fall off easily in the subsequent processes.

In the technique described in Patent Document 4, there may be difficulties from increasing the number of steps and in controlling the thickness at the end portion of the collecting electrode in the formation of the film having the two-layer structure. Likewise, in the technique described in Patent Document 5 in which the entire surface of the electrode is covered with a fibrous resin, it is difficult to control the uniformity of the thickness, adhesiveness with the electrode is poor, and physical damage of the film is likely to occur.

CITATION LIST

Patent Literature

[PTL 1] Japanese Patent No. 4730038
[PTL 2] Japanese Patent No. 4201619
[PTL 3] Japanese Patent No. 4177612
[PTL 4] Japanese Patent No. 5005935
[PTL 5] Japanese Patent No. 5801446

SUMMARY OF INVENTION

Technical Problem

The present invention has been made in view of the above-described difficulties, and it is an object of the present invention to provide a film electrode having high quality which is less liable to deposit a specific substance on a defect occurring in an electrode surface, an electrode end face, or an electrode interface, less liable to cause a short circuit due to a mechanical contact of an interface, or less liable to cause leakage.

Solution to Problem

According to at least one embodiment of the present invention, a film electrode having an active material layer on an electrode base is provided. The film electrode includes a resin layer adhering to at least one of a peripheral portion of the active material layer and a surface of the active material layer extending along a plane of the electrode base.

The above-described embodiments and examples of the present invention will provide a high quality film electrode, which will not exhibit short circuit or leakage due to deposition of specific substances on defects at electrode surfaces, electrode end faces, or electrode interfaces, or due to mechanical contact of the interfaces.

BRIEF DESCRIPTION OF DRAWINGS

FIG. 1 is a view schematically depicting an electrode printing apparatus according to an embodiment of the present invention;

FIG. 2A is a schematic cross-sectional view depicting a main manufacturing process on a front surface of a film electrode according to an embodiment;

FIG. 2B is a schematic cross-sectional view depicting a main manufacturing process on a front surface of a film electrode according to an embodiment;

FIG. 2C is a schematic cross-sectional view depicting a main manufacturing process on a front surface of a film electrode according to an embodiment;

FIG. 2D is a schematic cross-sectional view depicting a main manufacturing process on a front surface of a film electrode according to an embodiment;

FIG. 2E is a schematic cross-sectional view depicting a main manufacturing process in which the same process is applied to a rear surface to form an active material layer and a resin layer on both front and rear surfaces of the electrode base;

FIG. 3A is a plan view of a positive electrode prior to tab punching;

FIG. 3B is a plan view of a negative electrode prior to tab punching;

FIG. 4A is a plan view of a positive electrode in a completed state;

FIG. 4B is a cross-sectional view taken along line Sb-Sb of FIG. 4A;

FIG. 4C is a plan view of a negative electrode in a completed state;

FIG. 4D is a cross-sectional view taken along line Sd-Sd of FIG. 4C;

FIG. 5A is an enlarged view depicting a part of a configuration of a testing battery;

FIG. 5B is a cross-sectional view depicting the configuration of the testing battery of 5A;

FIG. 6 is a cross-sectional view depicting a configuration of a film electrode according to another embodiment;

FIG. 7 is a cross-sectional view depicting a configuration of a film electrode according to another embodiment differing from that in FIG. 6;

FIG. 8 is a cross-sectional view depicting a configuration of a film electrode according to another embodiment differing from that in FIG. 6 or FIG. 7;

FIG. 9A is a cross-sectional view depicting a configuration of a film electrode according to another embodiment differing from FIG. 6, FIG. 7, or FIG. 8;

FIG. 9B is a cross-sectional view depicting a configuration of a film electrode according to another embodiment differing from FIG. 6, FIG. 7, FIG. 8, or FIG. 9A;

FIG. 10A is a view schematically depicting a main part of a manufacturing process of the film electrode depicted in FIGS. 6, 7, 8, 9A and 9B, in which steps (a) to (e) out of (a) to (k) steps;

FIG. 10B includes views depicting steps (f) to (i) following the step of (e) of FIG. 10A;

FIG. 10C includes views depicting steps (j) and (k) following the step of (i) of FIG. 10B, where (k) depicts the same step applied to the rear surface so as to form an active material layer and a resin layer on both the front and the rear surfaces;

FIG. 11A is an enlarged view depicting a part of a testing battery of FIG. 11B that is obtained as a result of laminating the film electrode of FIG. 8;

FIG. 11B is a cross-sectional view depicting a configuration of the testing battery;

FIG. 12A is an enlarged view depicting a part of a testing battery of FIG. 12B that is obtained as a result of laminating the film electrode of FIG. 9A;

FIG. 12B is a cross-sectional view depicting a configuration of the testing battery;

FIG. 13 is a view illustrating dimensions of a positive electrode according to an embodiment;

FIG. 14 is a completion view of an electrode in the positive electrode of FIG. 13;

FIG. 15 is a view illustrating dimensions of a negative electrode according to an embodiment;

FIG. 16 is a completion view of an electrode in the negative electrode of FIG. 15;

FIG. 17 is a view illustrating dimensions of a positive electrode according to another embodiment;

FIG. 18 is a view illustrating dimensions of a negative electrode according to another embodiment;

FIG. 19 is a view schematically depicting a correcting method by an electrode printing apparatus according to an embodiment of the present invention;

FIG. 20 is a view schematically depicting a correcting method by an electrode printing apparatus according to an embodiment differing from that in FIG. 19;

FIG. 21 is a view schematically depicting a correcting method by an electrode printing apparatus according to an embodiment differing from those in FIGS. 19 and 20;

FIG. 22 is a view schematically depicting a correcting method by an electrode printing apparatus according to an embodiment differing from those in FIGS. 19, 20 and 21;

FIG. 23 is a view schematically depicting a comparative example which does not implement a special correction method according to the embodiment;

FIG. 24 is a view depicting an electrode detection configuration of an image recognition apparatus according to one embodiment;

FIG. 25 is a view illustrating an electrode detection configuration differing from that in FIG. 24;

FIG. 26 is a view illustrating an electrode detection configuration differing from those in FIGS. 24 and 25; and FIG. 27 is a view illustrating an electrode detection configuration differing from those in FIGS. 24, 25 and 26.

DESCRIPTION OF EMBODIMENTS

In the following, embodiments of the present invention will be described with reference to the accompanying drawings. Components (members and constituent parts) having the same or similar functions and shapes and the like are denoted by the same reference numerals throughout respective embodiments and the like, and duplicated explanations are omitted.

A film electrode according to at least one embodiment of the present invention is formed by forming an active material layer on an electrode base and includes at least one of a resin layer or inorganic layer that is in close contact with at least one of a peripheral portion of the active material layer and a surface of the active material layer extending along a plane of the electrode base. Furthermore, the film electrode is desirable in a case where the electrode base is a conductive foil. Note that "at least one of the peripheral portion of the active material layer and the surface of the active material layer" indicates the same as "the peripheral portion of the active material layer and/or the surface of the active material layer", and in the following description, and hereinafter may be expressed as the latter. Further, "at least one of a resin layer and an inorganic layer" indicates the same as "a resin layer and/or an inorganic layer", and hereinafter may be expressed as the latter. In addition, "extending along a plane of the electrode base" may also be expressed "extending parallel to the planar electrode base".

Such an electrode base (electrode layer) is an electric conductive foil having planarity, and may be suitably used for secondary batteries which are generally electric storage devices, capacitors, in particular, lithium ion secondary batteries. As the electric conductive foil, an aluminum foil (hereinafter referred to as "aluminum foil"), a copper foil, a stainless steel foil, a titanium foil, an etched foil having micro holes formed by etching these foils, and a perforated electrode base used for a lithium ion capacitor may be used.

As such an electrode base, a carbon paper fibrous electrode used in a power generation device such as a fuel cell in a nonwoven or woven planar form or a perforated electrode base having fine pores, among the perforated electrode bases, may be used.

Such an active material layer is formed by dispersing or dissolving a powdery active substance or a catalyst composition in a liquid and coating (applying), fixing, and drying such a liquid on the electrode base. In order to form the active material layer, printing using a spray, a dispenser, a die coater or a pull-up coating is usually used, and after the application by printing, the liquid applied electrode is subsequently dried to form an active material layer.

Further, in a case where such an active material layer is formed by on-demand printing such as electrophotography or liquid development type electrophotography, the electrode shape may be changed into any shape. Furthermore, in a case where the electrode base is a thin conductive foil such as an aluminum foil, printing is performed with position control of a specific pattern in a non-contact manner. Accordingly, it is preferable to perform printing by a method of a liquid ejection system such as an inkjet method using a liquid ejection head, a dispenser, a jet nozzle, etc., and among these, the inkjet method is specifically preferable.

The positive electrode active material is not particularly specified insofar as the material is capable of reversibly absorbing and releasing alkali metal ions. Typically, an alkali metal-containing transition metal compound may be used as a positive electrode active material. For example, as the lithium-containing transition metal compound, a composite oxide containing at least one element selected from a group consisting of cobalt, manganese, nickel, chromium, iron and vanadium and lithium may be given. Examples of such a composite oxide may include lithium-containing transition metal oxides such as lithium cobalt oxide, lithium nickel oxide and lithium manganate, olivine type lithium salts such as LiFePO4, chalcogen compounds such as titanium disulfide and molybdenum disulfide, manganese dioxide, and the like.

The lithium-containing transition metal oxide is a metal oxide containing lithium and a transition metal or a metal oxide in which a part of the transition metal in the metal oxide is substituted by a hetero-element. Examples of the hetero-elements include Na, Mg, Se, Y, Mn, Fe, Co, Ni, Cu, Zn, Al, Cr, Pb, Sb, B and the like. Among these, Mn, Al, Co, Ni and Mg may be preferable. The hetero-element may be one type or two types or more. The hetero-element may be one type or two types or more. These positive electrode active materials may be used alone or in combination of two or more. As the active material in the nickel metal hydride battery, nickel hydroxide and the like may be given.

The negative electrode active material is not particularly specified insofar as the material is capable of reversibly absorbing and releasing alkali metal ions. Typically, a carbon material including graphite having a graphite type crystal structure may be used as a negative electrode active material. Examples of such a carbon material include natural graphite, spherical or fibrous artificial graphite, non-graphitizable carbon (hard carbon), easily graphitizable carbon (soft carbon), and the like. As a material other than the carbon material, lithium titanate may be given. rom the viewpoint of increasing the energy density of a lithium ion battery, high capacity materials such as silicon, tin, silicon alloy, tin alloy, silicon oxide, silicon nitride, tin oxide and the like may also be suitably used as the negative electrode active material.

As an example of the hydrogen storage alloy as the active material in the nickel metal hydride battery, an AB2 type or A2B type hydrogen storage alloy represented by Zr—Ti—Mn—Fe—Ag—V—Al—W, Ti15Zr21V15Ni29Cr 5Co5Fe1Mn8 and the like may be given.

Examples of a binder of the positive electrode or the negative electrode may include PVDF, polytetrafluoroethylene (PTFE), polyethylene, polypropylene, aramid resin, polyamide, polyimide, polyamideimide, polyacrylonitrile, polyacrylic acid, polyacrylic acid methyl ester, poly acrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyethersulfone, hexafluoro polypropylene, styrenic butadiene rubber, carboxymethyl cellulose and the like.

Further, copolymers of two or more types of materials selected from tetrafluoroethylene, hexafluoroethylene, hexafluoropropylene, perfluoroalkyl vinyl ether, vinylidene fluoride, chlorotrifluoroethylene, ethylene, propylene, pentafluoro-propylene, fluoromethylvinylether, acrylic acid, hexadiene may also be used as a binder of the positive electrode or the negative electrode. Note that two or more types selected from the above-described materials may be mixed.

Examples of a conductive agent contained in the electrode include carbon blacks such as natural graphite and artificial graphite graphite, acetylene black, ketjen black, channel black, furnace black, lamp black, thermal black and the like, carbon fiber, metal fiber and the like; metal powders such as carbon fluoride and aluminum; conductive whiskers such as zinc oxide and potassium titanate; conductive metal oxides such as titanium oxide; organic conductivity materials such as phenylene derivatives, graphene derivatives, and the like.

In the active material in the fuel cell, as a catalyst of a cathode electrode and an anode electrode, a catalyst obtained by allowing a catalyst carrier such as carbon to carry metal fine particles such as platinum, ruthenium, platinum alloy or the like may be generally used. In order to allow the surface of the medium carrier to carry the catalyst particles, for example, a catalyst carrier is suspended in water, a precursor of the catalyst particles is added and dissolved in a suspension (containing alloy components such as chloroplatinic acid, dinitrodiamino platinum, platinum chloride, platinum chloride, bisacetylacetonatoplatinum, dichlorodiammine platinum, dichlorotetramine platinum, secondary platinum ruthenate chloride ruthenic acid chloride, iridic acid chloride, chlorinated rhodium acid, chloride diiron, cobalt chloride, chromium chloride, gold chloride, silver nitrate, rhodium nitrate, palladium chloride, nickel nitrate, iron sulfate, copper chloride), and an alkali is added to produce a metal hydroxide and a catalyst carrier carrying the metal hydroxide on the surface of the catalyst carrier. Such a catalyst carrier is coated on an electrode and reduced in a hydrogen atmosphere or the like to obtain an electrode coated with catalyst particles (active material) on the surface.

The resin layer and/or the inorganic layer according to one embodiment of the present invention may be formed by initially forming a desired electrode pattern, such as an insulating frame by a coating method having relatively high precision, such as screen printing, gravure coating, inkjet coating, dispenser drawing, and the like. Subsequently, a slurry-like active material is applied to the pattern and the resulting product is dried. As a result, in a case of extremely increasing the formation rate of the active material layer, or in a case of forming a relatively thick film from slurry having a limited viscosity, it is also possible to form an active material having a desired size to be in contact with the electrode base in the subsequent drying step, thereby constantly implementing the desired coating size.

Accordingly, the properties required for such a resin layer and/or inorganic layer may include accurate applicability and drying property with respect to the electrode base, and a property of being hardly dissolved in the electrolytic solution for use in the above-described obtained active material or in the electrolytic solution for use in the finally obtained device. That is, the resin layer and/or the inorganic layer in the peripheral portion of the active material layer is an insulating film. The insulating property in this context may preferably indicate an insulating property on an order of mega ohm/cm or more in the thickness direction. Further, since the insulation of the resin layer and/or the inorganic layer may need to be maintained for a long time in the device, the resin layer or the inorganic layer may need to be hardly dissolved in the electrolytic solution. Therefore, it is difficult to achieve these properties only with a resin dissolved in typical organic solvents, and a resin group having a property not requiring crosslinking due to heat, ionizing radiation or the like after application and other like properties may be preferable. Alternatively, the inorganic material may preferably be fine particles having insulating properties that are dispersed in a solvent and form a film having an insulating property by being dried after the application. Furthermore, the resin layer and/or the inorganic layer preferably has resistance to the above-mentioned line pressure because there is a pressing step with a linear pressure of approximately 250 kN at maximum in the process of electrode machining.

Next, in order to form the above resin layer, at least one of a resin and a precursor of the resin (a resin and/or a precursor of the resin) according to an embodiment of the present invention which is dissolved in a liquid (Hereinafter also referred to as "liquid ink" or "functional ink") will be described first.

As such a resin and a precursor of the resin, those obtained by dissolving a resin or an oligomer having a crosslinkable structure in the molecule by ionizing radiation or infrared (heat) in an organic solvent (organic solvent) acting as a liquid may be preferable. As such a resin and a precursor of the resin, a low molecular weight oligomer precursor of a polyimide resin, a polyester resin, a polyamide resin, a polyolefin resin and an acrylic resin, or a part of the resin modified with a hydrocarbon group having an aliphatic unsaturated bond may be preferable, and those having an unsaturated bond such as an allyl group, an allyloxy group, an acryloyl group, a butenyl group, a cinnamyl group, a cinnamoyl group, a crotaloyl group, a cyclohexadienyl group, an inpropenyl group, a methacryloyl group, a pentenyl group, a propenyl group, a styryl group, a vinyl group, a butadienyl group, and the like, on a part of the side chain of the acrylic copolymer may be preferable.

Furthermore, with respect to polybutylene terephthalate polyethylene teraphthalate, polyacrylonitrile, polyvinylidene fluoride, polyether ketone, polyethylene naphthalate, polysulfone, polyimide, polyester, polypropylene, polyoxymethylene, polyamide, polyvinyl pyrrolidone, cellulose and the like, it is possible to increase the insolubility/crosslinking property after fixing by using a relatively low molecular weight dispersion precursor or cellulose nanofiber having a molecular weight of 10,000 or less and heating them with ionizing radiation or infrared ray.

Further, in order to enhance the crosslinking property of these precursors, the precursors may contain a maximum of approximately 30 parts by weight of azide compounds. Examples of azide compounds include 3,3'-dichloro-4,4'-diazidodiphenylmethane, 4,4'-diazidodiphenyl ether, 4,4'-diazidodiphenyl disulfide, 4,4'-diazidodiphenyl sulfide, 4,4'-diazidodiphenylsulfone, 4-azidochalcone, 4-azido-4'-hydroxychalcone, 4-azido-4'-methoxychalcone, 4-azido-4'-morpholinochalcone, 4-dimethylamino-4'-azidochalcone, 2,6-bis(4'-azidobenzal)-4-methylcyclohexanone, 2,6-bis(4'-azidobenzal)-cyclohexanone, cinnamylidene-4-azidoacetophenone, 4-azidocinnamylidene acetophenone, 4-azido-4'-dimethylaminocinnamylidene acetophenone, cinnamylidene-4-azidocinnamylidene acetone, 2,6-bis(4'-azidocinnamylidene)-4-methylcyclohexanone, 2,6-bis(4'-azidocinnamylidene)-cyclohexanone, 1,4'-azidobenzylidene indene, 1,4'-azidobenzylidene indene, 1,4'-azidobenzylidene-3-α-hydroxy-4"-azidobenzylindene, 9,4'-azidobenzylidenefluorene, 9,4'-azido cinnamylidene fluorene, 4,4'-diazidostilbene-2,2'-disulfonyl-N-(p-methoxyphenyl) amide, 4,4'-diazidostilbene-2,2'-disulfonyl-N-(p-hydroxyethylphenyl)amide, 4,4'-diazidostilbene-2,2'-disulfonyl-N-(p-hydroxyphenyl)amide, 4,4'-diazidostilbene-2,2'-disulfonylamide, 4,4'-diazidobenzophenone, 4,4'-diazidostilbene, 4,4'-diazidochalcone, 4,4'-diazidobenzalacetone, 6-azido-2-(4'-azidostyryl) benzimidazole, 3-azidobenzylideneaniline-N-oxy-p(4-azidobenzylideneamido)benzoic acid, 1,4-bis(3'-azi-1-zetastyryl)benzene, 3,3'-diazidodiphenylsulfone, and 4,4'-diazidodiphenylmethane.

Among these, in particular, 2.6-bis-(4'-azidobenzal)-4-methylcyclohexanone and the like may be suitably used. Solvents that dissolve these materials are not particularly specified; however, those capable of dissolving the above-mentioned compounds and having a boiling point and surface tension suitable for subsequent coating or drying step may be prepared by using them alone or in combination.

Next, a liquid ink as a resin layer forming ink containing a polymerization initiator according to an embodiment of the present invention configured to initiate polymerization upon irradiation with at least one of ionizing radiation and infrared radiation (ionizing radiation and/or infrared ray) and a polymerizable compound will be described first.

A preferable example of a resin compound that is cured with heat or ionizing radiation may be a liquid ink including a polymerizable monomer such as a photosensitive liquid ink and a compound capable of generating radicals or acids with heat or ionizing radiation, which is coated on the electrode base and then solidified.

As a low-viscosity monomer of radical polymerization, for example, an acrylic compound as disclosed in Japanese Patent No. 3417733 may be suitably used as a monomer. Examples of such monomers include acrylic or methacrylic acid-added ester compounds which may be obtained by epoxidizing the double bond of terpene having unsaturated linkage such as myrcene, carene, ocimene, pinene, limonene, camphene, terpinolene, tricyclene, terpinene, fenchene, phellandrene, sylvestrene, sabinene, dipentene, bornene, isopregol, carvone, and the like.

Alternative examples of such monomers include ester compounds to be derived from acrylic acid or methacrylic acid and alcohols originated from terpene such as citronellol, pinocampheol, geraniol, phentyl alcohol, nerol, borneol, linalol, menthol, terpineol, thujyl alcohol, citroneral, ionone, irone, cinerol, citral, pinol, cyclocitral, car-vomenthone, ascaridole, safranal, piperitol, menthenemonol, dihydrocarvone, carveol, sclareol, manool, hinokiol, ferruginol, totarol, sugiol, farnesol, patchouli alcohol, nerolidol, carotol, cadinol, lantheol, eudesmol, phytol, and the like. Further, examples of the monomers include acrylic or methacrylic compounds, acrylate or methacrylate monomers, styrene-based monomers, or oligomer compounds having a plurality of vinyl-based polymerizable groups, each of these compounds having, on their ester side chains, a skeleton such as citronellic acid, hinokiic acid, santalic acid, menthone, car-votanacetone, phellandral, pimelitenone, peryl aldehyde, thujone, carone, tagetone, camphor, bisabolene, santalene, zingiberene, caryophyllene, curcumene, cedrene, cadinene, longifolene, sesquibenihene, cedrol, guaiol, kessoglycol, cyperone, ere-mophilone, zerumbone, campholene, podocarprene, mirene, phyllocladene, totalene, ketomanoyl oxide, manoyl oxide, abietic acid, pimaric acid, neoabietic acid, lev-opimaric acid, iso-d-pimaric acid, agathene dicarboxylic acid, rubenic acid, carotenoid, pelary aldehyde, piperitone, ascaridole, pimene, fenchene, sesquiterpenes, diterpenes, triterpenes, and the like.

Further, as the precursor monomer according to an embodiment, a vinyl compound having a low boiling point or a butadiene-styrene based oligomer may be used.

Further, preferable examples include a monomer having fluorine substitution of hydrogen at the α-position of acrylic or having an alkyl group fluorinated on the ester side chain when being provided as an electrode material, and a vinyl monomer in which a hydrogen atom in the structure is fluorinated because use of such monomers may provide electrochemical resistance, in particular, use of such monomers may lower the side reaction in a range of 0 V to 4.5 V with respect to lithium.

In order to enhance a crosslinking property, it may be useful to have a polyacrylate compound of a polyhydric alcohol compound, a polyacrylate compound of polyhydric aromatic alcohol, a polyacrylate compound of a polyhydric alicyclic alcohol, and a styrenic compound having a substituent or the like.

Preferable examples of such monomers include di- or polyacrylate compounds of ethylene glycol, polyethylene glycol, propylene glycol, glycerin, neopentyl alcohol, trimethylol propane, pentaerythritol, vinyl alcohol-based oligomers; di- or polyacrylate compounds of phenol, cresol, naphthol, bisphenol, novolac-based condensation compounds of these aromatic compounds, and vinyl phenolic oligomers; and di- or polyacrylate compounds of hydrogenated cyclohexane, hydrogenated bisphenol, dec-ahydronaphthalene alicyclic compounds, terpene-based alicyclic compounds, and di- or polyhydroxyl compounds of dicyclopentane or tricyclodecane-based alicyclic compounds.

As a photopolymerization initiator which is a polymerization initiator, a photo radical generator may be used. Examples of such a photo radical generator may include photo radical polymerization initiators such as Michler's ketone and benzophenone, which are known under the trade names Irgacure and Darocure. Preferable examples of more specific compounds include benzophenone, acetophenone derivatives, benzoin alkyl ether and ester such as α-hydroxy- or α-aminocetophenone, 4-aroyl-1,3-dioxolane, benzil ketal, 2,2-diethoxyacetophenone, p-dimethylaminoacetophene, p-dimethylaminopmpiophenone, henzophenone, 2-chlombenzophenone, pp'-dichlorobenzophene, pp'-bisdiethylaminobenzophenone, Michler's ketone, benzyl, benzoin, benzyl dimethyl ketal, tetramethyl thiuram monosulfide, thioxanthone, 2-chlorothioxanthone, 2-methylthioxanthone, azobisisobutyronitrile, benzoin peroxide, di-tert-butyl peroxide, 1-hydroxycyclohexyl phenyl ketone, 2-hydroxy-2-methyl-1-phenyl-1-one, 1-(4-isopropylphenyl)-2-hydroxy-one, methyl benzoyl formate, benzoin isopropyl ether, benzoin methyl ether, benzoin ethyl ether, benzoin ether, benzoin isobutyl ether, henzoin n-butyl ether, benzoin n-propyl and the like; 1-hydroxy-cyclohexyl-phenyl-ketone, 2-benzyl-2-dimethylamino-1-(4-morpholinophenyl)-butanone-1, 1-hydroxy-cyclohexyl-phenyl-ketone, 2,2-dimethoxy-1,2-diphenylethan-1-one, bis(η5-2,4-cyclopentadien-1-yl)-bis(2,6-difluoro-3-(1H-pyrrol-1-yl)-phenyl) titanium, bis(2,4,6-trimethylbenzoyl)-phenylphosphine oxide, 2-methyl-1-[4-(methylthio)phenyl]-2-morpholinopropan-1-one, 2-hydroxy-2-methyl-1-phenyl-propan-1-one (Darocure 1173), bis(2,6-dimethoxybenzoyl)-2,4,4-trimethyl-pentylphosphine oxide, 1-[4-(2-hydroxyethoxy)-phenyl]-2-hydroxy-2-methyl-1-propan-1-one monoa-cylphosphine oxide, bisacylphosphine oxide, titanocene, fluorecene, anthraquinone, thioxanthone, xanthone, lofine dimer, trihalomethyl compounds, dihalomethyl compound, active ester compound, organic boron compounds, and the like. Furthermore, a photocrosslinking radical generator such as a bisazide compound may be contained simultaneously. Further, when polymerization is carried out only with heat, a typical thermal polymerization initiator such as azobisisobutylnitrile (AIBN), which is a typical photoradical generator, may be used.

Similar functions may be obtained by forming a liquid ink using a photoacid generator that generates an acid upon irradiation with light, and at least one monomer that polymerizes in the presence of an acid, and applying obtained liquid ink to the electrode base and subsequently curing the liquid ink applied electrode base. When such a liquid ink is irradiated with light, the photoacid generator generates acid; this acid functions as a catalyst for the crosslinking reaction of the polymerizable compound. The generated acid diffuses in the ink layer. Diffusion of acid and crosslinking reaction using acid as a catalyst may be accelerated by heating. Unlike radical polymerization, this crosslinking reaction is not inhibited by the presence of oxygen. The obtained resin layer exhibits excellent adhesiveness as compared with that obtained by radical polymerization. When such a liquid ink is used, light irradiation and heating are performed after ejecting the ink onto the surface of the electrode base and/or the active material layer acting as a printed surface, thereby rapidly immobilizing the ink layer. That is, it is possible to obtain a high-quality ink layer without requiring a large-scale exposure system.

The following illustrates each of components of the liquid ink according to the embodiment of the present invention in detail.

Examples of the photoacid generator capable of generating an acid upon irradiation of light may include an onium salt, a diazonium salt, a quinone diazide compound, an organic halide, an aromatic sulfonate compound, a bisulfone compound, a sulfonyl compound, a sulfonate compound, a sulfonium compound, a sulfamide compound, an indonium compound, a sulfonyldiazomethane compound, and mixtures of these compounds, and the like.

Specific examples of the aforementioned compounds include triphenylsulfonium triflate, diphenyliodonium triflate, 2,3,4,4-tetrahydroxybenzophenone-4-naphthoquinone diazide sulfonate, 4-N-phenylamino-2-methoxyphenyl diazonium sulfate, 4-N-phenylamino-2-methoxyphenyldiazonium-p-ethylphenyl sulfate, 4-N-phenylamino-2-methoxyphenyldiazonium-2-naphthyl sulfate, 4-N-phenylamino-2-methoxyphenyldiazonium-phenyl sulfate, 2,5-diethoxy-4-N-4'-methoxyphenylcarbonylphenyldiazonium-3-carboxy-4-hydroxyphenyl sulfate, 2-methoxy-4-N-phenylphenyldiazonium-3-carboxy-4-hydroxyphenyl sulfate, diphenylsulfonyl methane, diphenylsulfonyl diazomethane, diphenyl disulfone, α-methylbenzoin tosylate, pyrogallol trimesylate, benzoin tosylate, MPI-103 (CAS. NO. [87709-41-9]; Midori Kagaku Co., Ltd.), BDS-105 (CAS. NO. [145612-66-4]; Midori Kagaku Co., Ltd.), NDS-103 (CAS. NO. [110098-97-0]; Midori Kagaku Co., Ltd.), MDS-203 (CAS. NO. [127855-15-5]; Midori Kagaku Co., Ltd.), Pyrogallol tri-tosylate (CAS. NO. [20032-64-8]; Midori Kagaku Co., Ltd.), DTS-102 (CAS. NO. [75482-18-7]; Midori Kagaku Co., Ltd.), DTS-103 (CAS. NO. [71449-78-0]; Midori Kagaku Co., Ltd.), MDS-103 (CAS. NO. [127279-74-7]; Midori Kagaku Co., Ltd.), MDS-105 (CAS. NO. [116808-67-4]; Midori Kagaku Co., Ltd.), MDS-205 (CAS. NO. [81416-37-7]; Midori Kagaku Co., Ltd.), BMS-105 (CAS. NO. [149934-68-9]; Midori Kagaku Co., Ltd.), TMS-105 (CAS. NO. [127820-38-6]; Midori Kagaku Co., Ltd.), NB-101 (CAS. NO. [20444-09-1]; Midori Kagaku Co., Ltd.), NB-201 (CAS. NO. [4450-68-4]; Midori Kagaku Co., Ltd.), DNB-101 (CAS. NO. [114719-51-6]; Midori Kagaku Co., Ltd.), DNB-102 (CAS. NO. [131509-55-2]; Midori Kagaku Co., Ltd.), DNB-103 (CAS. NO. [132898-35-2]; Midori Kagaku Co., Ltd.), DNB-104 (CAS. NO. [132898-36-3]; Midori Kagaku Co., Ltd.), DNB-105 (CAS. NO. [132898-37-4]; Midori Kagaku Co., Ltd.), DAM-101 (CAS. NO. [1886-74-4]; Midori Kagaku Co., Ltd.), DAM-102 (CAS. NO. [28343-24-0]; Midori Kagaku Co., Ltd.), DAM-103 (CAS. NO. [14159-45-6]; Midori Kagaku Co., Ltd.), DAM-104 (CAS. NO. [130290-80-1] and CAS. NO. [130290-82-3]; Midori Kagaku Co., Ltd.), DAM-201 (CAS. NO. [28322-50-1]; Midori Kagaku Co., Ltd.), CMS-105 (Midori Kagaku Co., Ltd.), DAM-301 (CAS. NO. [138529-81-4]; Midori Kagaku Co., Ltd.), SI-105 (CAS. NO. [34694-40-7]; Midori Kagaku Co., Ltd.), NDI-105 (CAS. NO. [133710-62-0]; Midori Kagaku Co., Ltd.); EPI-105 (CAS. NO. [135133-12-9]; Midori Kagaku Co., Ltd.); UVACURE1591, and UVACURE1590 (DAICEL-ALLNEX LTD.).

Among these, an onium salt is preferably used as the photoacid generator. Examples of the onium salt to be used include a fluoroborate anion, a hexafluoroantimonate anion, a hexafluoroarsenate anion, a trifluoromethanesulfonate anion, a paratoluene-sulfonate anion, and a diazonium salt, a phosphonium salt and a sulfonium salt each having paranitrotoluenesulfonate anion as a counter ion. The photoacid generator may also be used for a halogenated triazine compound.

The photoacid generator may further contain a sensitizing dye. Examples of the sensitizing dye may include an acridine compound, benzoflavins, perylene, anthracene, laser dyes, and the like.

In a case where a quinonediazide compound is used as a photoacid generator, salts such as naphthoquinone diazide sulfonyl chloride and naphthoquinone diazide sulfonic acid may be used.

The organic halide exemplified as a compound usable as a photoacid generator indicates a compound that forms a hydrohalic acid. Examples of such a compound may include the compounds described in U.S. Pat. Nos. 3,515,552; 3,536,489; and 3,377,978, and the compounds described in West German Patent Publication No. 2243621. Preferable examples of organic halides include compounds substituted by vinyl halomethyl-S-triazine disclosed in U.S. Pat. No. 3,987,037. Acid esters having photodissociability and the like may also be suitably used as photoacid generators. An example of such an acid ester may include ortho-nitrobenzyl ester of aluminum silanol.

The polymerizable compound which crosslinks under the presence of an acid may preferably exhibit flowability. Such compounds may be cationically polymerizable vinyl bond-containing monomers such as a compound having a cyclic ether group such as an epoxy group, an oxetane group, an oxolane group and the like having a molecular weight of 1,000 or less, an acrylic or vinyl compound having the above-mentioned substituent on the side chain, a carbonate compound, a low molecular weight melamine compound, vinyl ethers, vinylcarbazoles, styrene derivatives, alpha-methylstyrene derivatives, vinyl alcohol and acrylic, and vinyl alcohol esters including ester compounds such as methacrylate. In a case where the polymerizable compound is an epoxy compound having an alicyclic skeleton, high boiling point and low viscosity may both be achieved to some extent in addition to reactivity.

A compound having a relatively high molecular weight and high viscosity such as a solid at room temperature may be further contained in the composition insofar as the amount to be added is small. By containing such a component, flexibility of the ink layer after being cured may be enhanced. In a case where a compound having a higher valence and a high reactivity is used, the hardness and solvent resistance of the cured product may be improved. Examples of such compounds may include a monomer having a cationically polymerizable vinyl bond and an oligomer obtained by polymerizing one or more such monomers, such as a compound having a cyclic ether group such as an epoxy group bonded by a long chain alkylene group, an oxetane group, an oxolane group, and the like having a molecular weight of 5000 or less, an acrylic or vinyl compound having the above-mentioned substituent on the side chain, a carbonate compound, a low molecular weight melamine compound, vinyl ethers, vinylcarbazoles, styrene derivatives, alpha-methylstyrene derivatives, vinyl alcohol and acrylic, and vinyl alcohol esters including ester compounds such as methacrylate.

For example, such a liquid ink that is photo-cationically polymerizable may be exemplified as follows. It is preferable that the content of the photoacid generator be 1 part by weight or more and 10 parts by weight or less based on 100 parts by weight of the solvent polymerized in the presence of the total acid contained in the liquid ink, and that at least 50 parts by weight of the solvent be an acid polymerizable compound having an alicyclic skeleton and/or an aliphatic skeleton having a viscosity of 50 mPa·s or less at room temperature and normal pressure and a boiling point of 150° C. or more. Accordingly, sufficient fluidity may be given to the liquid ink, and having a boiling point of 150° C. or higher may minimize the volatile component contained in the liquid ink.

In a case where the acid polymerizable compound is an epoxy compound, a compound having a divalent aliphatic skeleton with approximately 1 to 15 carbon atoms, a compound having a hydrocarbon group with an alicyclic skeleton, or a compound having an epoxy group or an alicyclic epoxy group in one or both of a divalent group having an aliphatic chain or an alicyclic skeleton as a part thereof.

The epoxy compound having such conditions may exhibit its effect insofar as this compound is contained in the composition in an amount of at least 50 parts by weight. In a case where the solvent is formed only with the epoxy compound, the content of the epoxy compound is preferably 30% by weight or more, more preferably 40% by weight or more with respect to the entire content of the liquid ink. In a case where the content is less than 30% by weight, the nozzles of the liquid ejection head may clog or thermoplasticity may decrease.

There is no particular limitation on the number of epoxy groups introduced into the above-described molecular skeleton; however, in order to impart flexibility and re-solubility to the cured ink layer, it is preferable that the valence number be at most approximately 2 to 3. These compounds usually have viscosity of approximately 1 mPa·sec to about 30 mPa·sec. Thus, the use of these compounds is effective for making liquid ink sufficiently low in viscosity. When the content of the low viscosity epoxy compound is 50 parts by weight or more in the total amount of the solvent, the epoxy compound may be enabled to exhibit its effect. Note that when the content of the low viscosity epoxy compound is excessive, the liquid ejection head may exhibit degraded ejection or the volatility may increase. Hence, it is desirable that the upper limit of the content be limited to 90 parts by weight.

For example, in a case where 50 to 90 parts by weight of the low viscosity epoxy compound and 10 to 40 parts by weight of the high viscosity epoxy compound are added to 100 parts by weight of the liquid ink, it may be advantageous in achieving the minimum fluidity required for ejection (more preferably 30 mPa·sec at 50° C. in the liquid ejection head). In particular, it is preferable that the weight ratio of the low viscosity epoxy compound to the high viscosity compound be approximately 1:1 to 10:1. In addition, in a case where an epoxy compound is used in combination with an alicyclic epoxy compound, adhesiveness and curability may be particularly improved among the curing performance of the liquid ink. Examples of the aliphatic epoxy compound may include alicyclic epoxy such as CELLOXIDE 2021, CELLOXIDE 2021A, CELLOXIDE 2021P, CELLOXIDE 2081, CELLOXIDE 2000, alicyclic epoxy exemplified for CELLOXIDE 3000, a (meth)acrylate compound having an epoxy group such as cyclomer A200, cyclomer M100, a methacrylate having a methyl glycidyl group such as MGMA, a low molecular weight epoxy compound such as glycidol, β-methyl epicolol hydrin, α-pinene oxide, α-olefin monoepoxide of C12 to C14, α-olefin monoepoxide of C16 to C18, epoxidized soybean oil such as DAIMAC S-300K, and epoxidized linseed oil such as DAIMAC L-500, polyfunctional epoxy such as Epolead GT301 and Epolead GT401 (produced by Daicel Chemical Industries, Ltd.).

Further, an alicyclic epoxy of Dow Chemical Company, Inc. of Cyracure, a compound in which a hydroxyl group terminal of hydrogenated and aliphatic low molecular weight phenolic compound is substituted by an epoxy group, ethylene, glycol, glycerin, neopentyl, alcohol, hexanediol, glycidyl ether compounds such as polyhydric aliphatic alcohols such as trimethylolpropane/alicyclic alcohols, hexahydrophthalic acid, glycidyl ester of hydrogenated aromatic polycarboxylic acid, and the like may be used.

Further, in order to improve the chemical resistance of the resin and the like, a transparent liquid epoxy resin having high weather resistance and high glass transition point (Tg) such as epoxidized polybutadiene such as Epolead PB3600 and PB3600M, EHPE3150, EHPE3150CE, and the like manufactured by Daicel Corporation may be added. Alternatively, a lactone-modified alicyclic epoxy resin may be added in addition to these compounds. Examples of such a lactone-modified alicyclic epoxy resin may include Plaxel GL61, GL62, G101, G102, G105, G401, G402, G403X manufactured by Daicel Corporation and the like.

Among these, a compound obtained by modifying alcohol of Celoxide 2000, Celoxide 3000, α-pinene oxide ethylene glycol, glycerin, neopentyl alcohol or hexanediol into glycidyl ether may be desirable in view of viscosity and volatility. A preferable mixing ratio may be as follows: as a combination of compounds to be polymerized in the presence of an acid, 30 to 70 parts by weight of an alicyclic epoxy compound having a terpenoid skeleton or a norbornane skeleton, and 30 to 70 parts by weight of an epoxy compound having two or more glycidyl ether groups having an aliphatic skeleton having 6 or less carbon atoms; as a photoacid generator, 1 to 6 parts by weight of a hexafluorophosphate compound having a phenylsulfonium skeleton; and as a color component, 1 part by weight to 10 parts by weight of a pigment. Examples of such alicyclic epoxy compounds include limonene (di) oxide, (di) oxabicycloheptane, and substituted compounds of these compounds. Examples of the epoxy compound having an aliphatic skeleton with 6 or less carbon atoms may include neopentyl glycol diglycidyl ether, ethylene glycol diglycidyl ether, glycerol di(tri)glycidyl ether, 1,6-hexanediol diglycidyl ether, and the like.

Furthermore, in a case where high-speed electrode printing of, for example, several tens of meters per minute is required, or in a case where resistance to solvent is required, an oxetane compound may be used as the solvent to polymerize with an acid so as to achieve these requirements. Note that when these aromatic oxetane compounds are mainly used, the viscosity rises markedly; hence, an alicyclic epoxy compound and/or a divalent or higher aliphatic or alicyclic oxetane compound may be preferably added to these aromatic oxetane compounds. Such an aliphatic oxetane may partially contain an ether bond in its structure. In view of printing performance and viscosity suitability, the mixed composition ratio of such compounds may preferably be in a range of 0 to 40 parts by weight of the aromatic oxetane compound, and in view of solvent resistance, the mixed composition ratio may preferably be 50 parts by weight or less of an epoxy compound having an alicyclic skeleton. In view of curing acceleration, the total addition amount of the oxetane compound in the ink may preferably be at least 40 parts by weight or more, and in view of cured hardness, the total amount of the compound having an alicyclic skeleton and an aromatic skeleton may preferably be at least 30 parts by weight or more.

When deviating from these ranges, any of curing speed, printing performance, ejection performance, and solvent resistance may be degraded.

Note that in a case where resistance to a solvent having higher solubility is required for a film electrode (hereinafter simply referred to as "electrode"), the aromatic oxetane compound may be increased beyond the above range. Examples of the aliphatic or alicyclic oxetane compound having two or more valences may include a compound in which one or more oxetane-containing groups are introduced into an alicyclic ring such as di[1-ethyl(3-oxetanyl)] methyl ether, 3-ethyl-3-(2-ethylhexyloxymethyl) oxetane, [(1-ethyl-3-oxetanyl)methoxy] cyclohexane, bis[(1-ethyl-3-oxetanyl)methoxy]cyclohexane, and bis[(1-ethyl-3-oxetanyl)methoxy] norbornane; and an ether compound obtained by dehydration condensation of an oxetane-containing alcohol such as 3-ethyl-3-hydroxymethyloxetane to an aliphatic polyhydric alcohol such as ethylene glycol and propylene glycol and neopentyl alcohol.

Examples of the oxetane compound containing an aromatic skeleton may include 1,3-bis((1-ethyl-3-oxetanyl) methoxy)benzene, 4,4'-bis((3-ethyl-3-oxetanyl)methoxy)biphenyl, and phenol novolak oxetanes.

In a case where improvement of curing speed, further reduction of viscosity in addition to solvent resistance of printed image and improvement of hardening hardness are required, it is preferable to add a vinyl ether compound having an alicyclic skeleton alone or in combination in the liquid ink. More specific examples may include a compound in which a hydrogen atom of a hydroxyl group in a cycloaliphatic polyol such as cyclohexane (poly)ol, norbornane (poly)ol, tricyclodecane (poly)ol or the like and a phenol derivative is substituted by a vinyl group.

The content of the photoacid generator and the radical generator in the liquid ink may be set according to the generation efficiency of the photopolymerization initiator to be used. For example, a preferable amount of the photoacid generator and the radical generator to be added may be usually 0.5 to 8 parts by weight, preferably 1 to 6 parts by weight, more preferably 2 to 4 parts by weight, with respect to 100 parts by weight of the solvent to be polymerized contained in the liquid ink by weight. The addition of the photoacid generator and the radical generator within the above-described range may be preferable because storage stability of the ink may be maintained, and clogging of piping and a head used for coating hardly occur. In a case where the amount of the polymerization initiator to be added with respect to 100 parts by weight of the solvent is less than 1 part by weight, the curing sensitivity of the liquid ink (normally, as illustrated in Table 1 below, the curing sensitivity becomes higher as the value becomes smaller) becomes low. In contrast, in a case where the amount to be added is more than 10 parts by weight, the viscosity of the liquid ink increases over time and the film properties and the hardness of the ink film after photocuring will lower. Further, clogging of later-described piping of an electrode printing apparatus and members constituting the liquid ejection head may occur occasionally.

Other organic solvents may be mixed with a part of the polymerizable compound having such characteristics in view of viscosity and surface tension. In this case, such an organic solvent may be present in the total solvent at a concentration of 50% by weight or less, and preferably at a concentration of 10% by weight or less. A concentration exceeding the above range may result in degradation of the curing performance such as the above-mentioned organic solvent remaining inside the cured product.

The resin layer and/or the inorganic layer according to the present invention that is formed on the surface of the active material layer may be preferable because such a structure will prevent the active material from exfoliating with time and will function as a short circuit prevention barrier. This is a film electrode according to another embodiment of the present invention, characterized in that the resin layer and/or the inorganic layer is formed on a part of the surface or the entire surface of the active material layer, and the resin layer and/or the inorganic layer has partial openings and/or ion permeability.

The resin layer and/or the inorganic layer are formed by on-demand printing such as electrophotography or liquid development electrophotography, which enables printing by controlling the position of a specific pattern in a noncontact manner with respect to the active material layer, and enables printing on the active material layer in a noncontact manner. Accordingly, it is preferable to perform printing by a method of a liquid ejection system such as an ink jet method using a liquid ejection head, a dispenser, a jet nozzle, or the like; specifically, the inkjet method using a liquid ejection head may be preferable.

Such a resin layer having ion permeability and/or openings may be preferable because such a resin layer allows ions such as in an electrolyte to substantially pass through so as to provide a function as a separator and a thermal runaway preventing function. In this case, it is possible to print the liquid ink multiple times separately for each function.

In order to form such openings, the above-described liquid ink may be used; however, in order to provide a thermal runaway preventing function, a pattern is printed with a liquid ink obtained by dissolving, in a specific solvent, a thermoplastic resin such as polyolefin, which is difficult to dissolve in an organic solvent. In order to obtain a film having ion permeability, the molecular structure may need to enable passing through the electrolytic solution. Hence, in addition to the acrylic compound described above, an acrylic having a (poly)ethylene oxide skeleton or having a side chain with high solubility with respect to an electrolyte is mixed into monomers to prepare a liquid ink that is capable of achieving the above molecular structure.

From the viewpoints of permeability or retention of an electrolytic solution, it is more preferable that the resin or inorganic layer to have not only ion permeability but also microscopic openings; that is, ion permeability may preferably be achieved by adding a blowing agent and the like in the resin, and heating the obtained product after coating; or by adding a soluble salt such as an electrolyte in the resin, and being immersed, after coating, in an electrolytic solution to dissolve the left salt to form openings and pores. Alternatively, a material such as a foaming agent is added in the resin, and the obtained product is heated after coating, or a soluble salt such as an electrolyte is added in the resin, and the obtained product is soaked in an electrolytic solution to allow such a salt to dissolve, thereby forming pores in the resin to develop ion permeability. Ion permeability may be similarly developed by forming a specific phase separation or microphase separation after coating due to a block-like molecular skeleton.

Forming the resin layer and/or the inorganic layer using the liquid ejection head may be preferable because a resin film and/or an inorganic film may be selectively formed in an electrode terminal and the like where a thickness defect of approximately 20% or more of the electrode or the electrode active material is likely to occur, or a defect site or defect at the time of coating is likely to occur.

That is, this feature is another embodiment of the present invention, where the resin layer and/or the inorganic layer is selectively formed on the surface of a portion that is 20% or more thinner than the average thickness of the active material layer and/or at a defect portion penetrating through to the surface of the electrode base present in the active material layer. Alternatively, the resin layer and/or the inorganic layer is formed on the exposed end portion of the conductive foil that is the electrode base, and the resin layer and/or the inorganic layer is formed thick in the vicinity of the end portion of the conductive foil.

In addition, the active material layer and the electrode cut surface simultaneously present on the end face cut from the film electrode, where exfoliation of the active material may easily occur. In order to prevent exfoliating off the active material in this portion, the liquid ink may be applied mainly to this portion instead of the adhesive and may then be cured. This is another embodiment of the present invention, in which the active material layer may be present in the vicinity (end portion) of an end face of the electrode base, and a resin layer and/or an inorganic layer may partially permeate the active material layer.

A liquid ink according to another embodiment of the present invention has a viscosity of 150 mPa·s or less at room temperature and a surface tension in a range of 15 to 75 mN/m, which may preferably be applied by a liquid ejection head or a jet dispenser or the like.

As described above, the liquid ink according to the embodiment of the present invention desirably has fluidity of at least 30 mPa·sec (=cp) when applied by a liquid ejection head.

When the liquid ink is directly ejected onto the electrode base, the ink layer formed on the electrode base is cured or preliminarily cured by applying light and heating. Further, the ink layer may be fixed on the electrode base by applying heat to the ink layer to perform main curing.

The liquid ink according to the embodiment of the present invention may be desired to have high stability in ink jet ejection; however, liquid ink in general tends to have viscosity increased over time, and its performance, when used as it is, may be maintained only for a short period. Accordingly, in a case of a radical polymerization type, it is preferable to further contain a typical hydroquinone or a phenol compound as a viscosity stabilizer; in a case of a cationic polymerization type, it is preferable to further contain a basic compound as a viscosity stabilizer. As the basic compound, any inorganic base or organic base dissolvable in the acid-polymerizable compound as described above may be used; however, an organic base is more preferable in terms of its solubility. As the organic base, an organic amine having a heterocyclic skeleton such as ammonia or an ammonium compound, a substituted or unsubstituted alkylamine, a substituted or unsubstituted aromatic amine, pyridine, pyrimidine, imidazole or the like, an aliphatic oligomer having a terminal amino group, and polyethers may be listed. The polymerization inhibiting compound in the liquid ink is preferably blended in a range of 30 mol % or less and 1 mol % or more with respect to a total molar amount of the polymerization initiator. More preferably, the range of the polymerization inhibiting compound may be 15 mol % or less and 2 mol % or more. When the amount of the polymerization inhibiting compound deviates from this range, the curing sensitivity markedly decreases or the viscosity stabilizing effect disappears.

It is generally preferable to prepare a liquid ink so as to contain volatile components such as water or an organic solvent as little as possible. However, organic solvents used for preparing raw materials, such as methyl ethyl ketone, propylene glycol solvents, ethyl lactate, N-methyl-2-pyrrolidone (hereinafter abbreviated as "NMP") may be inevitably mixed. For example, in a case where an exhaust mechanism or a solvent recovery mechanism is provided, a small amount of an organic solvent may be contained for the purpose of obtaining a desired resin layer and/or inorganic layer. In this case, it is preferable to use water, alcohols such as ethanol and propanol, petroleum components such as isopar and terpene, and NMP in view of safety.

Linear stress of 250 kN may be applied to the resin layer and/or the inorganic layer formed from such a liquid ink in the thickness direction of the electrode in the pressing step performed after forming the film electrode of the positive electrode or the negative electrode. Hence, the resin layer and/or the inorganic layer may preferably have a plastic deformation force and/or a restoring force, and may preferably have an adhesion index of 2 or less in an adhesion to the electrode base in the JIS cross cut test. Furthermore, the dissolution rate of the resin layer and/or the inorganic layer in the electrolytic solution may preferably be 0.1%/year or less.

The following describes, with reference to FIG. 1, an electrode printing apparatus according to an embodiment of the present invention. FIG. 1 is a view schematically depicting an electrode printing apparatus according to one embodiment of the present invention.

An electrode printing apparatus according to an embodiment of the present invention is configured to use a liquid ink as a resin layer forming ink and/or an inorganic layer forming ink, and position-selectively form a resin layer and/or an inorganic layer on at least one of the surface of the electrode base (hereinafter also referred to as "electrode base surface") and the surface of an active material layer (hereinafter referred to as "active material layer surface"). In other words, the electrode printing apparatus position-selectively forms a resin layer and/or an inorganic layer on the electrode base surface and/or the active material layer surface using a liquid ink.

As illustrated in FIG. 1, the electrode printing apparatus 1 includes a transfer mechanism 3 as a transfer unit configured to transfer an electrode having an active material layer on an electrode base 2 and/or an electrode base 2. In addition, the electrode printing apparatus 1 includes an image recognition apparatus 9, a liquid ejection head 4, a light source 5, a heater 6, a liquid ejection head 7, a light source 5, a heater 6 and the like that are arranged in order from an upstream side to a downstream side in a transfer direction X of the electrode base 2 by the transfer mechanism 3.

The image recognition apparatus 9 is disposed on the most upstream side in the transfer direction X and functions as an information acquisition unit configured to acquire defect information and position information on the surface of the active material layer formed on the electrode base 2. The image recognition apparatus 9 is composed of, for example, a camera, a line sensor, or the like. The image recognition apparatus 9 is provided only as required, because the image recognition apparatus 9 is used when the active material layer is already present on the electrode base 2, and is configured to recognize and record the position of an active material image on the electrode base 2 and the position of the defect of the electrode base 2.

The transfer mechanism 3 is configured to transfer the electrode base 2 such that the electrode base 2 sequentially passes by the front of the liquid ejection head 4, the light source 5, and the heater 6. The transfer mechanism 3 may include, for example, a drive mechanism including a belt for moving the electrode base 2, a combination of an air levitation mechanism or a roller, a motor for driving these, and the like. The transfer mechanism 3 may further include a guide member or the like configured to assist the movement of the electrode base 2.

The liquid ejection head 4 functions as an ink layer forming liquid ejection head configured to eject a liquid ink as a resin layer forming ink and/or an inorganic layer forming ink on the electrode base 2 to form an ink layer. The liquid ejection head 4 is configured to eject a liquid ink onto the electrode base to form an ink layer which is a precursor state of the resin layer and/or the inorganic layer according to an image signal related to information for forming a frame pattern as a later described ink layer pattern and defect information optionally acquired by the image recognition apparatus 9. As the liquid discharge head 4, it may be possible to use a head arranged in a line shape having a width equal to or greater than the width in a width direction orthogonal to the transfer direction X of the electrode base 2. There is no specific limitation with respect to a pressure generating unit and a driving method for ejecting a liquid ink from the liquid ejection head 4. For example, a thermal actuator configured to cause a liquid ink droplet to fly by utilizing the pressure of steam generated by the heat of a heating element, a piezoelectric actuator configured to cause a liquid ink droplet to fly by using a mechanical pressure pulse generated by a piezoelectric element, or an electrostatic actuator including a diaphragm and a counter electrode, or the like may be used. Further, the liquid ink supply system may optionally be pressurized by turning on and off the pressure.

The light source 5 has a function to irradiate the ink layer formed on the electrode base 2 with light to cure the ink layer onto a resin layer. Examples of the light source 5 include mercury lamps such as low, medium and high pressure mercury lamps, tungsten lamps, arc lamps, excimer lamps, excimer lasers, semiconductor lasers, high power UV-LEDs, and YAG lasers; laser systems combining a laser and a nonlinear optical crystal; high frequency induced ultraviolet ray generators, electron beam irradiation devices such as EB curing devices, and X ray irradiation devices; and the like. In particular, in view of simplifying the system, it is preferable to use high frequency induced ultraviolet ray generators, high/low pressure mercury lamps, semiconductor lasers or the like. In addition, a collection mirror and a scanning optical system may be provided in the light source 5.

The heater 6 has a function as a heating unit/heating mechanism configured to heat the ink layer formed by ejection of the inorganic layer forming ink formed on the electrode base 2 to promote curing or drying. Examples of the heater 6 include an infrared lamp, a roller incorporating a heating element (heat roller), a blower configured to blow warm air or hot air, a furnace introducing boiler type hot air using steam, or the like may be used.

In a case where the active material layer is formed continuously on the electrode base 2 on which the resin layer has been disposed in advance, the liquid ejection head 7 functions as coating unit configured to optionally apply an additional active material. This liquid ejection head 7 applies an active material layer forming ink using a die head having an intermittent function, a high-speed dispenser, a jet nozzle, a spray nozzle, a liquid ejection head similar to the above, or the like.

In this case, the liquid ejection head 7 functions as an active material layer forming liquid ejection head configured to eject an active material layer forming ink containing the active material onto the surface of the electrode base 2 to form an active material layer. A liquid ejection head 7 composed of a liquid ejection head is optionally provided and functions as a coating unit configured to applying a resin layer forming ink and/or an inorganic layer forming ink to a defect site or the like of the surface of the active material layer based on the defect information acquired by the image recognition apparatus 9.

The liquid ejection head 7 may function as an ink layer forming liquid ejection head similar to the liquid ejection head 4 configured to eject a liquid ink as a resin layer forming ink and/or an inorganic layer forming ink on the electrode base 2 to form an ink layer.

The electrode printing apparatus 1 includes a controller configured to control operations of the transfer mechanism 3, the image recognition apparatus 9, the liquid ejection head 4, the light source 5, the heater 6, the liquid ejection head 7, the light source 5, the heater 6, and the like.

The following describes operations of the electrode printing apparatus 1. First, the electrode base 2 is transferred in the transfer direction X from the left side to the right side in FIG. 1 by driving of the transfer mechanism 3. The transfer speed of the electrode base 2 in this case is, for example, in a range of 0.1 to several hundred m/min.

In a case where the image recognition apparatus 9 is provided upstream of the electrode printing apparatus 1, the electrode surface is observed by the image recognition apparatus 9, reading is performed by a camera or a line sensor that records the position information of the defect site for recognizing the defect site and the position of the defect site, and liquid ink ejection/printing and feedback of liquid ink ejection/printing is performed by the subsequently arranged liquid ejection head 4.

When the electrode base 2 is transferred to the front of the liquid ejection head 4, the liquid ejection head 4 ejects the liquid ink in accordance with the image signal. As a result, an ink layer is formed on the electrode base 2.

Next, the electrode base 2 on which the ink layer is formed is transferred to the front of the light source 5. When the electrode base 2 passes by the front of the light source 5, the light source 5 irradiates the ink layer formed on the electrode base 2 with light to cure the ink layer. Note that the intensity of the irradiation light at the position of the surface of the ink layer varies with the wavelength of the light source to be used; the intensity of the irradiation light at this position is usually in a range of several mW/cm2 to 1 kW/cm2. The exposure amount to the ink layer may be appropriately set in accordance with the sensitivity of the liquid ink and the moving speed of the surface to be printed (the transfer speed of the electrode base 2) and the like.

Subsequently, the electrode base 2 carrying the cured ink layer is transferred into or near the heater 6. When the electrode base 2 passes through or in the vicinity of the heater 6, the heater 6 heats the ink layer formed on the electrode base 2 to promote the crosslinking reaction in the ink layer. In the electrode printing apparatus 1 depicted in FIG. 1, the heating time by the heater 6 is usually as relatively short as several seconds to several tens of seconds. Accordingly, in a case of curing the ink layer almost completely by the heater 6, it is preferable that the maximum reaching temperature is set to a relatively high temperature of, for example, approximately 200° C. or less, preferably approximately 80 to 200° C. or approximately 60 to 180° C.

Subsequently, in a case where no active material layer is formed on the electrode base 2, the active material layer forming ink is ejected onto the surface of the electrode base 2 by the liquid ejection head 7 to form an active material layer, which is then dried by the heater 6. Since the heater 6 requires sufficient heating to remove the solvent in the active material, the capability of the heater 6 is determined according to the speed of the transfer mechanism 3, the boiling point of the solvent, and the like. Hence, in the heater 6, heating is usually performed such that the maximum achieving temperature is, for example, approximately 200° C. or less, preferably approximately 80 to 200° C. or approximately 60 to 180° C. In terms of drying time; however, heating is usually performed for, though the drying time also depends on the thickness of the active material layer, approximately 0.5 to 60 minutes, more preferably 1 to 10 minutes.

Thereafter, the electrode base 2 is wound up in the case of a belt shaped electrode base or is transferred to a stocker (a container which houses the film electrode). As a result, electrode printing is completed. Further, a press roll as a unit for pressing the obtained film electrode, and a cutting mechanism such as a slit blade and a laser for cutting the film electrode may also be disposed. When such devices are additionally disposed, the apparatus configuration may also be referred to as an electrode forming apparatus.

The heating unit configured to heat the ink layer is usually known as a heat source and any controllable heat source may be used; however, in a case where a light source capable of generating infrared light in addition to visible light is used as the light source 5, heating may be performed simultaneously with light irradiation. Such a light source capable of generating infrared light in addition to visible light is more preferable because this light source is enabled to promote curing.

When the ink layer is irradiated with light, the ink layer is heated by the heat generated from the light source 5; hence, the heating unit is not necessarily disposed as an independent member like the heater 6. However, it may take a long time to completely cure the ink layer by leaving the ink layer at room temperature only by heat from the light source 5. Accordingly, it is desirable to leave the ink layer at room temperature until complete curing only when there is a sufficiently long time for complete curing. For example, for a printed matter such as an advertisement in a newspaper distributed on the next day, time required for curing as long as about one day and one night may be secured. Accordingly, printed matter such as a newspaper advertisement may be completely cured at room temperature.

An example of such a light source includes a light hammer series (manufactured by Fusion UV Systems), for example. In addition, high-brightness UV-LEDs and laser diodes etc. of 1 W or more are sold by LED makers represented by Nichia Corporation and may be suitably used by being arranged on a line or a plane. Furthermore, in a case where it is difficult for light to reach the liquid ink in the gaps of the active material powder, an electron beam or an X-ray irradiation device may be used as a light source. In this case, a compact EB device manufactured by Iwasaki Electric Co., Ltd. may be preferably used.

The electrode printing apparatus, which is an apparatus for ejecting liquid ink according to the embodiment of the present invention, may include two or more liquid ejection heads for ejecting different liquid inks (e.g., liquid ink layers of both a resin layer and an inorganic layer) so as to be suitable for the simultaneous multi-layer printing and the mixing of liquid inks at the point of impact.

The electrode printing apparatus 1 described above includes a transfer mechanism 3 configured to transfer the electrode base 2 to form a resin layer and/or an inorganic layer having a desired thickness, in order to relatively move the electrode base 2 with respect to the liquid ejection head 4 or the like. The liquid ejection head 4 and the like may optionally be moved in the transfer direction X. Alternatively, both the electrode base 2 and the liquid ejection head 4 may be moved.

Further, an overlap printing pattern or relatively thick resin layer and/or inorganic layer pattern may be formed by appropriately utilizing the technique described in this embodiment. That is, a resin layer and/or an inorganic layer having a thickness of several 10 μm or more may be formed by repeatedly ejecting the liquid ink in a predetermined region of the electrode base and curing the ink layer obtained by the ejection of liquid ink.

Note that when the active material, the resin layer, the inorganic layer, and the inorganic layer are patterned, the defect of the electrode active material layer may be corrected as follows. For example, an electrode active material layer is formed on the electrode base 2 and a resin layer or an inorganic layer is formed on the electrode active material layer using the liquid ejection head 4 or 7. When the resin layer or the inorganic layer is formed by being ejected by the liquid discharge head 4 or 7, the defect of the obtained electrode active material layer is fed back to change the concentration, thickness or liquid type of the resin layer or the inorganic layer, and the like, by using the image recognition apparatus 9. In this manner, the defect of the electrode active material layer is corrected when the active material, the resin layer, the inorganic layer, and the inorganic layer are patterned.

The film electrode according to an embodiment of the present invention may be intended to have a single film having a thickness of typically 1 mm or less, and more preferably 500 μm or less. The lower limit of the thickness is not specified; however, the lower limit of the thickness may be approximately 1 μm in view of the limitation of the current foil manufacturing technology. The above-described film electrode having the above-described effect may provide advantageous effect of reducing the weight and size of various devices (in particular, a lithium ion secondary battery) with maintaining a high performance.

The film electrode according to an embodiment of the present invention may be typically laminated by printing in the form illustrated in the following (a) to (e) to form a battery pack (details of this will be described later). Specifically, an electrode for a storage element includes an active material layer present on the electrode base, a non-porous insulating layer present on the active material layer and also present on the periphery of the active material layer, and a porous separator layer bonded to an entire upper part of the active material layer. In such an electrode for a storage element, it is preferable that, except for a terminal portion of the electrode base, at least one side of an electrode peripheral portion has the following relationships (a) to (e):

(a) measures of the electrode base>measures of the active material layer, (b) the measures of the electrode base≤measures of outer edges of the nonporous insulating layer,
(c) the measures of the outer edges of the nonporous insulating layer≥measures of the porous insulating layer (porous separator layer),
(c) the measures of inner edges of the nonporous insulating layer<the measures of the porous insulating layer (porous separator layer), and
(e) the nonporous insulating layer has a contact portion at an end portion of the active material layer.

EXAMPLES

In the following, specific examples and comparative examples will be described in detail in order to illustrate the embodiments of the present invention in further detail. First, Examples 1 to 7 using Ink Examples 1 to 7 of a resin layer forming ink (liquid ink), Comparative Example 1 and 2 using Comparative Ink Examples 8 and 9 of a resin layer forming ink (liquid ink) will be described. In the later-described Table 1 and the like, Ink Examples 1 to 7 and Comparative Ink Examples 8 and 9 are simply illustrated with ink numbers (this also applies to the later-described Table 7 and the like).

Ink Example 1

A toluene solution of chlorinated polyolefin (manufactured by NIPPON PAPER INDUSTRIES CO., LTD.) was diluted and dissolved in Ipzole (a high-boiling solvent mainly composed of aromatic hydrocarbon manufactured by IDEMITSU KOSAN CO., LTD.) so as to be 20 parts by weight of the resin component, and the obtained product was then filtered to produce Ink Example 1 as a resin layer forming ink.

Ink Example 2

Ink Example 2 as a resin layer forming ink was prepared in the same manner as Ink Example 1 except that 1 part by weight of 2.6-bis-(4'-azidobenzal)-4-methylcyclohexanone was added and dissolved.

Ink Example 3

In addition to 35 parts by weight of isobornyl acrylate, 30 parts by weight of dipropylene glycol and 15 parts by weight of tripropylene glycol triacrylate, 20 parts by weight of aliphatic urethane acrylate (EBECRYL 4265 manufactured by DAICEL-CYTEC Corporation), 4 parts by weight of photoradical generator Irgacure 369 based on the above weight, and further 0.5 parts by weight tert-butylphenol polymerization inhibitor were added to obtain Ink Example 3 as a resin layer forming ink.

Ink Example 4

80 parts by weight of ARON OXETANE OXT 221 (manufactured by TTOAGOSEI CO., LTD.), 20 parts by weight of OXT 121 (manufactured by TOAGOSEI CO., LTD.), and 4 parts by weight of the photoacid generator UVACURE 1591 (manufactured by DAICEL-ALLNEX LTD.) based on the above weight, and further 0.5 parts by weight of an aliphatic amine having a molecular weight of 400 were added as a polymerization inhibitor to obtain Ink Example 4 as a resin layer forming ink.

Ink Example 5

A polyamic acid solution (UUPIA manufactured by UBE INDUSTRIES, LTD.) was diluted with dimethylacetamide to be a 10% solution and 0.3% of a fluorine-based surfactant (manufactured by DIC Corporation) was added to obtain Ink Example 5 as a resin layer forming ink.

Ink Example 6

In addition to 15 parts by weight of isobornyl acrylate, 30 parts by weight of octafluoropentyl acrylate, 20 parts by weight of dipropylene glycol and 15 parts by weight of tripropylene glycol triacrylate, 20 parts by weight of aliphatic urethane acrylate (EBECRYL 4265 manufactured by DAICEL-CYTEC Corporation), 4 parts by weight of the photo radical generator IRGACURE 369 based on the above weight, and further 0.5 parts by weight of a tert-butylphenol polymerization inhibitor were added to obtain Ink Example 6 as a resin layer forming ink.

Ink Example 7

3 parts by weight of cellulose nanofibers (manufactured by CHUETSU PULP & PAPER CO., LTD.) were ultrasonically dispersed in a mixed solvent of toluene and ipsole, 0.5% of a silicone surfactant (manufactured by KYOEISHA CHEMICAL Co., LTD) was added to the obtained product, which was followed by filtration to obtain Ink Example 7 as a resin layer forming ink.

Comparative Ink Example 8

80 parts by weight of ARON OXETANE OXT 221 (manufactured by TTOAGOSEI CO., LTD.), 20 parts by weight of OXT 121 (manufactured by TOAGOSEI CO., LTD.), and 4 parts by weight of the photoacid generator UVACURE 1591 (manufactured by DAICEL-ALLNEX LTD.) based on the above weight, and further 0.5 parts by weight of an aliphatic amine having a molecular weight of 400 was added as a polymerization inhibitor to obtain Ink Example 8 as a resin layer forming ink.

Comparative Ink Example 9

90 parts by weight of ARON OXETANE OXT 221 (manufactured by TTOAGOSEI CO., LTD.), 10 parts by weight of OXT 121 (manufactured by TOAGOSEI CO., LTD.), and 4 parts by weight of the photoacid generator UVACURE 1591 (manufactured by DAICEL-ALLNEX LTD.) based on the above weight, further 0.5 parts by weight of an aliphatic amine having a molecular weight of 400 was added as a polymerization inhibitor, and 3 wt % of MEGAFAC (manufactured by DIC Corporation) was added as a fluorine-based surfactant for lowering the surface tension to obtain Ink Example 9 as a resin layer forming ink.

Examples 1 to 7 and Comparative Examples 1 and 2

The results of examining the properties of each liquid ink for Examples 1 to 7 using Ink Examples 1 to 7 and Comparative Examples 1 and 2 using Comparative Ink Examples 8 and 9 are illustrated in Table 1.

The curing sensitivity indicates the sensitivity at which curing starts when the coating is applied onto an aluminum plate using a bar coater having a liquid film (coating film thickness) of 5 μm (hereinafter also referred to as "micrometer" as a "micron") and curing is performed by the light source noted in Table 1. In Table 1, the electron beam (μC/cm2) represents a unit of exposure.

As a light source, a light irradiation device in which UV-LED (365 nm 1 W output) manufactured by NICHIA Corporation was arranged in parallel was used. As a light source, a light irradiation device in which UV-LED (365 nm 1 W output) manufactured by NICHIA Corporation was arranged in parallel was used. Note that in Example 4 and Comparative Examples 1 and 2, heating was performed for 10 seconds using a hot plate at 110° C. after photocuring.

Comparative Ink Examples 8 and 9, electrode frame printing was performed on the aluminum foil (electrode base for positive electrode) as the electrode base 2 by ejecting Ink Examples 1 to 7 and Comparative Ink Examples 8 and 9.

Light sources used were those noted in Table 1 in correspondence with ink numbers, and the liquid ejection head 4 used was an industrial inkjet MH2820 (manufactured by RICOH COMPANY, LTD.), and printing was performed

TABLE 1

| EXAMPLE | INK NUMBER | VISCOSITY (mPa · sec) | SURFACE TENSION (mN/m) | CURING SENSITIVITY | CURED HARDNESS | LIGHT SOURCE |
|---|---|---|---|---|---|---|
| 1 | INK 1 | 20.5 | 28.9 | 1540 | HB | ELECTRON BEAM ($\mu C/cm^2$) |
| 2 | INK 2 | 20.8 | 29.3 | 980 | F | ELECTRON BEAM ($\mu C/cm^2$) |
| 3 | INK 3 | 18.5 | 34.2 | 1015 | HB | 365 nm UV-LED ($mJ/cm^2$) |
| 4 | INK 4 | 21.2 | 36.0 | 360 | H | 365 nm UV-LED ($mJ/cm^2$) |
| 5 | INK 5 | 35.5 | 36.1 | — | 2H | HEATING ONLY 250° C. 5 min. |
| 6 | INK 6 | 19.4 | 29.4 | 1125 | F | 365 nm UV-LED ($mJ/cm^2$) |
| 7 | INK 7 | 25.5 | 25.4 | 1325 | HB | ELECTRON BEAM ($\mu C/cm^2$) |
| COMPARATIVE EXAMPLE 1 | INK 8 | 155.3 | 35.5 | 230 | F | ELECTRON BEAM ($\mu C/cm^2$) |
| COMPARATIVE EXAMPLE 2 | INK 9 | 15.9 | 21.1 | 340 | HB | ELECTRON BEAM ($\mu C/cm^2$) |

The results indicate that the ink coating film (ink layer) of any of Ink Examples 1 to 7 and Comparative Ink Examples 8 and 9 of the resin layer forming ink were also cured to the resin/resin layer by heating or irradiation with light/electron beam. A cross-cut adhesiveness test prescribed in JIS K5600 was carried out using this cured resin layer, and the results indicate that all the resin/resin layers had adhesiveness index 1 and were hardly peeled off. Further, the results of the pencil hardness measurements indicate that the resin/resin layers had a sufficient hardness as illustrated in Table 1 and were also insoluble in a solvent such as acetone.

Examples 8 to 14 and Comparative Examples 3 and 4

Next, using the electrode printing device 1 depicted in FIG. 1 and using the above Ink Examples 1 to 7 and with heat discharge at head temperature of 45° C. to 50° to then allow for curing. The results indicated in Table 2 were thus obtained for Examples 8 to 14 corresponding to Ink Examples 1 to 7, and Comparative Examples 3 and 4 corresponding to Comparative Ink Examples 8 and 9. The exposure conditions were set under the same conditions as those of the light source of Table 1. The respective Ink Examples were ejected onto the surface of the electrode base made of aluminum foil while mutually adjusting the transfer speed by the transfer mechanism 3 and the driving frequency of 10 to 30 kHz of the liquid ejection head 4. The above conditions were adjusted such that the ink layers formed by the liquid inks of the respective Ink Examples were cured by light irradiated from the respective light sources and the film thickness after curing became 4 μm (2 μm in Example 13 only).

TABLE 2

| EXAMPLE | INK NUMBER | EJECTABILITY | IMAGE | TRANSFER SPEED (DRIVE FREQUENCY) | CURED HARDNESS | EXPOSURE LIGHT SOURCE |
|---|---|---|---|---|---|---|
| 8 | INK 1 | EJECTABLE | GOOD | 10 m/min (10-15 kHz) | H | ELECTRON BEAM |
| 9 | INK 2 | EJECTABLE | GOOD | 15 m/min (10 kHz) | H | ELECTRON BEAM |
| 10 | INK 3 | EJECTABLE | GOOD | 15 m/min (10 kHz) | H | 365 nm UV-LED |
| 11 | INK 4 | EJECTABLE | GOOD | 50 m/min (30 kHz) | 2H | 365 nm UV-LED |
| 12 | INK 5 | EJECTABLE | GOOD | 15 m/min (15 kHz) | 2H | HEATING ONLY 250° C. 5 min. |
| 13 | INK 6 | EJECTABLE | GOOD | 15 m/min (10 kHz) | H | HEATING ONLY 250° C. 5 min. |
| 14 | INK 7 | EJECTABLE | GOOD | 10 m/min (15 kHz) | 2H | ELECTRON BEAM |

TABLE 2-continued

| EXAMPLE | INK NUMBER | EJECTABILITY | IMAGE | TRANSFER SPEED (DRIVE FREQUENCY) | CURED HARDNESS | EXPOSURE LIGHT SOURCE |
|---|---|---|---|---|---|---|
| COMPARATIVE EXAMPLE 3 | INK 8 | UNEJECTABLE | — | — | — | — |
| COMPARATIVE EXAMPLE 4 | INK 9 | MANY DEFECTS | DISTORTION | — | — | — |

The results of Table 2 indicate that an image (e.g., a rectangular frame image) may be suitably printed on the electrode base of an aluminum foil using Ink Examples 1 to 7 corresponding to Examples 8 to 14, and that suitable adhesiveness of not more than the index 2 was obtained in the cross cut adhesiveness test defined in JIS K5600. Similar results were obtained by performing similar printing on a copper foil (a later-described electrode base for a negative electrode), a titanium foil, and an electrode base made of a stainless steel foil.

In Comparative Example 3 using Comparative Ink Example 8 having a high viscosity, ink ejection failed (incapable of ejecting in Table 2), and in Comparative Example 4 using Comparative Ink Example 9 having low surface tension, decent image formation failed (image distortion in Table 2).

Examples 15 to 20 and Comparative Example 5

Next, Examples 15 to 20 will be described with reference to FIGS. 2A to 4D while describing the main manufacturing steps of the film electrode according to an embodiment. FIGS. 2A to 2D are schematic cross-sectional views depicting a main manufacturing process of a front surface of a film electrode according to an embodiment, and FIG. 2E is a schematic cross-sectional view depicting a main manufacturing process of a rear surface of the film electrode, which applies the same process to the rear surface, thereby forming an active material layer and a resin layer on each of the front and rear surfaces of the electrode base. FIG. 3A is a plan view of a positive electrode prior to tab punching; FIG. 3B is a plan view of a negative electrode prior to tab punching; FIG. 4A is a plan view of a positive electrode in a completed state; FIG. 4B is a cross-sectional view taken along line Sb-Sb of FIG. 4A; FIG. 4C is a plan view of a negative electrode in a completed state; FIG. 4D is a cross-sectional view taken along line Sd-Sd of FIG. 4C.

As depicted in FIG. 2A, a resin ink 10 acting as a liquid ink corresponding to Ink Examples 1 to 6 was ejected from a liquid ejection head 4 or 7 onto a (front) surface of an electrode base 2 made of aluminum foil having a thickness of 15 μm so as to form a resin ink layer 10a having a thickness of 5 μm on the surface of the electrode base 2.

As depicted in FIG. 2B, the transfer speed of the electrode base 2 by the transfer mechanism 3, and the drive frequency of the liquid ejection head 4 or 7 were adjusted in a same manner as described in Examples 8 to 14. Through these adjustments, a frame pattern 11 (see FIG. 3A) having a 10 cm square shape was printed on the electrode base 2, and was subsequently exposed with exposure light under the same exposure conditions as noted in Table 2, thereby successfully obtaining the frame pattern 11 composed of a cured resin ink layer 10a.

In the above embodiment, a single 10 cm square shaped frame pattern 11 (the inner perimeter of the frame pattern 11 is 10 cm square) is prepared; however, the frame pattern 11 is not limited to the above-described shape and size. That is, in one embodiment of the present invention, an ink layer was formed using a liquid ejection head, and the ink layer was cured to obtain a resin layer. Accordingly, it may be possible to form a large number of "openings" that are smaller mesh-like frame patterns formed of a resin layer in a single frame pattern 11 (see Examples 27 and 28 to be described later). As described above, the resin layer according to an embodiment of the present invention may partially have openings.

In any of the Ink Examples 1 to 6, after forming the square frame pattern 11 with the liquid ink, slurry made of a positive electrode active material, which is an active material layer forming ink 13a, was applied by the liquid ejection head 4 or 7. Note that the positive electrode material is a 50% dispersion of NMP having 2 parts by weight of a carbon conductive agent and 10 parts by weight of polyvinylidene fluoride in a 5:3:2 ratio compound of nickel, manganese, and cobalt (hereinafter simply referred to as "NMC"). As the liquid ejection head 7, a die coater having an opening width of 10.3 cm was used.

In this case, the coating width was allowed to have ±5% variability to perform coating and drying. Accordingly, a square active material layer 14a was formed in a square frame pattern 11 composed of the resin layer 12, thereby preparing a surface of the positive electrode.

Likewise, a surface of the positive electrode was prepared for lithium iron phosphate (hereinafter simply referred to as "LFP") coated with carbon by changing only the active material.

The manufacturing step described above was repeatedly performed on a rear surface of the positive electrode to form a positive electrode 15, which is a film electrode having the insulating frame pattern 11 on a periphery of the positive electrode active material layer 14a as depicted in FIG. 2E and FIG. 3A. Note that when the frame pattern 11 and the active material layer 14a are formed on the rear surface of the positive electrode in the same manner as described above, a mechanism capable of turning over the electrode base 2 of the electrode printing apparatus 1 upside down is provided.

In the same manner as described above, as a slurry material composed of a negative electrode active material, which is an active material layer forming ink 13b, a NMP 40% dispersion having 2 parts by weight of a carbon conductive agent as graphite and 5 parts by weight of polyvinylidene fluoride was applied to a surface of an electrode base 2 made of copper foil having a thickness of 8 m within the frame pattern 11 of FIG. 2C. As depicted in FIG. 3B, a negative electrode 25 was formed as a film electrode having an insulating frame pattern 11 on the periphery of the negative electrode active material layer 14b in the same manner as in the manufacturing steps of the positive electrode, except that the electrode base 2 made of the copper foil and the slurry composed of the negative electrode active material were used.

Note that in FIGS. 3A and 4B, reference numeral 2a denotes a positive electrode base of the electrode base 2, and in FIGS. 3B and 4D, 2b denotes a negative electrode base of the electrode base 2. In FIGS. 2D, and later-described FIGS. 6 to 9B, the positive electrode active material layer 14a or the negative electrode active material layer 14b may simply referred to as the active material layer 14.

Next, as depicted in FIGS. 4A and 4B, a positive electrode 15 illustrated in FIG. 3A was punched by a press so as to leave a portion to be a positive electrode tab 2c in a predetermined shape and so as to have an outer peripheral shape of 11 cm squared. Likewise, as depicted in FIGS. 4C and 4D, a negative electrode 25 illustrated in FIG. 3B was punched by a press so as to leave a portion to be a negative electrode tab 2d in a predetermined shape and so as to have an outer peripheral shape of 11 cm squared.

Then, the tab 2c of the positive electrode 15 and the tab 2d of the negative electrode 25 were disposed so as not to overlap each other and electrode-pressing was subsequently performed with a force of 100 kN. Subsequently, as depicted in an enlarged view of FIG. 5A, ten layers of a cellulosic separator 17 having a thickness of 15 μm sandwiched between the positive electrode 15 and the negative electrode 25 were stacked. Thereafter, the tabs 2c were welded to one another and the tabs 2d were welded to one another, and the obtained product was then sealed with a laminate film 18 to form a bag-like exterior package 19. Thereafter, as electrolytes 20, an ethylene carbonate electrolytic solution 20 having lithium hexafluorophosphate (LiPF6) and lithium tetrafluoroborate (LiBF4) was injected into the exterior package 19 to form a lithium ion secondary battery 21 so as to prepare 50 lithium ion secondary batteries 21 for each of the testing battery examples 1 to 6.

In FIG. 2C, the liquid ejection head 4 or 7 is configured to eject an active material layer forming ink containing an active material onto the surface of an electrode base 2 to form an active material layer with high positional accuracy and to also manage printing in various shapes at high speed.

Note that in FIG. 2C, instead of the liquid ejection head 7, an active material layer forming die coater may be used for ejecting an active material layer forming ink containing an active material onto the surface of an electrode base 2 to form an active material layer.

Comparative Example 5

Fifty comparative testing battery examples 1, which are lithium ion secondary batteries, were formed in the same manner as described above except for formation of a frame pattern by the liquid ejection head 4 in the step of preparing the above-described testing battery examples 1 to 6. In this case, the active material layer forming inks 13a and 13b were also applied to the electrode base 2 (the electrode base 2 on which no frame pattern 11 was formed) with the same width variability as described above by the liquid ejection head 7 or the die coater.

Examples 15 to 20 and Comparative Example 5

The results of Examples 15 to 20 in which the initial capacity variability was measured for the above testing battery examples 1 to 6 and the results of Comparative Example 5 in which the initial capacity variability was measured for the comparative testing battery example 1 are depicted in Table 3. In Table 3, an ink example used for printing a frame pattern is described as a "frame forming ink example".

TABLE 3

| EXAMPLE | TESTING BATTERY EXAMPLE | FRAME FORMING INK EXAMPLE | POSITIVE ELECTRODE | NEGATIVE ELECTRODE | CAPACITY VARIABILITY (%) |
|---|---|---|---|---|---|
| 15 | 1 | INK 1 | NMC | GRAPHITE | 2.6 |
| 16 | 2 | INK 2 | NMC | GRAPHITE | 2.8 |
| 17 | 3 | INK 3 | NMC | GRAPHITE | 3.0 |
| 18 | 4 | INK 4 | LFP | GRAPHITE | 3.0 |
| 19 | 5 | INK 5 | LFP | GRAPHITE | 2.3 |
| 20 | 6 | INK 6 | NMC | GRAPHITE | 3.3 |
| COMPARATIVE EXAMPLE 5 | COMPARATIVE TESTING BATTERY EXAMPLE 1 | NONE | NMC | GRAPHITE | 7.1 |

As can be seen from Table 3, in Examples 15 to 20 corresponding to testing battery examples 1 to 6, the initial capacity variability was controlled to approximately to 3%; however, in Comparative Example 5, the variability increased to 7% or more.

Forming the frame pattern with the resin layer on the electrode active material in this way may remarkably control the initial capacity variability, despite the fact that production factor vary, to improve the quality as the film electrode.

Examples 21 to 26 and Comparative Example 6

Each of the electrodes prepared to have the same configuration as the above-described testing battery examples 1 to 6 was allowed to pass through the electrode printing apparatus 1 again, and an image of the active material layer of the corresponding electrode was read by the image recognition apparatus 9. Based on contrasting density of the read image, a portion having 20% or more thickness variability in the active material layer and a hole-shaped defect portion in the active material layer were filled with the same liquid inks used for the respective frame patterns as the defect correction inks so as to be superimposed on the read image, and the filled inks were cured to form resin layers. Fifty batteries for each of the testing battery examples 7 to 12 that were assembled as illustrated in FIGS. 5A and 5B were formed with the positive electrode and the negative electrode via the separators as described above. The defect sites of these were typically less than 0.5%.

Meanwhile, 50 batteries were formed for a comparative testing battery example 2, in which the frame pattern was not formed and the filling was not performed with the resin layer as described above.

With respect to the testing battery examples 7 to 12 and the comparative testing battery example 2, an accelerated cycle test was conducted by using a thermostatic bath at a temperature of 50° C. for 2 weeks. Discharge and charge conditions of the battery examples were SOC 5 to 95%. Note that the "SOC" is an abbreviation for State of Charge, SOC 5 to 95% indicates that the charged amount is in the range of 5% to 95% with respect to the full charge amount. As a result, Table 4 illustrates the proportion (%) of batteries whose self-discharge rate (also called spontaneous discharge), which seemed to be caused by precipitation of lithium (Li) metal or the like, reached 3 times the self-discharge rate after the start of the test. In Table 4, Examples 21 to 26 correspond to testing battery examples 7 to 12, and Comparative Example 6 corresponds to a comparative testing battery example 2.

TABLE 4

| EXAMPLE | TESTING BATTERY EXAMPLE | FRAME FORMING AND DEFECT CORRECTING INK EXAMPLES | POSITIVE ELECTRODE | NEGATIVE ELECTRODE | CAPACITY VARIABILITY (%) | BATTERY PROPORTION: SELF-DISCHARGE RATE REACHED 3 TIMES AFTER START OF TEST |
|---|---|---|---|---|---|---|
| 21 | 7 | INK 1 | NMC | GRAPHITE | 2.4 | 0% |
| 22 | 8 | INK 2 | NMC | GRAPHITE | 2.6 | 0% |
| 23 | 9 | INK 3 | NMC | GRAPHITE | 2.8 | 0% |
| 24 | 10 | INK 4 | LFP | GRAPHITE | 2.9 | 0% |
| 25 | 11 | INK 5 | LFP | GRAPHITE | 2.3 | 0% |
| 26 | 12 | INK 6 | NMC | GRAPHITE | 3.0 | 0% |
| COMPARATIVE EXAMPLE 6 | COMPARATIVE TESTING BATTERY EXAMPLE 2 | NONE | NMC | GRAPHITE | 7.1 | 6% |

As illustrated in Table 4, Examples 21 to 26 corresponding to the testing battery examples 7 to 12 using electrodes having defect sites of the active material layer and film thickness defects corrected with the resin layer exhibited no self-discharge failure. By contrast, an electrode without any correction as in Comparative Example 6 exhibited self-discharge of 6%, indicating that the electrode in Comparative Example 6 exhibited inferior performance.

Examples 27 and 28

Electrodes fabricated with the same structure as those of the testing battery example 12 were passed through the electrode printing apparatus 1 and were read by the image recognition apparatus 9. Vertical stripes with 0.5 mm pitch were printed on the positive electrode and horizontal stripes with 0.5 mm pitch were printed on the negative electrode using Ink Examples 6 and 7 so as to be superimposed on the electrode image toward the surface of the electrode, and the obtained products were cured under the respective conditions of Table 2. Thereafter, 50 batteries were formed for each of the testing battery examples 13 and 14 that were assembled without sandwiching the separators 17 as illustrated in FIGS. 5A and 5B, and an accelerated cycle test was conducted for 2 weeks at a temperature of 50° C. (under the condition of SOC 5 to 95%) using a high temperature bath. As a result, Table 5 illustrates the proportion (%) of batteries whose self-discharge rate (also called spontaneous discharge), which seemed to be caused by precipitation of lithium (Li) metal or the like, reached 3 times the self-discharge rate after the start of the test.

Examples 29 to 34 and Comparative Examples 7 and 8

Each of the electrodes prepared to have the same configuration as the above-described testing battery examples 7 to 12 was allowed to pass through the electrode printing apparatus 1 again, and an image of the corresponding electrode was read by the image recognition apparatus 9. Then, based on the density of the read image, a filled and cured resin layer was formed so as to overlap the image by aiming at a portion of 1 mm from the end of the electrode, using the same liquid ink as that used for forming each frame pattern as a correction ink for filling a defect-end. Ten batteries were formed for each of the testing battery examples 15 to 20 that were assembled as illustrated in FIGS. 5A and 5B using the positive electrode and the negative electrode via the separators as described above.

Using the positive electrode and the negative electrode without forming the frame pattern and without filling the terminals of the electrodes; that is, using the positive electrode and the negative electrode without any correction, fifty comparative testing battery examples 3 that were assembled via a separators as depicted in FIGS. 5A and 5B were prepared.

Fifty of comparative testing battery examples 4 that were assembled as depicted in FIGS. 5A and 5B were formed via separators, using the positive electrode and the negative electrode without any correction, so as to have the same configuration as the testing battery example 7 of Table 4.

Vibration tests were conducted over 12 hours on the above testing battery examples 15 to 20 and comparative testing battery examples 3 and 4 using a 3-axis vibration

TABLE 5

| EXAMPLE | TESTING BATTERY EXAMPLE | FRAME FORMING INK EXAMPLE | SEPARATOR STRIPE FORMING INK | POSITIVE ELECTRODE | NEGATIVE ELECTRODE | BATTERY PROPORTION: SELF-DISCHARGE RATE REACHED 3 TIMES AFTER START OF TEST |
|---|---|---|---|---|---|---|
| 27 | 13 | INK 6 | INK 6 | NMC | GRAPHITE | 0% |
| 28 | 14 | INK 7 | INK 7 | NMC | GRAPHITE | 0% |

As depicted in Examples 27 and 28 of Table 5, by printing a large number of partial openings (patterns) on the electrode surface using the liquid ink according to the embodiment of the present invention, film electrodes without separators that exhibited no change in self-discharge were formed.

testing machine with a gravitational acceleration of 5 G (under the condition of SOC 50%). Table 6 illustrates the proportion (%) of batteries that reached SOC 40% after the battery voltage starting to drop due to self-discharge, which seemed to be caused by exfoliation of the active material layer at the end portion of the electrode, with respect to Examples 29 to 34 corresponding to the above-mentioned testing battery examples 15 to 20, and Comparative Examples 7 and 8 corresponding to comparative testing battery examples 3 and 4.

TABLE 6

| EXAMPLE | TESTING BATTERY EXAMPLE | FRAME FORMING INK EXAMPLE DEFECT-TERMINAL FILLING INK EXAMPLE | POSITIVE ELECTRODE | NEGATIVE ELECTRODE | BATTERY THAT REACHED SOC 40% |
|---|---|---|---|---|---|
| 29 | 15 | INK 1 | NMC | GRAPHITE | 0% |
| 30 | 16 | INK 2 | NMC | GRAPHITE | 0% |
| 31 | 17 | INK 3 | NMC | GRAPHITE | 0% |
| 32 | 18 | INK 4 | LFP | GRAPHITE | 0% |
| 33 | 19 | INK 5 | LFP | GRAPHITE | 0% |
| 34 | 20 | INK 6 | NMC | GRAPHITE | 0% |
| COMPARATIVE EXAMPLE 7 | COMPARATIVE TESTING BATTERY EXAMPLE 3 | NONE | NMC | GRAPHITE | 20% |
| COMPARATIVE EXAMPLE 8 | COMPARATIVE TESTING BATTERY EXAMPLE 4 | SAME AS TESTING BATTERY EXAMPLE 7 | NMC | GRAPHITE | 10% |

As illustrated in Table 6, cracking or exfoliation of the active material layer at the end portion of the electrode was eliminated by filling the end portion of the electrode with resin, which enabled to form a battery that is less susceptible to short circuit or the like against external factors such as vibration. In contrast, the electrode of Comparative Example 7 without any correction and the electrode of Comparative Example 8 only filling the end portion of the electrode exhibited voltage drops, failure such as short circuit, and the like.

As described above, according to the above-described embodiments and examples of the present invention, failure such as ignition and shortening of life will not be caused by post-process treatment or vibration during application. Further, according to the above-described embodiments and examples of the present invention, short circuit or leakage due to deposition of specific substances on defects at electrode surfaces, electrode end faces, or electrode interfaces, or mechanical contact of the interfaces will hardly occur. Accordingly, it is possible to achieve and provide a film electrode with high performance and less variability in performance such as variability in capacity and few defects as compared with those produced by conventional coating methods.

Further, it is also possible to achieve and provide a resin layer forming ink for forming a resin layer in the film electrode.

In addition, it is possible to achieve and provide an electrode printing apparatus that selectively forms a resin layer on at least one of the surface of the electrode base and the surface of the active material layer by using the resin layer forming ink.

As depicted in FIG. 4A and FIG. 4B above, the most significant feature of the present invention is as follows: a film electrode 15 composed of an active material layer 14a for a positive electrode on an electrode base 2 includes a frame pattern 11 adhering to at least one of a peripheral portion of the active material layer 14a and a surface of the active material layer 14a extending along a plane of a positive electrode base 2a of the electrode base 2.

Similarly, as depicted in FIGS. 4C and 4D above, a film electrode 25 composed of an active material layer 14b for a negative electrode on an electrode base 2 includes a frame pattern 11 adhering to at least one of a peripheral portion of the active material layer 14b and a surface of the active material layer 14b extending along a plane of a negative electrode base 2b of the electrode base 2.

Next, in order to form the above-mentioned inorganic layer, a specific example of an inorganic layer forming ink (hereinafter referred to as "liquid ink" or "functional ink") composed of a liquid in which an insulating inorganic material is dispersed according to one embodiment of the present invention will be described.

Examples of the inorganic material having insulating properties include metal oxides, metal nitrides, and other metal fine particles. Preferable examples of the metal oxide include $Al_2O_3$ (alumina), $TiO_2$, $BaTiO_3$, $ZrO_2$, or the like. Preferable examples of the metal nitride include aluminum nitride, silicon nitride, or the like. As other metal fine particles, insoluble ionic crystal fine particles such as aluminum fluoride, calcium fluoride, barium fluoride, barium sulfate and the like; substances derived from mineral resources such as boehmite, zeolite, apatite, kaolin, mullite, spinel, olivine, sericite, bentonite, and the like; or artifacts of these and the like may be preferable. As an inorganic material having insulating properties, glass ceramic powder may be given. The glass ceramic powder may preferably be a crystallized glass ceramic using $ZnO$—$MgO$—$Al_2O_3$-$SiO_2$ based crystallized glass; alternatively, a non-glass ceramic using a $BaO$-$Al_2O_3$-$SiO_2$ based ceramic powder or an $Al_2O_3$-$CaO$-$SiO_2$-$MgO$—$B_2O_3$ based ceramic powder or the like may be preferable.

The particle size of these inorganic materials is preferably 10 μm or less, and more preferably 3 m or less.

The above inorganic material is dispersed in a solvent (solvent medium) to prepare an inorganic layer forming ink. For the solvent to be used, a solvent suitable for the inorganic material to be dispersed may be selected. Specifically, water, a hydrocarbon solvent, an alcohol solvent, a ketone solvent, an ester solvent, and an ether solvent may be used.

A binding material is added when the inorganic material is dispersed in a solvent. The binding material has a function of fixing fine particles of an inorganic material in order to maintain the inorganic material as an insulating layer. As the binding material, acrylic-based resin, a styrene butadiene-based resin, polyvinylidene fluoride-based resin, or the like may be used.

When preparing the inorganic layer forming ink, an inorganic material may be dispersed using a homogenizer. Examples of the homogenizer may include a high-speed rotary shear stirring system, a high pressure jet dispersion system, an ultrasonic dispersion system, a medium stirring mill system, or the like.

Additives such as a dispersing agent and a surfactant may optionally be used when preparing the inorganic layer forming ink. MEGAFACE (DIC Co., Ltd.), MALIALIM (NOF Corporation), ESLEAM (NOF Corporation), SOLSPERSE (Lubrizol), POLYFLOW (Kyoeisha Chemical Co., Ltd.) and the like may be used as a dispersant and a surfactant. As other additives, propylene glycol, carboxymethyl cellulose or the like which is a thickening material for adjusting the viscosity may be used.

Examples 35 to 39 corresponding to Ink Examples 10 to 14 relating to the formulation of the inorganic layer forming ink, and Comparative Examples 9 to 11 corresponding to the comparative Ink Examples 15 to 17 will be described. Formulation details of Examples 35 to 39 corresponding to Ink Examples 10 to 14 and Comparative Examples 9 to 11 corresponding to Comparative Ink Examples 15 to 17 are summarized in Table 7 to be described later.

Ink Example 10

NanoTck Al2O3 which is alumina manufactured by CIK Nanotech Corporation as an inorganic material and acrylic binder AZ9129 manufactured by Zeon Corporation as a binding material were used. The primary particle size of NanoTek Al2O3 is 34 nm. 20 parts by weight of NanoTek Al2O3, 30 parts by weight of isopropyl glycol, 0.3 parts by weight of AZ9129 and 49.7 parts by weight of water were dispersed with a homogenizer. For the homogenizer, G-smasher manufactured by Rix Corporation was used. An inorganic layer forming ink 10 having an inorganic material with a central particle size of approximately 65 nm was thus obtained as Example 35.

In Table 7 and the like, isopropyl glycol is Solvent 2 and is abbreviated as "IPG". Water is Solvent 1.

Ink Example 11

AA-05 which is alumina manufactured by Sumitomo Chemical Co., Ltd. as an inorganic material, acrylic binder AZ9129 manufactured by Zeon Corporation as a binding material, and MALIALIM HKM-50A manufactured by NOF Corporation as a dispersant were used. The primary particle size of AA-05 is 0.53 μm. 20 parts by weight of AA-05, 30 parts by weight of isopropyl glycol, 0.3 parts by weight of AZ9129, 0.2 parts by weight of HKM-50A and 49.5 parts by weight of water were dispersed with a homogenizer. For the homogenizer, US-600AT manufactured by NISSEI Corporation was used. An inorganic layer forming ink example 11 having an inorganic material with an average particle size of approximately 0.63 μm was thus obtained as Example 36.

In Table 7, MALIALIM HKM-50A manufactured by NOF Corporation is abbreviated as "HKM 50A".

Ink Example 12

AA-05 which is alumina manufactured by Sumitomo Chemical Co., Ltd. as an inorganic material, acrylic binder AZ9129 manufactured by Zeon Corporation as a binding material, MALIALIM HKM-50A manufactured by NOF Corporation as a dispersant, and carboxymethyl cellulose were as a thickener were used. The primary particle size of AA-05 is 0.53 μm. 20 parts by weight of AA-05, 30 parts by weight of isopropyl glycol, 0.3 parts by weight of AZ9129, 0.2 parts by weight of HKM-50A, 0.1 parts by weight of carboxymethyl cellulose, and 49.49 parts by weight of water were dispersed with a homogenizer. For the homogenizer, US-600AT manufactured by NISSEI Corporation was used. An inorganic layer forming ink example 12 having an inorganic material with an average particle size of approximately 0.63 μm was thus obtained as Example 37.

In Table 7, carboxymethyl cellulose as a thickening material is abbreviated as "CMC" in "Others".

Ink Example 13

AA-05 which is alumina manufactured by Sumitomo Chemical Co., Ltd. as inorganic material, polyvinylidene fluoride-based binder #9100 manufactured by Kureha Corporation as a binding material, and MALIALIM SC-0505K manufactured by NOF Corporation as a dispersant were used. The primary particle size of AA-05 is 0.53 μm. 25 parts by weight of AA-05, 25 parts by weight of N-methyl-2-pyrrolidone, 0.375 parts by weight of #9100, 0.25 parts by weight of SC-0505K and 49.375 parts by weight of methyl ethyl ketone were dispersed with a homogenizer. For the homogenizer, NP-100 manufactured by THINKY Corporation was used. An inorganic layer forming ink example 13 having an inorganic material with an average particle size of approximately 0.5 μm was thus obtained as Example 38.

In Table 7 and the like, the polyvinylidene fluoride-based binder #9100 manufactured by Kureha Corporation is abbreviated as "Kureha #9100" and the MALIALIM SC-0505K manufactured by Corporation is abbreviated as "SC 0505K". In addition, N-methyl-2-pyrrolidone is Solvent 1, which is abbreviated as "NMP", methyl ethyl ketone is Solvent 2, which is abbreviated as "MEK".

Ink Example 14

AA-05 which is alumina manufactured by Sumitomo Chemical Co., Ltd. as inorganic material, polyvinylidene fluoride-based binder Solfe 5130 manufactured by Solvay as a binding material, and MALIALIM SC-0505K manufactured by NOF Corporation as a dispersant were used. The primary particle size of AA-05 is 0.53 μm. 25 parts by weight of AA-05, 25 parts by weight of N-methyl-2-pyrrolidone, 0.375 parts by weight of Solfe 51300, 0.25 parts by weight of SC-0505K and 49.375 parts by weight of methyl ethyl ketone were dispersed with a homogenizer. For the homogenizer, NP-100 manufactured by THINKY Corporation was used. An inorganic layer forming ink example 14 having an inorganic material with an average particle size of approximately 0.5 μm was thus obtained as Example 39.

In Table 7, polyvinylidene fluoride-based binder Solfe 5130 manufactured by Solvay is abbreviated as "Solfe 5130".

Comparative Ink Example 15

NanoTek Al2O3 which is alumina manufactured by CIK Nanotech Corporation as an inorganic material and acrylic binder AZ9129 manufactured by Zeon Corporation as a binding material were used. The primary particle diameter of NanoTek Al2O3 is 34 nm. 20 parts by weight of NanoTek Al2O3, 0.3 parts by weight of AZ9129 and 79.7 parts by weight of water are dispersed with a homogenizer. For the homogenizer, G-smasher manufactured by Rix Corporation was used.

An inorganic layer forming ink example 15 having an inorganic material with an average particle size of approximately 65 nm was thus obtained as Comparative Example 9.

Comparative Ink Example 16

AA-05 which is alumina manufactured by Sumitomo Chemical Co., Ltd. as an inorganic material, acrylic binder AZ9129 manufactured by Zeon Corporation as a binding material, and MALIALIM HKM-50A manufactured by NOF CORPORATION as a dispersant were used. The primary particle size of AA-05 is 0.53 sm. 20 parts by weight of AA-05, 0.3 parts by weight of AZ9129, 0.2 parts by weight of HKM-50A and 79.5 parts by weight of water were dispersed with a homogenizer. For the homogenizer, US-600AT manufactured by NISSEI Corporation was used. An inorganic layer forming ink example 16 having an inorganic material with an average particle size of approximately 0.7 µm was thus obtained as Comparative Example 10.

Comparative Ink Example 17

AA-3 which is alumina manufactured by Sumitomo Chemical Co., Ltd. as inorganic material, polyvinylidene fluoride-based binder #9100 manufactured by Kureha Corporation as a binding material, and MALIALIM SC-0505K manufactured by NOF Corporation as a dispersant were used. The primary particle size of AA-3 is 3.4 m. 25 parts by weight of AA-3, 25 parts by weight of N-methyl-2-pyrrolidone, 0.375 parts by weight of #9100, 0.25 parts by weight of SC-0505K and 49.375 parts by weight of methyl ethyl ketone were dispersed with a homogenizer. For the homogenizer, NP-100 manufactured by THINKY Corporation was used. An inorganic layer forming ink example 17 having an inorganic material with an average particle size of approximately 5 µm was thus obtained as Comparative Example 11.

rial, and an acrylic binder AZ9129 manufactured by Zcon Corporation as a binding material were used. The primary particle size of BMSA-18GN is 0.804 µm. 20 parts by weight of BMSA-18GN, 0.5 parts by weight of AZ9129, 30 parts by weight of butyl acetate, and 49.5 parts by weight of isopropyl glycol were dispersed with a homogenizer. For the homogenizer, US-600AT manufactured by NISSEI Corporation was used. A resin layer forming ink example 19 having a resin material with an average particle size of approximately 0.65 µm was thus obtained as Example 41.

TABLE 8

| EXAMPLE | INK NUMBER | RESIN MATERIAL | SOLVENT 1 | SOLVENT 2 | BINDING MATERIAL |
|---|---|---|---|---|---|
| 40 | INK 18 | PMMA | MEK | IPG | AZ9129 |
| 41 | INK 19 | PMMA | Butyl acetate | IPG | AZ9129 |

TABLE 7

| EXAMPLE | INK NUMBER | INORGANIC MATERIAL | SOLVENT 1 | SOLVENT 2 | BINDING MATERIAL | DISPERSANT | OTHERS |
|---|---|---|---|---|---|---|---|
| 35 | INK 10 | $Al_2O_3$ 1*[1] | WATER | IPG | AZ9129 | NONE | NONE |
| 36 | INK 11 | $Al_2O_3$ 2*[2] | WATER | IPG | AZ9129 | HKM50A | NONE |
| 37 | INK 12 | $Al_2O_3$ 2*[2] | WATER | IPG | AZ9129 | HKM50A | CMC |
| 38 | INK 13 | $Al_2O_3$ 2*[2] | NMP | MEK | Kureha#9100 | SC0505K | NONE |
| 39 | INK 14 | $Al_2O_3$ 2*[2] | NMP | MEK | Solfe5130 | SC0505K | NONE |
| COMPARATIVE EXAMPLE 9 | INK 15 | $Al_2O_3$ 1*[1] | WATER | NONE | AZ9129 | NONE | NONE |
| COMPARATIVE EXAMPLE 10 | INK 16 | $Al_2O_3$ 2*[2] | WATER | NONE | AZ9129 | HKM50A | NONE |
| COMPARATIVE EXAMPLE 11 | INK 17 | $Al_2O_3$ 3*[3] | NMP | MEK | Kureha#9100 | SC0505K | NONE |

*[1]$Al_2O_3$ 1: NanoTek $Al_2O_3$
*[2]$Al_2O_3$ 2: AA-05
*[3]$Al_2O_3$ 3: AA-3

Examples 40 and 41 corresponding to Ink Examples 18 and 19 are described with respect to the formulation of the resin layer forming ink. These Ink Examples 18 and 19 had different formulations from Ink Examples 1 to 7 corresponding to resin layer forming Ink Examples 1 to 7 in Table 1. The detailed formulations of Examples 40 and 41 corresponding to Ink Examples 18 and 19 are summarized in Table 8 to be described later.

Ink Example 18

BMSA-18GN which is polymethylmethacrylate resin manufactured by Sekisui Plastics Co., Ltd. as a resin material, and an acrylic binder AZ9129 manufactured by Zeon Corporation as a binding material were used. The primary particle size of BMSA-18GN is 0.804 m. 20 parts by weight of BMSA-18GN, 0.5 parts by weight of AZ9129, 30 parts by weight of methyl ethyl ketone, and 49.5 parts by weight of isopropyl glycol were dispersed with a homogenizer. For the homogenizer, US-600AT manufactured by NISSEI Corporation was used. A resin layer forming ink example 18 having a resin material with an average particle size of approximately 0.75 µm was thus obtained as Example 40.

In Table 8, polymethyl methacrylate resin is abbreviated as "PMMA".

Ink Example 19

BMSA-18GN which is polymethylmethacrylate resin manufactured by Sekisui Plastics Co., Ltd. as a resin mate- Examples 35 to 39, 40 and 41, Comparative Examples 9 to 11

Examples 35 to 39 using the inorganic layer forming ink examples 10 to 14, Comparative Examples 9 to 11 using the inorganic layer forming ink examples 15 to 17, and Examples 40 and 41 using the resin layer forming ink examples 18 and 19 will be described with reference to Table 9 below. For simplifying the following description, the same numbers are used for the numbers of Examples and the Comparative Example illustrated in Table 9 with respect to the formulations of the ink example and the comparative ink example illustrated in Tables 7 and 8.

As illustrated in Table 9, electrode frame printing was performed by ejecting the inorganic layer forming ink examples 10 to 14, the comparative inorganic layer forming ink examples 15 to 17, and the resin layer forming ink examples 18 and 19 onto an aluminum foil (positive electrode base) acting as the electrode base 2, using the electrode printing apparatus 1 depicted in FIG. 1. In Examples 35 to 39, the inorganic layer forming ink examples 10 to 14 were used. In Comparative Examples 9 to 11, comparative inorganic layer forming ink examples 15 to 17 were used. In Examples 40 and 41, the resin layer forming ink examples 18 and 19 were used.

Printing was performed by ejecting liquid ink from the head without heating using an industrial inkjet MH2420 manufactured by Ricoh Company, Ltd. Drying was performed using a heater 6 at a drying temperature of 60 to 120° C. The respective Ink Examples were ejected onto the surface of the electrode base made of aluminum foil while mutually adjusting the transfer speed by the transfer mechanism 3 and the driving frequency of 10 to 30 kHz of the liquid ejection head 4. Then, the above-mentioned conditions were adjusted such that the ink layer formed by the liquid ink of each ink example was dried at the heater 6 portion and the film thickness after drying was 2 μm. Accordingly, the results illustrated in Table 9 were obtained for Examples 35 to 41 and Comparative Examples 9 to 11.

TABLE 9

| EXAMPLE | INK NUMBER | VISCOSITY (mPa·sec) | SURFACE TENSION (mN/m) | EJECTABILITY | TRANSFER SPEED (DRIVE FREQUENCY) |
|---|---|---|---|---|---|
| 35 | INK 10 | 4.3 | 33.3 | EJECTABLE | 10 m/min (10 kHz) |
| 36 | INK 11 | 4.2 | 32.3 | EJECTABLE | 10 m/min (10 kHz) |
| 37 | INK 12 | 9.7 | 32.0 | EJECTABLE | 10 m/min (10 kHz) |
| 38 | INK 13 | 5.0 | 29.0 | EJECTABLE | 20 m/min (20 kHz) |
| 39 | INK 14 | 6.0 | 29.5 | EJECTABLE | 20 m/min (20 kHz) |
| COMPARATIVE EXAMPLE 9 | INK 15 | 2.0 | 35.8 | MANY EJECTABLE | — |
| COMPARATIVE EXAMPLE 10 | INK 16 | 3.9 | 26.0 | MANY EJECTABLE | — |
| COMPARATIVE EXAMPLE 11 | INK 17 | 6.0 | 28.0 | MANY EJECTABLE | — |
| 40 | INK 18 | 10.0 | 35.0 | EJECTABLE | 20 m/min (20 kHz) |
| 41 | INK 19 | 15.0 | 40.0 | EJECTABLE | 20 m/min (20 kHz) |

The results in Table 9 indicate that with comparative inorganic layer forming Ink Examples 15 to 17 corresponding to Comparative Examples 9 to 11, head drying or head clogging occurred, and satisfactory ink jet discharge failed. Specifically, the solvent used for the Comparative Ink Examples 15 and 16 in Comparative Examples 9 to 11 was only water as illustrated in Table 7. This may have dried the head easily, and when ink jet discharge is continuously performed, the number of head nozzles failing to eject ink gradually increases. In such a case, wetting the head surface using a wipe moistened with ink seems to restore the head surface. From this, it is assumed that the head surface may be dry.

In the inorganic layer forming Ink Examples 10 to 12 corresponding to Examples 35 to 37, the solvent is a mixed solution of water and isopropyl glycol, and isopropyl glycol has an effect of preventing the head from drying, which enables the head to eject liquid ink continuously.

In the comparative ink example 17 in Comparative Example 11, as illustrated in Table 7, the alumina particles blocked the head nozzles, which disables the head nozzles to eject the liquid ink continuously. The average particle size of the inorganic material in the comparative ink example 17 is approximately 5 μm, which is larger than the pigment size of a general pigment ink jet ink.

In contrast, the average particle size of the inorganic materials of Ink Examples 13 and 14 in Examples 38 and 39 is approximately 0.5 μm, which enables the head nozzles to eject continuously without blocking the head nozzles.

The Ink Examples 13 and 14 in Examples 38 and 39 and the Comparative Ink Example 17 in Comparative Example 11 employ a mixed solvent of n-methyl-2-pyrrolidone (NMP) and methyl ethyl ketone (MEK) as illustrated in Table 7. N-methyl-2-pyrrolidone is the solvent for dissolving the binder polyvinylidene fluoride. However, the liquid ejection head 4 (MH 2420) does not have the solvent resistance to N-methyl-2-pyrrolidone. Accordingly, the ink is prepared with a solvent mixed with solvent-resistant methyl ethyl ketone. Note that there is no problem in using the mixed solvent in the liquid ejection head 4 (the above MH2420).

The following illustrates, with reference to FIGS. 6 to 9, a film electrode according to another embodiment differing from the film electrode obtained by the main manufacturing process of the film electrode illustrated in FIGS. 2A to 4D. FIG. 6 is a cross-sectional view depicting a configuration of a film electrode according to another embodiment. Note that for the simplicity of illustration and description, the film electrode illustrated in FIG. 6 to 9 illustrates an example in which a film electrode is formed only on one side.

The film electrode of FIG. 6 has a structure in which an active material layer 14 and a resin layer 12b are stacked in this order on an electrode base 2.

That is, the film electrode of FIG. 6 is configured to have a single resin layer 12 adhering to the peripheral portion of the active material layer 14 and the surface of the active material layer 14 extending along the plane of the electrode base 2. The resin layer 12 is formed on the active material layer 14 formed in advance on the electrode base 2 by a die coater or the like In this case, the resin layer 12b is stacked on the active material layer 14 on which electrode-pressing has been performed with a force of 100 kN.

With a positive electrode, an aluminum foil is used as the electrode base, 20 to 100 μm of a positive electrode material such as NMC, LFP, and NCA (nickel cobalt aluminum composite oxide) is formed with a die coater or the like. The resin layer forming ink made of a resin material is ejected by a liquid ejection apparatus having a liquid ejection head 4 and the like depicted in FIG. 10 so as to cover the peripheral portion of the positive electrode material to form 1 to 5 μm of a resin layer 12b. Ink examples 18 and 19 in Table 8 may be used as the resin layer forming ink.

With a negative electrode, a copper foil is used as the electrode base, 20 to 100 μm of a negative electrode material such as graphite is formed with a die coater or the like. The resin layer forming ink made of a resin material is ejected by a liquid ejection apparatus so as to cover the peripheral portion of the negative electrode material to form 1 to 5 μm of a resin layer 12b. Ink examples 18 and 19 may be used as the resin layer forming ink.

The resin layer 12b is formed after curing of a resin ink layer 12a depicted in (f) of FIG. 10B to be described later. The resin layer 12b has insulating properties and ion permeability.

The use of Ink Examples 1 to 7 in Table 1 for the resin layer 12b to form a film electrode illustrated in FIG. 6 is not preferable in view of ionic permeability. According to the film electrode of FIG. 6, since the resin layer 12b of the film electrode has insulating properties and ion permeability, the film electrode does not affect battery performance. Specifically, PMMA (polymethylmethacrylate resin) has insulating properties. Since the resin layer 12b is formed of PMMA particles, the resin layer 12b becomes a film having numerous hollow walls and void space, providing ion permeability.

In addition, since the peripheral portion of the active material layer 14 is covered with the resin layer 12b, the initial failure of the battery may be reduced.

The following illustrates, with reference to FIG. 7, a film electrode according to another embodiment differing from the film electrode of FIG. 6. FIG. 7 is a cross-sectional view depicting a configuration of a film electrode according to another embodiment differing from that in FIG. 6.

The film electrode of FIG. 7 has a structure in which an active material layer 14 and an inorganic layer 26b are stacked in this order on an electrode base 2.

That is, the film electrode of FIG. 7 is a (thin) film electrode having an electrode base 2 and an active material layer 14 on the electrode base 2, and is configured to have an inorganic layer 26b adhering to the peripheral portion of the active material layer 14 and to the surface of the active material layer 14 extending along the plane of the electrode base 2 to form a single (one) inorganic layer 26b. The inorganic layer 26b is formed on the active material layer 14 formed in advance on the electrode base 2 by a die coater or the like. In this case, the inorganic layer 26b is stacked on the active material layer 14 on which electrode-pressing has been performed with a force of 100 kN.

For a positive electrode, an aluminum foil is used as the electrode base, and 20 to 100 μm of a positive electrode material such as NMC, LFP, NCA (nickel cobalt aluminum composite oxide) is formed with a die coater or the like. The inorganic layer forming ink made of an inorganic material is ejected by a liquid ejection apparatus so as to cover the peripheral portion of the positive electrode material to form 1 to 5 μm of an inorganic layer 26b. Ink examples 13 and 14 in Table 7 may be used as the inorganic layer forming ink. Since the positive electrode material is easily affected by water, Ink Examples 10, 11 and 12 having the aqueous solvent illustrated in Table 7 are not desirable.

For a negative electrode, a copper foil is used as the electrode base, and 20 to 100 μm of a negative electrode material such as graphite is formed with a die coater or the like. The inorganic layer forming ink made of an inorganic material is ejected by a liquid ejection apparatus so as to cover the peripheral portion of the negative electrode material to form 1 to 5 μm of an inorganic layer 26b.

Ink examples 10, 11, 12, 13 and 14 may be used as the inorganic layer forming ink.

The inorganic layer 26b is formed after curing of an inorganic ink layer 26a depicted in FIG. 10B to be described later. The inorganic layer 26b has insulating properties and ion permeability.

According to the film electrode of FIG. 7, since the inorganic layer 26b of the film electrode has insulating properties and ion permeability, the film electrode does not affect battery performance. Since the inorganic layer 26b is formed of alumina particles, the inorganic layer 26 becomes a film with numerous hollow walls and void space, providing ion permeability. The film electrode having the inorganic layer 26b depicted in FIG. 7 has improved heat resistance as compared with the film electrode having the resin layer 12b illustrated in FIG. 6. Accordingly, the heat resistant temperature when the battery exhibits thermal runaway is improved, and the film electrode having the inorganic layer 26 provides an effect of preventing ignition. Note that the film electrode having the inorganic layer 26b depicted in FIG. 7 exhibits a demerit effect of having reduced adhesiveness with respect to the electrode base 2 as compared with the film electrode having the resin layer 12b illustrated in FIG. 6.

The following illustrates, with reference to FIG. 8, a film electrode according to another embodiment differing from the film electrode of FIG. 6 or FIG. 7. FIG. 8 is a cross-sectional view depicting a configuration of a film electrode according to another embodiment differing from the film electrode of FIG. 6 or FIG. 7.

In the film electrode of FIG. 8, an active material layer 14 and an inorganic layer 26b are stacked in this order on an electrode base 2, and the periphery of the active material layer 14 and the inorganic layer 26 is covered with a frame pattern 11.

That is, the film electrode of FIG. 8 is configured to have a frame pattern 11 of a resin layer adhering to the peripheral portion of the active material layer 14, and an inorganic layer 26b adhering to the surface of the active material layer 14 extending along the plane of the electrode base 2. Hence, the film electrode of FIG. 8 has a structure having two layers of the frame pattern 11 and the inorganic layer 26b.

Such a configuration of the film electrode of FIG. 8 may be formed as follows. A frame pattern 11 of a resin layer is formed in advance on the electrode base 2 using a liquid ejection head or the like. An active material layer 14 is formed within the frame pattern 11 using a liquid ejection head or the like, and electrode-pressing is performed with a force of 100 kN to increase the volume density of the active material. Furthermore, an inorganic layer forming ink is ejected onto the active material layer 14 using a liquid ejection head or the like to form an inorganic layer 26b.

An alternative manufacturing procedure will be described below. A resin layer forming ink is ejected by the liquid ejection apparatus to a peripheral portion of the active material layer 14 formed in advance on the electrode base 2 by a die coater or the like to form the frame pattern 11 of a resin layer. Then, the inorganic layer forming ink is discharged onto the active material layer 14, on which electrode-pressing has been performed with a force of 100 kN, using a liquid ejection apparatus to form an inorganic layer 26b. The film electrode of FIG. 8 may also be formed by following the above manufacturing procedure.

For the positive electrode, aluminum foil is used as the electrode base, and 20 to 100 μm of the frame pattern 11 of the resin layer is formed using a liquid ejection head or the like. An active material forming ink for a positive electrode such as NMC, LFP, NCA (nickel cobalt aluminum composite oxide) or the like is ejected within the frame pattern 11 by a liquid ejection head or a die coater, thereby forming an active material layer 14a of a positive electrode with a thickness of 20 to 100 μm. An inorganic layer forming ink made of an inorganic material is ejected in an area equal to or larger than that of the positive electrode material using a liquid ejection head, thereby forming an inorganic layer 26b with a thickness of 1 to 5 μm. Ink examples 13 and 14 may be used as the inorganic layer forming ink. Since the positive electrode material is easily affected by water, Ink Examples 10, 11 and 12 having the aqueous solvent illustrated in Table 7 are not desirable. Further, the active material layer 14a of the positive electrode and the frame pattern 11 may be formed by another manufacturing procedure as described above.

For the positive electrode, copper foil is used as the electrode base, and 20 to 100 μm of the frame pattern 11 of the resin layer is formed using a liquid ejection head or the like. An active material forming ink for a negative electrode such as graphite or the like is ejected within the frame pattern 11 using a liquid ejection head or a die coater, thereby forming an active material layer 14b of a negative electrode with a thickness of 20 to 100 m. An inorganic layer forming ink made of an inorganic material is ejected to an area equal to or larger than that of the negative electrode material using a liquid ejection head, thereby forming an inorganic layer 26b with a thickness of 1 to 5 m. Ink examples 10, 11, 12, 13 and 14 may be used as the inorganic layer forming ink. Further, the active material layer 14b of the negative electrode and the frame pattern 11 may be formed by another manufacturing procedure.

According to the film electrode of FIG. 8, it is possible to prevent ignition when the battery exhibits thermal runaway by forming the inorganic layer 26b on the active material layer 14, and to simultaneously reduce the initial failure of the battery by forming the frame pattern 11 having satisfactory adhesion to the electrode base 2 on the periphery of the active material and the inorganic layer.

The following illustrates, with reference to FIG. 9A, a film electrode according to another embodiment differing from the film electrodes of FIG. 6 to FIG. 8. FIG. 9A is a cross-sectional view depicting a configuration of a film electrode according to another embodiment differing from the film electrode of FIG. 6 or FIG. 8.

FIG. 9 illustrates an example in which the active material layer 14, the inorganic layer 26b, and the resin layer 12b are formed in this order on the electrode base 2: the end portion on the periphery of the active material layer 14 is covered with the frame pattern 11 of the resin layer, and the frame pattern 11 and the electrode base 2 are thus in contact with each other.

That is, the film electrode of FIG. 9A is configured to have an electrode base 2 and an active material layer 14 formed on the electrode base 2, where an inorganic layer 26b adhering to the surface of the active material layer 14, a frame pattern 11 adhering to the peripheral portion of the active material layer 14, and the a resin layer 12b adhering to the surface of the inorganic layer 26b extend along the plane of the electrode base 2. Hence, the film electrode of FIG. 9 has a structure having two layers of the resin layer and the inorganic layer.

Such a configuration of the film electrode of FIG. 9A may be formed as follows. A frame pattern 11 of a resin layer is formed in advance on the electrode base 2 using a liquid ejection head or the like. An active material layer 14 is formed within the frame pattern 11 using a liquid ejection head or the like, and electrode-pressing is performed with a force of 100 kN to increase the volume density of the active material. Furthermore, an inorganic layer forming ink is ejected onto the active material layer 14 using a liquid ejection head or the like to form the inorganic layer 26b.

For the positive electrode, aluminum foil is used as the electrode base, and 20 to 100 μm of the frame pattern 11 of the resin layer is formed using a liquid ejection head or the like. An active material forming ink for a positive electrode such as NMC, LFP, NCA (nickel cobalt aluminum composite oxide) or the like is ejected within the frame pattern 11 by a liquid ejection head or a die coater, thereby forming an active material layer 14a of a positive electrode with a thickness of 20 to 100 m. An inorganic layer forming ink made of an inorganic material is ejected in an area equal to or larger than that of the positive electrode material using a liquid ejection head, thereby forming an inorganic layer 26b with a thickness of 1 to 5 μm. Ink examples 13 and 14 in Table 7 may be used as the inorganic layer forming ink. Since the positive electrode material is easily affected by water, Ink Examples 10, 11 and 12 having the aqueous solvent illustrated in Table 7 are not desirable. A resin layer forming ink made of a resin material is ejected by a liquid ejection apparatus onto the surface of the inorganic layer 26b and the peripheral portion of the frame pattern 11 to form 5 to 10 μm of a resin layer 12b. Ink examples 18 and 19 may be used as the resin layer forming ink.

For the positive electrode, copper foil is used as the electrode base, and 20 to 100 μm of the frame pattern 11 of the resin layer is formed using a liquid ejection head or the like. An active material forming ink for a negative electrode such as graphite or the like is ejected within the frame pattern 11 using a liquid ejection head or a die coater, thereby forming an active material layer 14b of a negative electrode with a thickness of 20 to 100 μm. An inorganic layer forming ink made of an inorganic material is ejected to an area equal to or larger than that of the negative electrode material using a liquid ejection head, thereby forming an inorganic layer 26b with a thickness of 1 to 5 μm. Ink examples 10, 11, 12, 13 and 14 in Table 7 may be used as the inorganic layer forming ink. A resin layer forming ink made of a resin material is ejected by a liquid ejection apparatus onto the surface of the inorganic layer 26b and the peripheral portion of the frame pattern 11 to form 5 to 10 μm of a resin layer 12b. Ink examples 18 and 19 in Table 8 may be used as the resin layer forming ink.

The use of Ink Examples 1 to 7 in Table 1 for the resin layer 12b to form a film electrode illustrated in FIG. 9A is not preferable in view of ionic permeability.

According to the film electrode of FIG. 9A, it is possible to prevent ignition when the battery exhibits thermal runaway by forming the inorganic layer 26b on the active material layer 14, and to simultaneously reduce the initial failure of the battery by forming a frame pattern 11 having satisfactory adhesion to the electrode base 2 on the periphery of the active material 14 and the inorganic layer 26b. In addition, the total thickness of the inorganic layer 26b and the resin layer 12b is set to 5 to 10 μm, which is thicker than the inorganic layer 26b or the resin layer 12b when forming the film electrode of FIGS. 6 to 8. When forming a battery with the film electrode illustrated in FIGS. 6 to 8, a cellulose-made separator having a thickness of 15 μm was required. In the configuration of the film electrode illustrated in FIG. 9A, the total thickness of the inorganic layer 26b and the resin layer 12b is formed to have a sufficient thickness. Hence, it is possible to form a battery configuration that does not require a separator, thereby reducing the cost.

FIG. 9B is a view illustrating a film electrode according to another embodiment differing from that of FIG. 9A. In FIG. 9A, a frame pattern 11 of a resin layer is formed, and an active material layer 14 is formed within the frame pattern 11 using a liquid ejection head or the like. In FIG. 9B, the active material layer 14 is formed directly on the electrode base 2 using a die coater or the like. The inorganic layer 26b and the resin layer 12b are formed in the same manner as those of FIG. 9A.

As described above, configuration examples of the film electrode are depicted in FIGS. 6 to 9; however, the embodiments of the present invention are not limited to these configuration examples.

With reference to FIGS. 10A, 10B and 10C, a main part of the film electrode fabrication process depicted in FIGS. 6 to 9 will be described. FIGS. 10A, 10B and 10C are views each schematically depicting a main part of a manufacturing process of the film electrode depicted in FIG. 9A.

First, as illustrated in (a) of FIG. 10A and (b) of FIG. 10A, in the electrode printing apparatus 1 as depicted in FIG. 1, the resin ink 10 is ejected onto the electrode base 2 by the liquid ejection head 4 or 7 to form the resin ink layer 10a in a frame shape. Subsequently, the resin ink layer 10a is cured by the light source 5 to form a frame pattern 11. In this step, the image recognition apparatus 9 of the electrode printing apparatus 1 in FIG. 1 detects a range in which the frame pattern 11 is formed.

As illustrated in (c) of FIG. 10A, the positive electrode active material layer forming ink 13a or the negative electrode active material layer forming ink 13b is formed inside the detected range of the frame pattern 11 by ejecting an applying the active material layer forming ink by the liquid discharge head 4 or 7. As illustrated in (d) of FIG. 10A, after drying the active material layer 14a or the active material layer 14b, electrode pressing is performed with a force of 100 kN to increase the volume density of the active material layer. Further, the image recognition apparatus 9 detects ranges of the frame pattern 11 of the resin layer and the active material layer 14, and the liquid discharge head 4 or 7 provided in the liquid ejection apparatus ejects a resin layer forming ink or an inorganic layer forming ink according to an embodiment of the present invention (liquid resin ink 12 or the inorganic ink 26) to cover the active material layer 14, thereby forming a resin ink layer 12a or an inorganic ink layer 26a (see (f) in FIG. 10B).

Next, as illustrated in (f) to (g) of FIG. 10B, when the ejected liquid ink is a resin layer forming ink, the resin layer forming ink is irradiated with ultraviolet rayd 5a or the like emitted from the light source 5 to cure the resin ink layer. When the ejected liquid ink is an inorganic layer forming ink, the inorganic layer forming ink is irradiated, heated, and dried with infrared rays 6a or the like emitted from the heater 6. The ejected liquid ink may be cured by the light source 5 in accordance with the type of the liquid ink. Further, as illustrated in (h) to (i) of FIG. 10B, the liquid discharge head 4 or 7 provided in the liquid ejection apparatus ejects a resin layer forming ink or an inorganic layer forming ink according to an embodiment of the present invention (liquid resin ink 12 or the inorganic ink 26) to form a resin ink layer 12a or an inorganic ink layer 26a on an inorganic ink layer 26b or a resin ink layer 12b. When the ejected liquid ink is a resin layer forming ink, the resin layer forming ink is irradiated with ultraviolet rays 5a or the like emitted from the light source 5 to cure the resin ink layer. When the ejected liquid ink is an ink for an inorganic layer forming ink, the inorganic layer forming ink is irradiated, heated, and dried with infrared rays 6a or the like emitted from the heater 6 (see (j) of FIG. 10C).

Note that (k) of FIG. 10C is a cross-sectional view when film electrodes are formed on both surfaces of the electrode base 2.

FIGS. 10A, 10B, and 10C are views illustrating a process of forming the film electrode illustrated in FIG. 9A; however, when forming the film electrode illustrated in FIGS. 6 to 8, and FIG. 9B, the electrode film may be formed by using a part of the process illustrated in FIGS. 10A, 10B, and 10C.

In the case of forming the film electrode of FIGS. 6 and 7, the step of forming the frame pattern 11 as the resin layer depicted in (a) and (b) of FIG. 10A may be omitted and steps as depicted in (c) of FIG. 10A to (g) of FIG. 10B may be performed to form such a film electrode.

In the case of forming the film electrode of FIG. 8, steps (a) of FIG. 10A to (g) of FIG. 10B may be performed to form such a film electrode.

In the case of forming the film electrode of FIG. 9B, the step of forming the frame pattern 11 as the resin layer depicted in (a) and (b) of FIG. 10A may be omitted and steps as depicted in (c) of FIG. 10A to (i) of FIG. 10B may be performed to form such a film electrode.

Note that the manufacturing process of the thin film electrode according to an embodiment of the present invention is not limited to examples in FIGS. 10A, 10B, 10C, and the like.

The following illustrates, with reference to FIGS. 11A and 11B, a structure of a testing battery configured by stacking the film electrode of FIG. 8 in layer. FIG. 11A is an enlarged view depicting a part of FIG. 11B in which the film electrodes of FIG. 8 are stacked, and FIG. 11B is a cross sectional view depicting a structure of a testing battery. The outer package of the test battery depicted in FIG. 11B is the same as FIG. 5B.

As depicted in FIGS. 4A to 4D, the film electrode was punched by a press such that the outer peripheral shape is 11 cm squared while leaving a portion to be the tab 2c or the tab 2d formed on the film electrode illustrated in FIG. 8 (provided on both the front surface and rear surface of the electrode base 2) in a predetermined shape.

Then, the tab 2c of the positive electrode 15 and the tab 2d of the negative electrode 25 were disposed so as not to overlap each other and electrode-pressing was subsequently performed with a force of 100 kN. Subsequently, as partially depicted in an enlarged view of FIG. 11A, ten layers of a cellulosic separator 17 having a thickness of 15 μm and sandwiched between the positive electrode 15 and the negative electrode 25 were stacked in layer. Thereafter, the tabs 2c were welded to one another and the tabs 2d were welded to one another, and the obtained product was then sealed with a laminate film 18 to form a bag-like exterior package 19. Thereafter, an ethylene carbonate electrolytic solution 20 having lithium hexafluorophosphate (LiPF6) and lithium tetrafluoroborate (LiBF4) as electrolytes was injected into the exterior package 19 to form a lithium ion secondary battery 21 so as to prepare 50 samples of the lithium ion secondary battery 21 for each of the testing battery examples 21 to 26.

The following illustrates, with reference to FIGS. 12A and 12B, a structure of a testing battery configured by stacking the film electrodes of FIG. 9. FIG. 12A is an enlarged view depicting a part of FIG. 12B in which the film electrodes of FIG. 9 are stacked, and FIG. 12B is a cross sectional view depicting a structure of a testing battery. The outer package of the test battery depicted in FIG. 12B is the same as FIG. 5B.

As depicted in FIGS. 4A to 4D, the film electrode was punched by a press such that the outer peripheral shape is 11 cm squared while leaving a portion to be the tab 2c or the tab 2d formed on the film electrode illustrated in FIGS. 9A and 9B (provided on both the front surface and rear surface of the electrode base 2) in a predetermined shape.

Subsequently, electrode-pressing is performed with a force of 100 kN on the tab 2c of the positive electrode 15 and the tab 2d of the negative electrode 25 that were not overlapped each other, and as depicted in the enlarged view of FIG. 12A, the positive electrode 15 and the negative electrode 25 were stacked in 10 layers. Thereafter, the tabs 2c were welded to one another and the tabs 2d were welded to one another, and the obtained product was then sealed with a laminate film 18 to form a bag-like exterior package 19. Thereafter, an ethylene carbonate electrolytic solution 20 having lithium hexafluorophosphate (LiPF6) and lithium tetrafluoroborate (LiBF4) as electrolytes was injected into the exterior package 19 to form a lithium ion secondary battery 21 so as to prepare 50 samples of the lithium ion secondary battery 21 for each of the testing battery examples 27 and 28.

Note that although the stacked structure of the battery is shown in FIGS. 5A, 11A, and 12B, the present invention is not limited to these examples.

Examples 42 to 49 and Comparative Example 12

Table 10 summarizes the main configurations of Examples 42 to 49 corresponding to the above-described testing battery examples 21 to 28 and Comparative Example 12 corresponding to the comparative testing battery example 5. For simplicity of description, the same reference numerals are used for the numbers in Examples 42 to 49 and the numbers in Comparative Example 12 illustrated in Table 10 and Table 11 below.

Example 42

Example 42 corresponds to a testing battery example 22 in which NMC is used for the positive electrode, graphite is used for the negative electrode material, and a layer structure of the battery depicted in FIGS. 11A and 11B. A resin layer and an inorganic layer are formed by using Ink Example 4 for the resin layer and Ink Example 13 for the inorganic layer.

Example 43

Example 43 corresponds to a testing battery example 22 in which NMC is used for the positive electrode, graphite is used for the negative electrode material, and a layer structure of the battery depicted in FIGS. 11A and 11B. A resin layer and an inorganic layer are formed by using Ink Example 4 for the resin layer, Ink Example 13 for the inorganic layer on the positive electrode, and Ink Example 10 for the inorganic layer on the negative electrode.

Example 44

Example 44 corresponds to a testing battery example 23 in which LFP is used for the positive electrode, graphite is used for the negative electrode material, and a layer structure of the battery depicted in FIGS. 11A and 11B. A resin layer and an inorganic layer are formed by using Ink Example 4 for the resin layer and Ink Example 13 for the inorganic layer.

Example 45

Example 45 corresponds to a testing battery example 24 in which LFP is used for the positive electrode, graphite is used for the negative electrode material, and a layer structure of the battery depicted in FIGS. 11A and 11B. A resin layer and an inorganic layer are formed by using Ink Example 4 for the resin layer, Ink Example 13 for the inorganic layer on the positive electrode, and Ink Example 10 for the inorganic layer on the negative electrode.

Example 46

Example 46 corresponds to a testing battery example 25 in which NCA is used for the positive electrode, graphite is used for the negative electrode material, and a layer structure of the battery depicted in FIGS. 11A and 11B. A resin layer and an inorganic layer are formed by using Ink Example 4 for the resin layer and Ink Example 13 for the inorganic layer.

Example 47

Example 47 corresponds to a testing battery example 26 in which NCA is used for the positive electrode, graphite is used for the negative electrode material, and a layer structure of the battery depicted in FIGS. 11A and 11B. A resin layer and an inorganic layer are formed by using Ink Example 4 for the resin layer, Ink Example 13 for the inorganic layer on the positive electrode, and Ink Example 10 for the inorganic layer on the negative electrode.

Example 48

Example 48 corresponds to a testing battery example 27 in which NMC is used for the positive electrode, graphite is used for the negative electrode material, and a layer structure of the battery depicted in FIGS. 12A and 12B. A resin layer and an inorganic layer are formed by using Ink Example 19 for the resin layer and Ink Example 13 for the inorganic layer.

Example 49

Example 49 corresponds to a testing battery example 28 in which LFP is used for the positive electrode, graphite is used for the negative electrode material, and a layer structure of the battery depicted in FIGS. 12A and 12B. A resin layer and an inorganic layer are formed by using Ink Example 19 for the resin layer and Ink Example 13 for the inorganic layer.

Comparative Example 12

Comparative Example 12 corresponds to a comparative testing battery example 5, in which NMC is used for the positive electrode, graphite is used for the negative electrode material, and neither resin layer nor inorganic layer are formed on the active material layer. Ten layers of the positive electrode and the negative electrode were stacked to produce comparative example 12.

TABLE 10

| EXAMPLE | TESTING BATTERY EXAMPLE | BATTERY STRUCTURE | RESIN LAYER | INORGANIC LAYER | POSITIVE ELECTRODE | NEGATIVE ELECTRODE |
|---|---|---|---|---|---|---|
| 42 | 21 | FIGS. 11A, 11B | INK 4 | INK 13 | NMC | GRAPHITE |
| 43 | 22 | FIGS. 11A, 11B | INK 4 | INK 10 & 13 | NMC | GRAPHITE |
| 44 | 23 | FIGS. 11A, 11B | INK 4 | INK 13 | LFP | GRAPHITE |
| 45 | 24 | FIGS. 11A, 11B | INK 4 | INK 10 & 13 | LFP | GRAPHITE |
| 46 | 25 | FIGS. 11A, 11B | INK 4 | INK 13 | NCA | GRAPHITE |
| 47 | 26 | FIGS. 11A, 11B | INK 4 | INK 10 & 13 | NCA | GRAPHITE |
| 48 | 27 | FIGS. 12A, 12B | INK 19 | INK 13 | NMC | GRAPHITE |
| 49 | 28 | FIGS. 12A, 12B | INK 19 | INK 13 | LFP | GRAPHITE |

TABLE 10-continued

| EXAMPLE | TESTING BATTERY EXAMPLE | BATTERY STRUCTURE | RESIN LAYER | INORGANIC LAYER | POSITIVE ELECTRODE | NEGATIVE ELECTRODE |
|---|---|---|---|---|---|---|
| COMPARATIVE EXAMPLE 12 | COMPARATIVE TESTING BATTERY EXAMPLE 5 | * | *NONE | *NONE | NMC | GRAPHITE |

Evaluation tests were performed on the above testing battery examples 21 to 28 and comparative testing battery example 5. The evaluation results of Examples 42 to 49 and Comparative Example 12 are summarized in Table 11. Table 11 illustrates the results when 50 samples are prepared as each of testing battery examples. For the testing battery examples 21 to 28 and the comparative testing battery example 5, an accelerated cycle test was conducted by using a thermostatic bath at a temperature of 50° C. for 2 weeks. Discharge and charge conditions of the battery examples were SOC 5 to 95%. The results indicate that the proportion of the battery examples whose self-discharge rate (also called spontaneous discharge) reached 3 times after the start of the test was 1/20 in the comparative testing battery example 5, indicating that there was no such battery in the other testing battery examples.

Vibration tests were conducted over 12 hours on the 20 samples for each of the above testing battery examples 21 to 28 and comparative testing battery example 5 using a 3-axis vibration testing machine with a gravitational acceleration of 5 G (under the condition of SOC 50%). The results indicate that the proportion of battery examples in which the battery voltage drop due to self-discharge reached SOC 40% after the start of the test was 2/20 in the comparative testing battery example 5, indicating that there was no such battery in the other testing battery examples.

Furthermore, for each of the test battery examples 21 to 28 and the comparative test battery example 5, ten nail piercing tests each set as a simulation test for internal battery short circuit were performed. The maximum temperature of the battery surface was measured for each and the number of battery examples which exhibited 160° C. or higher was evaluated. The results indicate that in the comparative testing battery example 5, 10/10 (100%) batteries had reached 160° C., whereas in other testing battery examples, the number of battery examples which exhibited 160° C. or higher was reduced to less than half.

The evaluation test results in Table 11 clarified the superiority of Examples 42 to 49 of an embodiment of the present invention.

TABLE 11

| EXAMPLE | TESTING BATTERY EXAMPLE | NO. OF BATTERIES HAVING SELF-DISCHARGE RATE REACHED 3 TIMES AFTER START OF TEST | NO. OF BATTERIES THAT REACHED SOC 40% | NO. OF BATTERIES THAT REACHED 160° C. IN NAIL PIERCING TEST |
|---|---|---|---|---|
| 42 | 21 | 0/20 | 0/20 | 2/10 |
| 43 | 22 | 0/20 | 0/20 | 3/10 |
| 44 | 23 | 0/20 | 0/20 | 1/10 |
| 45 | 24 | 0/20 | 0/20 | 0/10 |
| 46 | 25 | 0/20 | 0/20 | 5/10 |
| 47 | 26 | 0/20 | 0/20 | 5/10 |
| 48 | 27 | 0/20 | 0/20 | 2/10 |
| 49 | 28 | 0/20 | 0/20 | 1/10 |
| COMPARATIVE EXAMPLE 12 | COMPARATIVE TESTING BATTERY EXAMPLE 5 | 1/20 | 2/20 | 10/10 |

The following describes other embodiments differing from the above-described embodiments. Ink Examples 20 to 22 as a resin layer forming ink will be described below.

Ink Example 20

A mixture of a compound polymerizable by actinic rays and a reaction initiator, which is composed of: 40.4% of 2-henoxyethyl acrylate (Kyoeisha Chemical: Light Acrylate PO-A), 50.5% of tripropylene glycol diacrylate (Aronix M-220, manufactured by Toagosei Co., Ltd.), and 9.1% of 2-methyl-l-[4-(methylthio)phenyl]-2-morpholinopropane-1-one (Irgacure 907, manufactured by Ciba Specialty Chemicals Co., Ltd.).

Ink Example 21

A mixture of a compound polymerizable by actinic rays, a reaction initiator and a solvent (porogen), which is composed of 49% of tricyclodecanedimethanol diacrylate (manufactured by Daicel Corporation), 50% dipropylene glycol monomethyl ether (Kanto Kagaku), and 1% of Irgacure 184 (BASF).

Ink Example 22

A mixture of polymer particles, polymer resin and solvent. The mixture is composed of 89.6% of cyclohexanone, 9.45% of polymethyl methacrylate crosslinked particles having a center particle size of 0.8 m, and 0.95% of polyvinylidene fluoride.

A positive electrode was prepared as follows. As a material of a positive electrode, 3 parts by weight of a carbon conductive agent, 3 parts by weight of polyvinylidene fluoride were mixed with a 5:3:2 ratio lithium composite oxide of nickel, manganese, and cobalt (NMC) in N methylpyrrolidone to prepare slurry composed of a positive electrode active material. In this process, solid content concentration was set to 60%. This slurry was intermittently coated on an aluminum substrate having a thickness of 15 µm to be an electrode base by a comma coater so as to have a width of 50 mm and a coating interval of 30 mm, and was subsequently dried to prepare a positive electrode.

A negative electrode was prepared as follows. As a negative electrode active material, 3 parts by weight of a carbon conductive agent, and 3 parts by weight of polyvinylidene fluoride were mixed with graphite in N methylpyrrolidone to prepare slurry. In this process, solid content concentration was set to 40%. This slurry was intermittently coated on a copper substrate having a thickness of 8 µm to be an electrode base by a comma coater so as to have a width of 52 mm and a coating interval of 32 mm, and was subsequently dried to prepare a negative electrode.

Next, a thin film electrode of each of the following examples was prepared by using the electrode printing apparatus 1 of FIG. 1.

Example 50

In order to prepare a positive electrode, the Ink Example 20 was supplied to the liquid ejection head 4, the Ink Example 22 was supplied to the liquid ejection head 7, and a positive electrode base 2a was set in the transfer mechanism 3. The Ink Example 20 was ejected and applied from the liquid ejection head 4 so as to fill all the 3 mm peripheral portions of the positive electrode active material layer, and was subsequently cured by using a curing light irradiation lamp as a light source 5, thereby preparing a positive electrode having the size and shape depicted in FIG. 13. Subsequently, the Ink Example 22 was applied from the liquid ejection head 7 to all regions on the active material layer including 2 mm outside of the positive electrode active material layer, and the obtained product was then heated and dried, thereby preparing a positive electrode shape of the positive electrode of Example 50 to which a resin layer 12a acting as a porous insulating layer/porous separator layer was applied (see FIG. 14).

Example 51

In order to prepare a negative electrode, the Ink Example 20 was supplied to the liquid ejection head 4 and the negative electrode base 2b was set in the transfer mechanism 3. The Ink Example 20 was ejected and applied from the liquid ejection head 4 so as to fill all the 2 mm peripheral portions of the negative electrode active material layer, and the obtained product was subsequently cured by using a curing light irradiation lamp as a light source 5, thereby preparing a negative electrode having the size and shape depicted in FIG. 15.

The negative electrode depicted in FIG. 15 was then placed again in the electrode printing apparatus 1 of FIG. 1, and Ink Example 21 was supplied to the liquid ejection head 4. The Ink Example 21 was ejected and applied from the liquid ejection head 4 to all regions on the electrode active material layer including 1 mm outside of the negative electrode active material layer, and the obtained product was subsequently cured, heated and dried by using the above-described curing light irradiation lamp, thereby preparing a negative electrode shape of the negative electrode of Example 51 to which a resin layer 12b acting as a porous separator layer was applied (see FIG. 16).

Example 52

In order to prepare a negative electrode, the Ink Example 20 was supplied to the liquid ejection head 4, the Ink Example 22 was supplied to the liquid ejection head 7, and a negative electrode base 2b was set in the transfer mechanism 3. The Ink Example 20 was ejected and applied from the liquid ejection head 4 so as to fill all the 2 mm peripheral portions of the negative electrode active material layer of the negative electrode base 2b, and the obtained product was subsequently cured by using a curing light irradiation lamp, thereby preparing a negative electrode shape (dimensions and shape were the same those in FIG. 13).

Subsequently, the Ink Example 22 was applied from the liquid ejection head 7 to all regions on the electrode active material layer including 1 mm outside of the negative electrode active material layer, and the obtained product was subsequently heated and dried, thereby preparing a negative electrode shape of the negative electrode of Example 52 to which a resin layer 12b acting as a porous separator layer was applied (dimensions and shape were the same those in FIG. 14).

Example 53

In order to prepare a positive electrode, the Ink Example 22 was supplied to the liquid ejection head 7 and the positive electrode base 2a was set in the transfer mechanism 3. The Ink Example 22 was applied so as to fill all the 3 mm peripheral portions of the positive electrode active material layer while the same application as in Example 50 was applied to all regions of the electrode active material layer, and the obtained product was subsequently heated and dried, thereby preparing a positive electrode shape of the positive electrode as a comparative example to which a resin layer 12b acting as a porous separator layer was applied (see FIG. 17).

In FIG. 17, the resin layer 12b acting as a porous separator layer is deliberately removed so as to see the active material layer 14a.

Example 54

In order to prepare a negative electrode, the Ink Example 21 was supplied to the liquid ejection head 4 and the negative electrode base 2b was set in the transfer mechanism 3. The Ink Example 21 was ejected and applied from the liquid ejection head 4 to all regions on the electrode active material layer including 2 mm outside of the negative electrode active material layer of the negative electrode base 2b, and the obtained product was subsequently cured, heated and dried by using a curing light irradiation lamp, thereby preparing a negative electrode shape of the negative electrode as a Comparative Example to which a resin layer 12b acting as a porous separator layer was applied (see FIG. 18). In FIG. 18, the resin layer 12b acting as a porous separator layer is depicted as being deliberately removed so as to expose the active material layer 14h.

The following describes Examples 55 to 59 in which an electric storage element was prepared by using a film electrode of the positive electrode or the negative electrode prepared in the above Examples 50 to 54, and an electromotive force measurement test was performed.

Example 55

A positive electrode of Example 50 and an 8 μm copper substrate bonded with Li metal (manufactured by Honjo Metal Co., Ltd., thickness: 200 μm, 54×34 mm) were prepared. In this case, the positive electrode was located opposite to the Li electrode. The front side and rear side of the electric storage element formed as described above were covered with a laminate sheet, and the three sides were heat-sealed. An electrolytic solution obtained by mixing ethylene carbonate and dimethyl carbonate at a weight ratio of 1:1, and dissolving 1.5 mol/L of lithium hexafluorophosphate (LiPF 6) was injected and the laminate sheet was then tightly sealed. The above process was carried out under an inert atmosphere.

Ten of such electric storage elements were prepared and stored at room temperature for 24 hours. Thereafter, electromotive force of the produced electric storage elements was measured, and the results indicated that all the 10 electric storage elements exhibited approximately 3 V and achieved an acceptable level.

Example 56

Example 56 is also a comparative example of Example 55 for the purpose of convenience. In Example 56, ten electric storage elements were prepared in the same manner as in Example 55, except that Example 53 (positive electrode) was used. Three of the produced electric storage elements exhibited 2.5 V or less and short-circuited (unacceptable level). This may be because the porous layer and the electrode active material layer fell off at the end portions.

Example 57

In Example 57, ten electric storage elements were prepared in the same manner as in Example 55, except that Example 51 (negative electrode) was used. All the ten electric storage elements prepared had electromotive force of approximately 3 V and achieved the acceptable level.

Example 58

Example 58 is also a comparative example of Example 57 for the purpose of convenience. In Example 58, ten electric storage elements were prepared in the same manner as in Example 55, except that Example 54 (negative electrode) was used. Three of the electric storage elements prepared had electromotive force of 1.0 V or less and short-circuited (unacceptable level). This may be because the porous layer and the electrode active material layer fell off at the end portions.

Example 59

In Example 59, ten electric storage elements were prepared in the same manner as in Example 55, except that Example 52 (negative electrode) was used. All the ten electric storage elements prepared had electromotive force of approximately 3 V and achieved the acceptable level.

The following illustrates dimensional relationships of respective parts of the film electrode according to one embodiment of the present invention with reference to FIGS. 13 to 16. As mentioned earlier, the dimensional relationships of respective parts of the film electrode according to one embodiment of the present invention have the following relationships (a) to (c) (the relationships are satisfied):

(a) measures of the electrode base>measures of the active material layer, (b) the measures of the electrode base ? measures of outer edges of the nonporous insulating layer, (c) the measures of the outer edges of the nonporous insulating layer ? measures of the porous insulating layer (porous separator layer), (d) the measures of inner edges of the nonporous insulating layer<the measures of the porous insulating layer (porous separator layer), and (e) the nonporous insulating layer has a contact portion at an end portion of the active material layer.

Note that the porous insulating layer is also referred to as a "porous separator layer".

In FIGS. 13 and 15, the measures of the electrode base and the measures of the active material layer in the relationship (a) noted above indicate the following lengths.

In FIG. 13, the measures of the electrode base indicates the length L1=56 mm and the length L2=36 mm for the outer sides of the positive electrode base 2a (except for a positive electrode tab 2c portion).

In FIG. 15, the measures of the electrode base indicate the length L1=56 mm and the length L2=36 mm for the outer sides of the negative electrode base 2b (except for a negative electrode tab 2d portion).

In FIGS. 13 and 15, the measures of the active material layer in the relationship (a) noted above indicates the following lengths.

In FIG. 13, the measures of the active material layer indicate the measures (a "50 mm" section and a "30 mm" section) of the outer sides of the active material layer 14a of the positive electrode.

In FIG. 15, the measures of the active material layer indicate the measures (a "52 mm" section and a "32 mm" section) of the outer sides of the active material layer 14b of the negative electrode.

As mentioned above, it is clear that the relationship (a) represented by the measures of the electrode base>the measures of the active material layer is satisfied.

In FIGS. 13 and 15, the measures of the outer edges of the nonporous insulating layer in the relationship (b) above indicate the following lengths.

In FIG. 13, the measures of the outer edges of the nonporous insulating layer in (b) above indicate the measures of the outer edges of the frame pattern 11 made of a resin layer (a "50 mm"+"3 mm"+"3 mm"="56 mm", and a "30 mm"+"3 mm"+"3 mm"="36 mm" section).

In FIG. 15, the measures of the outer edges of the nonporous insulating layer indicate the measures of the outer edges of the frame pattern 11 made of a resin layer (a "52 mm"+"2 mm"+"2 mm"="56 mm", and a "32 mm"+"2 mm"+"2 mm"="36 mm" section).

As described above, it is clear that the above relationship (b) represented by the measures of the electrode base ? the measures of the outer edges of the nonporous insulating layer is satisfied.

In FIGS. 14 and 16, the measures L3 and L4 of the porous insulating layer (porous separator layer) in the relationship (c) above indicate the following lengths.

In FIG. 14, the measures L3 and L4 of the porous insulating layer indicate the measures L3 and L4 of the outer sides of the resin layer 12b (a portion of L3="longitudinal length" and a portion of L4="lateral length").

In FIG. 16, the measures L3 and L4 of the porous insulating layer indicate the measures L3 and L4 of the outer sides of the resin layer 12b (a portion of L3="longitudinal length" and a portion of L4="lateral length").

As described above, it is clear that the relation (c) represented by the measures of the outer edges of the nonporous insulating layer ? the measures of the porous insulating layer (porous separator layer) is satisfied.

In FIGS. 13 and 15, the measures of the inner edges of the nonporous insulating layer in the relationship (d) above indicate the following lengths.

In FIG. 13, the measures of the inner edges of the nonporous insulating layer indicate the measures of the inner edges of the frame pattern 11 (a "50 mm" section and a "30 mm" section).

In FIG. 15, the measures of the inner edges of the nonporous insulating layer indicate the measures of the inner edges of the frame pattern 11 (a "52 mm" section and a "32 mm" section).

As described above, it is clear that the relation (d) represented by the measures of the inner edges of the nonporous insulating layer<the measures of the porous insulating layer (porous separator layer) is satisfied.

As mentioned earlier, the frame pattern 11, which is a nonporous insulating layer, has a configuration of a contact portion constantly contacting or closely contacting the end portion of the active material layer 14a of the positive electrode or the end portion of the active material layer 14b of the negative electrode. Hence, it is clear that the above relationship (e) indicating the nonporous insulating layer has a contact portion at an end portion of an active material layer is satisfied.

The following illustrates a correction method for detecting an electrode and correcting a defect site of the electrode (hereinafter simply referred to as a "correction method") according to an embodiment of the present invention.

In the correction method for detecting an electrode and correcting the defect site of the electrode, the later-described electrode printing apparatus 1 and control device configured to control the electrode printing apparatus 1 described in FIGS. 19 to 22 are used. The electrode printing apparatus 1 includes at least a transfer mechanism 3 configured to transfer an electrode base, a liquid ejection head 4 or 7 configured to eject at least one of a resin layer forming ink and an inorganic layer forming ink on the electrode base to form an ink layer, and a light source 5 or a heater 6 configured to irradiate at least one of ionizing radiation and infrared rays to the ink layer to cure and dry the ink layer on at least one of the resin layer and the inorganic layer.

Further, the electrode printing apparatus 1 includes an image recognition apparatus 9 acting as information acquisition unit configured to acquire defect information on the surface of the active material layer formed on the electrode base, a liquid ejection head 7 or 4 acting as a coating unit configured to apply at least one of a resin layer forming ink and an inorganic layer forming ink to a defect site on the surface of the active material layer, based on the defect information acquired by the image recognition apparatus 9. This liquid ejection head 7 or 4 also functions to eject an active material layer forming ink containing an active material onto the surface of the electrode base to form an active material layer thereon.

Furthermore, the electrode printing apparatus 1 includes a mechanism for use in the step of applying an insulating film to an electrode active material pattern, which is formed on at least one of an electrode base and the electrode base on which an active material layer is formed, includes a mechanism configured to collect positional information of at least one of an underlying layer and an electrode active material pattern;

a mechanism configured to determine a curvature or positional deviation of at least one of the underlying layer and the electrode active material pattern, and a mechanism configured to correct one of a position of the liquid ejection head and a position of an application image according to a curvature or positional deviation of at least one of the underlying layer and the electrode active material pattern to apply the insulating film.

Note that an embodiment of the present invention is not limited to the electrode printing apparatus described above.

Example 60

The following illustrates Example 60, which is a first correction method according to an embodiment of the present invention, with reference to FIG. 19. The upper part of FIG. 19 is a view schematically illustrating a correction method by the electrode printing apparatus in a sectional view, and the lower part of FIG. 19 is a view schematically illustrating the correction method in a plan view.

As illustrated in FIG. 19, a curvature 27 of the electrode base 2 is specified from the active material layer forming information obtained by the image recognition apparatus 9 of the electrode printing apparatus 1. The curvature 27 results from handling of the electrode base 2 after forming the positive electrode active material layer 14a or the negative electrode active material layer 14b on the electrode base 2, and the positive electrode active material layer 14a or the negative electrode active material layer 14b are also curved accordingly. The position to be ejected from the liquid ejection head 7 is optimized according to the curvature 27 of the electrode base 2 by moving the liquid ejection head 7 in an orthogonal direction Y orthogonal to a transfer direction X of the electrode base 2 in accordance with information of the curvature 27, or by changing positional information to be applied from the liquid ejection head 7 in accordance with the curvature 27 of the active material layer. The resin ink 12 or the inorganic ink 26, or a mixture of the resin ink 12 and the inorganic ink 26 is ejected from the liquid ejection head 7, and the ejected ink is exposed or baked by the light source 5 or the heater 6 so as to correct the curvature 27 to become the resin layer 12b or the inorganic layer 26b.

Thus, the correction method described above may produce an electrode obtained by forming at least the resin layer 12b or the inorganic layer 26b on the active material layer 14a or the active material layer 14b to provide electrode safety.

Example 61

The following illustrates Example 61, which is a second correction method differing from Example 60, with reference to FIG. 20. The upper part of FIG. 20 is a view schematically illustrating a correction method differing from that of FIG. 19 in a sectional view, and the lower part of FIG. 19 is a view schematically illustrating the correction method differing from that of FIG. 19 in a plan view.

From the formation information of the active material layer obtained by the image recognition apparatus 9, defective portions 29a and 29b indicated by open white patterns in the figure are specified. The defective portions 29a and 29b refer to regions each having a thickness difference of 20% or more as compared with the peripheral active material layer 14a or active material layer 14b. With respect to the defective portions 29a and 29b of the active material layer 14a or the active material layer 14b, the positive electrode active material layer forming ink 13a or the negative electrode active material layer forming ink 13b containing the active material having the same type of polarity with the active material layer is applied from the liquid ejection head 4 such that the positive electrode active material layer 30a or the negative electrode active material layer 30b is buried flat with respect to the defective portions 29a and 29b. Thereafter, the active material layer 30a or the active material layer 30b is cured by application of light or heat of the light source 5 or the heater 6 to correct the active material layer.

Note that to form the positive electrode active material layer 30a or the negative electrode active material layer 30b means to form a layer or a film containing the active material with respect to the above regions (the defective portions 29a and 29b) each having a thickness difference of 20% or more.

Next, a liquid ink including the resin ink 12 or the inorganic ink 26, or a mixture of the resin ink 12 and the inorganic ink 26 is ejected from the liquid ejection head 7 onto the active material layer 14a or the active material layer 14b, or the active material layer 30a or the active material layer 30b, and is subsequently exposed or baked by the light source 5 or the heater 6. As a result, the defective portions 29a and 29b of the resin layer 12b or the inorganic layer 26b may be formed flat.

Thus, the correction method described above may produce an electrode obtained by forming at least the resin layer 12b or the inorganic layer 26b on the active material layer 14a or the active material layer 14b to provide electrode safety.

Example 62

The following illustrates Example 62, which is a third correction method differing from Examples 60 and 61, with reference to FIG. 21. The upper part of FIG. 21 is a view schematically illustrating a correction method differing from those of FIG. 19 and FIG. 20 in a sectional view, and the lower part of FIG. 19 is a view schematically illustrating the correction method differing from those of FIG. 19 and FIG. 20 in a plan view.

From the formation information of the active material layer obtained by the image recognition apparatus 9, defective portions 29a and 29b indicated by open white patterns in the figure are specified. A liquid ink including the resin ink 12 or the inorganic ink 26, or a mixture of the resin ink 12 and the inorganic ink 26 is ejected from the liquid ejection head 7 onto the defective portions 29a and 29b of the active material layer 14a or the active material layer 14b, and is subsequently exposed or baked by the light source 5 or the heater 6. In the above process, the corrected resin layers 31a and 31b or corrected inorganic layer may be formed at the defective portions 29a and 29b by increasing ink concentration or a thickness of the ink layer with respect to the defective portions 29a and 29b, or by increasing the ratio of the resin layer at the time of forming the inorganic layer and the resin layer simultaneously. The corrected inorganic layer may also be formed in the same manner as the corrected resin layers 31a and 31b.

Note that to form the corrected resin layers 31a and 31b means to form a resin layer 12b with respect to the above-mentioned regions (defective portions 29a and 29b) having a thickness difference of 20% or more, by changing the resin amount, resin concentration, or resin type. To form the corrected inorganic layer indicates the same meaning.

Accordingly, the correction method described above may produce an electrode obtained by forming at least the resin layer 12b or the inorganic layer 26b on the active material layer 14a or the active material layer 14b to provide electrode safety.

Example 63

The following illustrates Example 63, which is a fourth correction method differing from Examples 60 to 62, with reference to FIG. 22. The upper part of FIG. 22 is a view schematically illustrating a correction method differing from those of FIG. 19 to FIG. 21 in a sectional view, and the lower part of FIG. 19 is a view schematically illustrating the correction method differing from those of FIG. 19 to FIG. 21 in a plan view.

Compared to the configuration of the electrode printing apparatus 1 illustrated in FIG. 1 and FIGS. 19 to 21, the electrode printing apparatus 1 illustrated in the upper part of FIG. 22 has the following difference; that is, the electrode printing apparatus 1 has multiple-nozzles in the vicinity of the liquid ejection head 7 on the downstream side in the transfer direction X, and further includes a liquid ejection head 7a configured to eject liquid ink having different concentration or different ink type from the liquid ink ejected from the liquid ejection head 7.

From the formation information of the active material layer obtained by the image recognition apparatus 9, defective portions 29a and 29b indicated by open white patterns in the figure are specified. A liquid ink including the resin ink 12 or the inorganic ink 26, or a mixture of the resin ink 12 and the inorganic ink 26 is ejected from the liquid ejection head 7 or the liquid ejection head 7a onto the defective portions 29a and 29b of the active material layer 14a or the active material layer 14b, and is subsequently exposed or baked by the light source 5 or the heater 6. In this process, the corrected resin layers 31a and 31b or the corrected inorganic layers 31a and 31b may be formed at the defective portions 29a and 29b of the resin layer 12b or the inorganic layer 26b by increasing the amount of liquid ejected from the liquid ejection head 7 or the liquid ejection head 7a with respect to the defective portions 29a and 29b.

Hence, the correction method described above may produce an electrode obtained by forming at least the resin layer 12b or the inorganic layer 26b on the active material layer 14a or the active material layer 14b to provide electrode safety.

Comparative Example

The following illustrates a comparative example in which any one of the correction methods according to the above-described Examples 60 to 63 was not conducted. The upper part of FIG. 23 is a view schematically illustrating a comparative example in a sectional view, in which no specific correction method according to an embodiment was conducted, and the lower part of FIG. 23 is a view schematically illustrating the comparative example in a plan view.

In the comparative example illustrated in FIG. 23, a curvature 27 of the positive electrode was formed due to handling or the like of the positive electrode, but no specific correction method was conducted for correcting the curvature 27. As a result, the positive electrode active material layer 14a (or negative electrode active material layer 14b) was formed with being partially protruded from the resin layer 12b, or the positive electrode active material layer 14a (or negative electrode active material layer 14b) was formed with being partially protruded from the inorganic layer 26b.

Note that the correction method of electrode formation is illustrated in the above-mentioned Examples 60 to 63; however, the present invention is not limited to the correction method illustrated in Examples 60 to 63.

The following describes Examples relating to a configuration of the image recognition apparatus.

Example 64

Example 64 according to the configuration of the image recognition apparatus will be described with reference to FIG. 24.

The configuration used for the image recognition apparatus 9 is as illustrated in FIG. 24. The image recognition apparatus 9 acquires a position of an active material image on the electrode base 2 and positional information of the defect sites through substantially regular reflection, using a line light source 32 configured to emit light including a visible light spectrum, and a light receiving element 33 (e.g., a line scan camera manufactured by KEYENCE) configured to receive a visible light spectrum from the line light source 32. The above image is processed by an image processing device provided in the image recognition apparatus 9. In this process, on the basis of the binarized data, a threshold is initially determined according to the light source luminance, within a range between 100% and 0% of the binary data of the image corresponding to the film thickness difference of 20%, and luminance is periodically measured to estimate the film thickness difference according to the binarized data to specify the defective portions. The amount, concentration, and type of liquid ink ejected from the liquid ejection head 4 and the liquid ejection heads 7 and 7a are controlled for correcting the defective portions to prepare corrected secondary batteries.

Example 65

The following illustrates Example 65 differing from Example 64 according to the configuration of the image recognition apparatus with reference to FIG. 25.

The configuration used for the image recognition apparatus 9 was as illustrated in FIG. 25. In this configuration, light emitted from the light source 32, which was returned via substantially regular reflection, was received by the light receiving element 33, and one or more peripheral pixels were compared based on the time difference until the light being received. Thus, since this configuration includes the light receiving element configured to recognize a thickness difference of 20% or more of the active material layer acting as an underlying layer, it was possible to conduct tests and evaluation.

Specifically, in Example 65, a line film thickness testing method was used. The line film thickness testing method uses a line laser beam enabling frequency flickering including ultraviolet spectrum, the reflection response time corresponding to the frequency flickering is acquired by the light receiving element 33. In Example 65, the threshold of the thickness difference corresponding to the thickness difference of 20% or more compared with the thickness of the peripheral layer was determined in advance, and the film thickness testing was conducted to specify the film thickness defective portions. The film thickness defective portions were subsequently corrected by controlling the amount, concentration, and type of the liquid ink ejected from the liquid ejection head 4, the liquid ejection heads 7 and 7a to prepare corrected secondary batteries.

Example 66

The following illustrates Example 66 differing from Examples 64 and 65 according to the configuration of the image recognition apparatus with reference to FIG. 26.

In Example 66, the configuration used for the image recognition apparatus 9 is as illustrated in FIG. 26. In this configuration, light emitted from the light source 32 was returned as scattered light, which was received by a light receiving element 33 such as a line scan camera manufactured by KEYENCE to acquire an image. The above image is then processed by an image processing. In this process, on the basis of the binarized data, a threshold is initially determined according to the light source luminance, within a range between 100% and 0% of the binary data of the image corresponding to the film thickness difference of 20%, and luminance is periodically measured to estimate the film thickness difference according to the binarized data to specify the defective portions. The amount, concentration, and type of liquid ink ejected from the liquid ejection head 4 and the liquid ejection heads 7 and 7a are controlled with respect to film thickness defective portions for correcting the defective portions to prepare corrected secondary batteries.

Example 67

The following illustrates Example 67 differing from Examples 64 to 66 according to the configuration of the image recognition apparatus with reference to FIG. 27.

The configuration used for the image recognition apparatus 9 is a configuration as illustrated in FIG. 27. In this configuration, X-rays are irradiated by the light source 32, and the X-rays that pass through the electrode base 2 on which the active material layer is formed are received by the light receiving element 33. The X-ray image is thus acquired and the acquired image is then processed. In this process, a portion corresponding to a film thickness difference of 20% or more is specified, as film thickness difference defective portions, based on the image data with luminance ratio being adjusted. The amount, concentration, and type of liquid ink ejected from the liquid ejection head 4 and the liquid ejection heads 7 and 7a are controlled with respect to the defective portions for correcting the defective portions to prepare corrected secondary batteries.

Comparative Example 13

The following illustrates Comparative Example 13 corresponding to a secondary battery example prepared without performing the above-described correction method.

Comparative Example 13 is a testing battery having a layer structure of the secondary battery as illustrated in FIGS. 11A and 11B. In Comparative Example 13, NCA is used as the positive electrode material, and graphite is used as a negative electrode material. Comparative Example 13 has a material configuration of the insulating layer differing from that in FIGS. 11A and 11B, and a type of the insulating layer differing between the positive electrode and the negative electrode. A resin layer is formed on the graphite of the negative electrode material with Ink Example 18, and an inorganic layer is formed on NCA (lithium nickel-cobalt-aluminum oxide lithium) of the positive electrode material with Ink Example 13, thereby forming a resin layer and an inorganic layer. In this case, since the defective portions 29a and 29b were formed due to poor coating or the like of the positive electrode, the inorganic layer 26b was recessed at the defective portions 29a and 29b.

Safety of the secondary battery example of Comparative Example 13 was evaluated based on assessment of 10 samples (cells) for each test. The results obtained are illustrated in Table 12 below. An accelerated cycle test was conducted for 10 samples (cells) by using a thermostatic bath at a temperature of 50° C. for 2 weeks. Discharge and charge conditions of the secondary battery example were SOC 5 to 95%. The results indicate that the proportion of battery examples whose self-discharge rate (also called spontaneous discharge) reached 3 times that after the start of the test was 1/10. Vibration tests were conducted over 12 hours on the 10 samples (cells) using a 3-axis vibration testing machine with a gravitational acceleration of 5 G (under the condition of SOC 50%). The results indicate that the proportion of the battery examples, in which the battery voltage drop due to self-discharge that appears to be caused by cx-foliation of the active material layer at the terminal end of the electrode reached SOC 40% after the start of the test, was 0/10, indicating that there was no such battery in the other testing battery examples. Furthermore, a nail penetration test, which was set as a simulation test for internal battery short circuit, was performed on 10 samples (cells). The maximum temperature of the battery surface was measured, and the results indicate that the proportion of the battery examples having the surface temperature of 160° C. or higher was 6/10.

Comparative Example 14

The following illustrates Comparative Example 14 differing from Comparative Example 13 corresponding to a film electrode and a secondary battery example prepared without performing the above-described correction method. Comparative Example 14 is a testing battery having a layer structure of the battery as illustrated in FIGS. 11A and 11B. In Comparative Example 14, NCA is used as the positive electrode material, and graphite is used as a negative electrode material. Comparative Example 14 has a material configuration of the insulating layer differing from that in FIGS. 11A and 11B, and a type of the insulating layer differing between the positive electrode and the negative electrode. A resin layer is formed on the graphite of the negative electrode material with Ink Example 18, and an inorganic layer is formed on the NCA positive electrode material with Ink Example 13, thereby forming a resin layer and an inorganic layer. In this case, the curvature 27 of FIG. 23 was formed due to handling or the like of the positive electrode, and the NCA protruded from the inorganic layer 26b in a manner similar to the active material layer 14a of the positive electrode illustrated in FIG. 23.

Safety of the secondary battery example of Comparative Example 14 was evaluated based on assessment of 10 samples (cells) for each test. The results obtained are illustrated in Table 12 below. An accelerated cycle test was conducted for 10 samples (cells) by using a thermostatic bath at a temperature of 50° C. for 2 weeks. Discharge and charge conditions of the battery examples were SOC 5 to 95%. The results indicate that the proportion of battery examples whose self-discharge rate (also called spontaneous discharge) reached 3 times that after the start of the test was 2/10. Vibration tests were conducted over 12 hours on the 10 samples (cells) using a 3-axis vibration testing machine with a gravitational acceleration of 5 G (under the condition of SOC 50%). The results indicate that the proportion of the battery examples, in which the battery voltage drop due to self-discharge that appears to be caused by exfoliation of the active material layer at the terminal end of the electrode reached SOC 40% after the start of the test, was 2/10. Furthermore, a nail penetration test, which was set as a simulation test for internal battery short circuit, was performed on 10 samples (cells). The maximum temperature of the battery surface was measured, and the results indicate that the proportion of the battery examples having the surface temperature of 160° C. or higher was 4/10.

Example 68

The following illustrates Example 68 corresponding to a secondary battery example prepared by performing Example 60 which is the first correction method illustrated above.

In Comparative Example 14, the NCA protruded from the inorganic layer 26b in a manner similar to the active material layer 14a as illustrated in FIG. 23. In order to correct these protrusions, the positive electrode was prepared using the first correction method illustrated in Example 60 for forming the inorganic layer on the NCA positive electrode material. Apart from the above-described positive electrode formed by using the first correction method, the Example 68 was prepared with the same structure as that of Comparative Example 14.

Safety of Example 68 was evaluated based on assessment of 10 samples (cells) for each test. The results obtained are illustrated in Table 12 below. An accelerated cycle test was conducted for 10 samples (cells) by using a thermostatic bath at a temperature of 50° C. for 2 weeks. Discharge and charge conditions of the battery examples were SOC 5 to 95%. The results indicate that the proportion of battery examples whose self-discharge rate (also called spontaneous discharge) reached 3 times that after the start of the test was 2/10. Vibration tests were conducted over 12 hours on the 10 samples (cells) using a 3-axis vibration testing machine with a gravitational acceleration of 5 G (under the condition of SOC 50%). The results indicate that the proportion of the battery examples, in which the battery voltage drop due to self-discharge that appears to be caused by exfoliation of the active material layer at the terminal end of the electrode reached SOC 40% after the start of the test, was 0/10, indicating that there was no such battery. Furthermore, a nail penetration test, which was set as a simulation test for internal battery short circuit, was performed on 10 samples (cells). The maximum temperature of the battery surface was measured, and the results indicate that the proportion of the battery examples having the surface temperature of 160° C. or higher was 0/10, indicating that there was no such battery.

Example 69

The following illustrates Example 69 corresponding to a secondary battery example prepared by performing Example 61 which is the second correction method illustrated in FIG. 20 described above.

In Comparative Example 13, the inorganic layer 26b includes recesses formed at the defective portions 29a and 29b. In order to correct these recesses, the positive electrode was prepared using the second correction method illustrated in Example 61 for forming the inorganic layer on the NCA positive electrode material. Apart from the above-described positive electrode formed by using the second correction method, the Example 69 was prepared with the same structure as that of Comparative Example 13. In Example 69, the positive electrode active material layer forming ink 13a ejected by the liquid ejection head 4 contained an active material component having a pole matched with the pole used in forming the active material layer; however, the active material component is not necessarily the same as the component of the underlying active material layer, and may be a different substance. In this case, LVP (lithium vanadium phosphate) was ejected from the liquid ejection head 4 on o the positive electrode having NCA formed in the underlying active material layer. Although a decrease in voltage was observed, this may be an extremely small portion, and almost all the capacity was comparable to that of NCA. Specifically, lithium was used for a counter electrode, the capacity of 150 mAh/g became 151 mAh/g in coin cell evaluation; and the voltage before charge 2.72 V became 2.68 V.

Safety of Example 69 was evaluated based on assessment of 10 samples (cells) for each test. The results obtained are illustrated in Table 12 below. An accelerated cycle test was conducted for 10 samples (cells) by using a thermostatic bath at a temperature of 50° C. for 2 weeks. Discharge and charge conditions of the battery examples were SOC 5 to 95%. The results indicate that the proportion of battery examples whose self-discharge rate (also called spontaneous discharge) reached 3 times that after the start of the test was 0/10, indicating that there was no such battery. Vibration tests were conducted over 12 hours on the 10 samples (cells) using a 3-axis vibration testing machine with a gravitational acceleration of 5 G (under the condition of SOC 50%). The results indicate that the proportion of the battery examples, in which the battery voltage drop due to self-discharge that appears to be caused by exfoliation of the active material layer at the terminal end of the electrode reached SOC 40% after the start of the test, was 0/10, indicating that there was no such battery. Furthermore, a nail penetration test, which was set as a simulation test for internal battery short circuit, was performed on 10 samples (cells). The maximum temperature of the battery surface was measured, and the results indicate that the proportion of the battery examples having the surface temperature of 160° C. or higher was 2/10.

Example 70

The following illustrates Example 70 corresponding to a secondary battery example prepared by performing Example 62 which is the third correction method illustrated in FIG. 21 described above. In Comparative Example 13, the inorganic layer 26b includes recesses formed at the defective portions 29a and 29b. In order to correct these recesses, the positive electrode was prepared using the third correction method illustrated in Example 62 for forming the inorganic layer on the NCA positive electrode material. Apart from the above-described positive electrode formed by using the third correction method, the Example 70 was prepared with the same structure as that of Comparative Example 13.

Safety of Example 70 was evaluated based on assessment of 10 samples (cells) for each test. The results obtained are illustrated in Table 12 below. An accelerated cycle test was conducted for 10 samples (cells) by using a thermostatic bath at a temperature of 50° C. for 2 weeks. Discharge and charge conditions of the battery examples were SOC 5 to 95%. The results indicate that the proportion of battery examples whose self-discharge rate (also called spontaneous discharge) reached 3 times that after the start of the test was 0/10, indicating that there was no such battery. Vibration tests were conducted over 12 hours on the 10 samples (cells) using a 3-axis vibration testing machine with a gravitational acceleration of 5 G (under the condition of SOC 50%). The results indicate that the proportion of the battery examples, in which the battery voltage drop due to self-discharge that appears to be caused by exfoliation of the active material layer at the terminal end of the electrode reached SOC 40% after the start of the test, was 0/10, indicating that there was no such battery. Furthermore, a nail penetration test, which was set as a simulation test for internal battery short circuit, was performed on 10 samples (cells). The maximum temperature of the battery surface was measured, and the results indicate that the proportion of the battery examples having the surface temperature of 160° C. or higher was 1/10.

Example 71

The following illustrate Example 71 corresponding to a secondary battery example prepared by performing Example 63 which is the fourth correction method illustrated in FIG. 22 described above.

In Comparative Example 13, the inorganic layer 26b includes recesses formed at the defective portions 29a and 29b. In order to correct these recesses, the positive electrode was prepared using the fourth correction method illustrated in Example 63 for forming the inorganic layer on the NCA positive electrode material. Apart from the above-described positive electrode formed by using the fourth correction method, the Example 71 was prepared with the same structure as that of Comparative Example 13.

Safety of Example 71 was evaluated based on assessment of 10 samples (cells) for each test. The results obtained are illustrated in Table 12 below. An accelerated cycle test was conducted for 10 samples (cells) by using a thermostatic bath at a temperature of 50° C. for 2 weeks. Discharge and charge conditions of the battery examples were SOC 5 to 95%. The results indicate that the proportion of battery examples whose self-discharge rate (also called spontaneous discharge) reached 3 times that after the start of the test was 0/10, indicating that there was no such battery. Vibration tests were conducted over 12 hours on the 10 samples (cells) using a 3-axis vibration testing machine with a gravitational acceleration of 5 G (under the condition of SOC 50%). The results indicate that the proportion of the battery examples, in which the battery voltage drop due to self-discharge that appears to be caused by exfoliation of the active material layer at the terminal end of the electrode reached SOC 40% after the start of the test, was 0/10, indicating that there was no such battery. Furthermore, a nail penetration test, which was set as a simulation test for internal battery short circuit, was performed on 10 samples (cells). The maximum temperature of the battery surface was measured, and the results indicate that the proportion of the battery examples having the surface temperature of 160° C. or higher was 1/10.

The results of Comparative Examples 13 and 14 and Examples 68 to 71 described above are summarized in Table 12.

TABLE 12

| EXAMPLE | POSITIVE ELECTRODE | NEGATIVE ELECTRODE | RESIN LAYER (NEGATIVE ELECTRODE) | INORGANIC LAYER (POSITIVE ELECTRODE) | NO. OF BATTERIES HAVING SELF-DISCHARGE RATE REACHED 3 TIMES AFTER START OF TEST | NO. OF BATTERIES THAT REACHED SOC 40% | NO. OF BATTERIES THAT REACHED 160° C. IN NAIL PIERCING TEST |
|---|---|---|---|---|---|---|---|
| 68 | NCA | GRAPHITE | INK 18 | INK 13 | 0/10 | 0/10 | 0/10 |
| 69 | NCA (CORRECTING PART LVP) | GRAPHITE | INK 18 | INK 13 | 0/10 | 0/10 | 2/10 |
| 70 | NCA | GRAPHITE | INK 18 | INK 13 | 0/10 | 0/10 | 1/10 |
| 71 | NCA | GRAPHITE | INK 18 | INK 13 | 0/10 | 0/10 | 1/10 |
| COMPARATIVE EXAMPLE 13 | NCA | GRAPHITE | INK 18 | INK 13 | 1/10 | 0/10 | 6/10 |
| COMPARATIVE EXAMPLE 14 | NCA | GRAPHITE | INK 18 | INK 13 | 2/10 | 2/10 | 4/10 |

As described above, the above-described embodiments and examples of the present invention may provide a high quality film electrode having the following advantageous features: no ignition or no shortening of the life due to processing or vibration in the post-process or during application, no deposition of specific substances on defects at electrode surfaces, electrode end faces, or electrode interfaces, no short circuit due to mechanical contact of interfaces, or no leakage and the like, and little performance variability such as in capacity and fewer defects, compared to the conventional coating system.

The above-described embodiments and examples of the present invention may achieve and provide a resin layer forming ink and/or an inorganic layer forming ink for forming a resin layer or inorganic layer in the film electrode.

In addition, the above-described embodiments and examples of the present invention may achieve and provide an electrode printing apparatus that selectively forms a resin layer on at least one of the surface of the electrode base and the surface of the active material layer by using the resin layer forming ink and/or the inorganic layer forming ink.

As depicted in FIG. 4A and FIG. 4B above, the features of the present invention are as follows: a film electrode 15 composed of an active material layer 14a for a positive electrode on an electrode base 2 includes a resin layer 12 and/or an inorganic layer 26 adhering to at least one of the peripheral portion of the active material layer 14a and the surface of the active material layer 14a extending along a plane of the electrode base 2.

Similarly, a film electrode 25 composed of an active material layer 14b for a negative electrode on an electrode base 2 includes a resin layer 12 and/or an inorganic layer adhering to at least one of a peripheral portion of the active material layer 14b and a surface of the active material layer 14b extending along a plane of the electrode base 2.

In the following, the above background art will be supplemented. There is known a technique of using an oligomer or a high melting point material which is solid at room temperature in a hot melt ink used in an ink jet recording apparatus (e.g., Japanese Unexamined Patent Application Publication No. 2000-044857). In this technique, ink that is solid at room temperature is fluidized by heating and discharged onto a surface to be printed, such that printing may be performed without using an organic solvent. However, printed matters obtained with such ink exhibit undesired effect, for example, extremely low resistance to solvents such as electrolytes, indicating that the printed image needs to be fixed by other means.

As a technique for handling the undesired effect, there is a technique described in Japanese Patent No. 4262009. According to this technique, when the photosensitive ink is discharged onto the surface to be printed, the printed matter may be rapidly photo-cured by light irradiation; as a result, relatively high quality printed matter may be obtained.

However, the ink used above contains color components, such as carbon-based or phthalocyanine-based compounds. As a result, when the ink is used as it is as the resin layer forming ink (liquid ink) in the present invention, the color component causes the electrode performance to deteriorate according to use. In addition, when the conventional radical polymerizable ink is provided with a color component, the radical polymerizable ink exhibits low sensitivity to light. Accordingly, in order to obtain high-quality printed matter with this technology, very large exposure energy is necessary, which indicates that this ink will not be sensitized with LED light source and the like, which in recent years have attracted attention.

As a technique for handling the above sensitivity failure, the technique described in WO 2006/064638 has been proposed. However, since this type of ink also contains a pigment, this ink fails to be sensitized with a relatively weak light source such as an LED light source, which requires longer thermal curing duration.

Although the preferred embodiments and examples of the present invention have been described above, the present invention is not limited to the specific embodiments and examples, and unless otherwise specified in the above description, various alterations, modifications and changes may be made within the gist of the scope of the present invention described in the above. For example, the technical matters described in the above embodiments, examples, and the like may be combined where appropriate.

For example, in the above-described embodiment, the case where the film electrode exhibiting the above effect of the present invention is applied to the lithium ion secondary battery has been described in detail; however, the present invention is not limited to this case, and the present invention may also be applied to a secondary battery which is the above-described electricity storage device, a power generation device such as a fuel cell, and the like.

Advantageous effects appropriately described in the embodiments of the present invention merely list the most preferable effects produced by the present invention and the effects of the present invention should not therefore be limited to those described in the embodiments of the present invention.

REFERENCE SIGNS LIST 1 electrode printing apparatus
2 electrode base
2a positive electrode base
2b negative electrode base
2c positive electrode tab (example of electrode base terminal)
2d negative electrode tab (example of electrode base terminal)
3 transfer mechanism (example of transfer unit)
4 liquid ejection head
5 light source (example of curing unit)
6 heater (example of curing unit or curing-drying unit) liquid ejection head (example of coating unit)
7a liquid ejection head (example of coating unit)
9 image recognition apparatus (example of information acquisition unit)
10 resin ink (example of resin layer forming ink)
10a resin ink layer
11 frame pattern (example of resin layer or nonporous insulating layer)
12 resin ink (example of resin layer forming ink)
12a resin ink layer
12b resin layer (example of insulating layer porosity and ion permeability
13a positive electrode active material layer forming ink
13b negative electrode active material layer forming ink
14a positive electrode active material layer
14b negative electrode active material layer
15 positive electrode (example of film electrode)
17 separator
19 exterior package
20 electrolytic solution
21 testing battery
25 negative electrode (example of film electrode)
26 inorganic ink (example of inorganic layer forming ink)
26a inorganic ink layer
26b inorganic layer (example of insulating layer having porosity and ion permeability)
27 curvature of electrode base
29a detective portion
29b detective portion
32 light source
33 light receiving element
X transfer direction
Y orthogonal direction The present application is based on and claims the benefit of priority of Japanese Priority Application No. 2017-042121 filed on Mar. 6, 2017, Japanese Priority Application No. 2017-196274 filed on Oct. 6, 2017, and Japanese Priority Application No. 2018-022573 filed on Feb. 9, 2018, the entire contents of which are hereby incorporated herein by reference.

The invention claimed is:

1. An electrode, comprising:
an electrode base;
an active material layer formed on the electrode base; and
a polymer resin film layer adhering to at least one of a peripheral portion of the active material layer and a surface of the electrode base around the active material layer in a direction extending along a plane of the electrode base, wherein a resin in the polymer resin film layer is an acrylic compound having a (poly)ethylene oxide skeleton or an acrylic compound having a side chain soluble with respect to an electrolyte.

2. The electrode according to claim 1, wherein the polymer resin film layer is an electrical insulating film and has at least one partial opening for ionic permeability.

3. The electrode according to claim 1, wherein the polymer resin film layer is formed on both an entire surface of the active material layer, and the surface of the electrode base around the active material layer in the direction extending along the plane of the electrode base.

4. The electrode according to claim 1, wherein the polymer resin film layer is selectively formed on one of a surface of a thin portion having a thickness of at least 20% of an average thickness of the active material layer, and a defect site penetrating through to the surface of the electrode base present in the active material layer.

5. The electrode according to claim 1, wherein the active material layer is present in a vicinity of an end face of the electrode base, and
wherein the polymer resin film layer partially permeates the active material layer that is present in the vicinity of the end face of the electrode base.

6. The electrode according to claim 1, wherein the polymer resin film layer has microscopic openings.

7. The electrode according to claim 1, wherein the polymer resin film layer is formed on an entire surface of the active material layer.

8. The electrode according to claim 1, wherein except for a terminal portion of the electrode base, at least one side of an electrode peripheral portion has
a length of the electrode base>a length of the active material layer.

9. The electrode according to claim 1, wherein the polymer resin film layer is selectively formed in the vicinity of a terminal end of the electrode base by a liquid ejection head configured to eject a polymer resin film layer forming ink for forming the polymer resin film layer.

10. A method for manufacturing the electrode of claim 1, the method comprising:
forming the active material layer on the electrode base, and
forming the polymer resin film layer on at least one of the peripheral portion of the active material layer and the surface of the electrode base around the active material layer in the direction extending along the plane of the electrode base.

11. The method according to claim 10, wherein the active material layer is formed by applying an active material layer forming ink, and
drying the active material layer forming ink.

12. The method according to claim 10, wherein the polymer resin film layer is formed by applying a polymer resin film layer forming ink comprising the resin, and
curing the polymer resin film layer forming ink.

13. The method according to claim 10, wherein the polymer resin film layer is selectively formed in the vicinity of a terminal end of the electrode base by a liquid ejection head configured to eject a polymer resin film layer forming ink for forming the polymer resin film layer.

14. The method according to claim 12, wherein the polymer resin film layer forming ink further comprises a soluble salt.

15. The method according to claim 12, wherein the polymer resin film layer forming ink further comprises a blowing agent.

16. The method according to claim 12, wherein the polymer resin film layer forming ink is obtained by dissolving at least one of the resin and a precursor of the resin in a liquid, and
the polymer resin film layer forming ink has viscosity of 150 mPa·s or less at room temperature and a surface tension that is in a range of 15 to 75 mN/m.

17. The method according to claim 16, wherein the precursor comprises a polymerization initiator configured to initiate polymerization upon irradiation with at least one of ionizing radiation and infrared radiation, and a polymerizable compound.

18. The method according to claim 12, wherein the polymer resin film layer forming ink at least comprises:
the resin,
a binding material, and
a solvent;
wherein the resin is dispersed in the solvent, the binding material is dispersed in the solvent or dissolved in the solvent, and the polymer resin film layer forming ink has viscosity of 150 mPa·s or less at room temperature and a surface tension that is in a range of 15 to 75 mN/m.

19. The electrode according to claim 1, wherein ion permeability is achieved by adding a blowing agent to the resin, and heating the resin having the blowing agent after coating.

20. The electrode according to claim 1, wherein ion permeability is achieved by adding a soluble salt to the resin, and immersing the resin having the soluble salt, after coating, in an electrolytic solution to dissolve the salt to form openings and pores.

* * * * *